United States Patent
Epstein et al.

(10) Patent No.: US 10,997,541 B2
(45) Date of Patent: *May 4, 2021

(54) SYSTEMS AND METHODS FOR INVESTIGATING AND EVALUATING FINANCIAL CRIME AND SANCTIONS-RELATED RISKS

(71) Applicant: 1NTEGER, LLC, Santa Monica, CA (US)

(72) Inventors: Matthew Epstein, Santa Monica, CA (US); Benjamin Schmidt, Santa Monica, CA (US); David Richard Elam, Santa Monica, CA (US); Jordan Chandler Olmstead, Santa Monica, CA (US)

(73) Assignee: 1NTEGER, LLC, Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/782,043

(22) Filed: Feb. 4, 2020

(65) Prior Publication Data
US 2020/0226512 A1  Jul. 16, 2020

Related U.S. Application Data

(63) Continuation-in-part of application No. 16/506,772, filed on Jul. 9, 2019, now abandoned, which is a
(Continued)

(51) Int. Cl.
*G06Q 10/06* (2012.01)
*G06Q 40/08* (2012.01)
(Continued)

(52) U.S. Cl.
CPC ......... *G06Q 10/0635* (2013.01); *G06F 16/28* (2019.01); *G06F 16/3331* (2019.01);
(Continued)

(58) Field of Classification Search
CPC .. G06Q 10/0635; G06Q 30/018; G06Q 30/02; G06Q 40/08; G06Q 50/265;
(Continued)

(56) References Cited

U.S. PATENT DOCUMENTS 7,315,626 B2  1/2008  Pedersen
7,315,826 B1  1/2008  Guheen et al.
(Continued)

FOREIGN PATENT DOCUMENTS

WO  WO2015/019364 A  2/2015

OTHER PUBLICATIONS

European Search Report, Application No. EP18000756.9, dated Nov. 8, 2018.
(Continued)

*Primary Examiner* — Matthew S Gart
*Assistant Examiner* — Stephen S Swartz
(74) *Attorney, Agent, or Firm* — Winston & Strawn LLP

(57) ABSTRACT

A research, analysis, regulatory compliance and media platform that connects customers to finished research and analysis produced by subject matter experts is described. The platform facilitates research, investigations, and analysis by creating a single environment in which a group of distributed analysts conduct research and investigations, store and retrieve documents and other sources, collaborate, and publish findings. Consumers are able to query a published knowledge graph, surface high value relationships, and access insights captured by analyst through a customer web portal or external production environment. The platform allows analysts and customers to research and map the commercial, financial, and facilitation networks of sanctioned or other actors that may be associated with illicit activity. Customers can access visual graphs depicting relationships between sanctioned and non-sanctioned actors in
(Continued)

order to evaluate their possible exposure to financial crime or sanctions-related risks.

29 Claims, 36 Drawing Sheets

Related U.S. Application Data continuation of application No. 16/104,706, filed on Aug. 17, 2018, now Pat. No. 10,373,091, which is a continuation of application No. 15/713,260, filed on Sep. 22, 2017, now Pat. No. 10,127,511.

(51) Int. Cl.

| | |
|---|---|
| *G06Q 30/00* | (2012.01) |
| *G06Q 50/26* | (2012.01) |
| *G06F 16/28* | (2019.01) |
| *G06F 16/33* | (2019.01) |
| *G06Q 30/02* | (2012.01) |
| G06F 16/2457 | (2019.01) |
| G06F 16/901 | (2019.01) |

(52) U.S. Cl.
CPC ........... *G06Q 30/018* (2013.01); *G06Q 30/02* (2013.01); *G06Q 40/08* (2013.01); *G06Q 50/265* (2013.01); *G06F 16/24578* (2019.01); *G06F 16/9024* (2019.01)

(58) Field of Classification Search
CPC ........... G06F 17/30061; G06F 17/3053; G06F 3/0484; G06F 3/0486
See application file for complete search history.

(56) References Cited

U.S. PATENT DOCUMENTS

| | | | |
|---|---|---|---|
| 9,116,975 B2 | 8/2015 | Shankar et al. | |
| 2002/0138417 A1 | 9/2002 | Lawrence | |
| 2003/0084424 A1 | 5/2003 | Reddy et al. | |
| 2004/0090472 A1 | 5/2004 | Risch et al. | |
| 2004/0103393 A1 | 5/2004 | Reddy et al. | |
| 2004/0193572 A1 | 9/2004 | Leary | |
| 2005/0102273 A1 | 5/2005 | Gupta | |
| 2010/0223276 A1* | 9/2010 | Al-Shameri | G06K 9/0063 707/769 |
| 2011/0288905 A1 | 11/2011 | Mrakas | |
| 2012/0137367 A1* | 5/2012 | Dupont | G06F 21/00 726/25 |
| 2012/0265675 A1 | 10/2012 | Lawrence | |
| 2013/0073387 A1* | 3/2013 | Heath | G06Q 30/02 705/14.53 |
| 2013/0144957 A1 | 6/2013 | Sherman et al. | |
| 2015/0032468 A1* | 1/2015 | Soon-Shiong | G16H 50/20 705/2 |
| 2015/0154281 A1 | 6/2015 | Carlsson et al. | |
| 2015/0169746 A1 | 6/2015 | Hatami-Hanza | |
| 2015/0227559 A1* | 8/2015 | Hatami-Hanza | G06N 5/02 707/748 |

OTHER PUBLICATIONS

Waiter didimo et al., "An Advanced Network Visualization System for Financial Crime Detection" IEEE Pacific Visualisation Symposium, pp. 203-210 (2011).
RELX Group, Benefits of Online Compliance, Accuity Vishal Rauniyar, "Minimise risk with comprehensive sanctions and PEP data", https://accuity.com/product/online-compliance/, 3 pages (Sep. 12, 2017).
Bridger Insight® XG, OFAC Compliance, KYC & Patriot Act Software from Bridger Insight® XG—Lexis Nexis, "Streamline regulatory compliance, protect your business and increase revenue" https://www.lexisnexis.com/risk/products/bridger-insight. asp#features, 4 pages (Sep. 13, 2017).
Bureau van Dijk, Orbis, "Powering the business of certainty" http://www.bvdinfo.com/About-BvD/Brochure-Library/Brochures/ORBIS-brochure, 16 pages (2017).
Compliance Catalyst. Bureau Van Dijk, Free trial (/en-gb/contact-us/free-trial?product-Compliance Catalyst) http://www.bvdinfo.com/About-BvD/Brochure-Library/Brochures/Compiiance-Catalyst, 5 pages (Sep. 13, 2017) http://www.bvdinfo.com/en-gb/our-products/catalyst/compliance-catalyst.
Regulatory Data Corp Inc., (RDC) The Trust Diligence company, world-class risk and compliance protection, strengthen fraud protection, Industry Solutions, 3 pages, (Sep. 13, 2017), http://rdc.com/.
APAC CIO Outlook, "Regulatory Data Corp: A GRC Organization Built for the Insiders by the Insiders", Thomas Oberrnair., http://cornpliance.apacciooutlook.com/vendor/article34/regulatory-data-corp, 6 pages. (Sep. 13, 2017) http://compliance.apacciooutlook.com/vendor/regulatory-data-corp-a-grc-organization-built-for-the-insiders-by-the-insiders-cid-736-micl-34.html.
World-Check, Division: Risk Management Solutions from Thomson Reuters, "Uncover Risk Take Action", 9 pages, (2016) https://risk.thomsonreuters.com/content/dam/openweb/documents/pdf/risk/brochures/thomson-reuters-world-check-brochure.pdf.
World-Check One, Division: Risk Management Solutions from Thomson Reuters, "A Better Way to identify Financial Crime & Reputational Risk", 9 pages, (2016) https://risk.thomsonreuters.com/content/dam/openweb/documents/pdf/risk/brochures/thomson-reuters-world-check-brochure.pdf.
Arachnys Information Services Ltd., Arachnys Overview "A Global Research Platform for Emerging Markets" 26 pages (2017), http://momentumevents.com/wp-content/uploads/2014/06/Arachnys-Presentation.pdf.
Arachnys/D3, Define/Follow/Prove, "Designed for in-house Enhanced Due Diligence", KYC/AML/EDD/3rd party risk, 2 pages, (2017) https://cdn2.hubspot.net/hubfs/489197/arachnys_jan2016_files/D3_flyer.pdf?t=1487936323000.
Nice Systems Ltd, NICE-Actimize, Solution Delivery Global Services & Support, "Deliver Measurable Value to Clients", Systems Ltd., 2 pages, (2017) http://www.niceactimize.com/Lists/Brochures/SolutionDelivery_Brochure.pdf.
Arachnys/Investigation, investigations are rearely Just A to B, (Designed for deep-dive investigations), 6 pages, (Sep. 13, 2017), https://www.arachnys.corn/hubs/investigator_Flyer_1.1_AC.pdf?t=1487936323000.
GiantOak, Inc., Marks & Registrations, Introduction to GOST™, 4 pages, (Sep. 13, 2017) https://www.giantoadk.com/#products#gost-product.
GiantOak, Giant Oak Search Technology (GOST™), Big Data, Behaviorial Science, Bad Guys, 6 pages, (Sep. 13, 2017) https://www.giantoadk.com/#we-see-the-people-behind-data.
ICIJ Offshore Leaks Database, 11 pages, (Sep. 13, 2017) https://offshoreleaks.icij.org/pages/howtouse.
Neo Technology, Inc., NEO4J—The #1 Platform for connected Data, 6 pages, (Sep. 19, 2017) Neo4j, The world's leading graph database, https://neo4j.com/.
Neo Technology, Inc., Developer Neo4J Database, Intro to Graph Database, (Neo4j)-[:LOVES]-(Developers) https://neo4j.com/developer/?ref=home, 6 pages, (Sep. 19, 2017).
Palantir Gotham Gotham ℣ Palantir, How Does It Work?, 5 pages, (Sep. 19, 2017) https://www.palantir.com/palantir-gotham/.
Palantir Gotham ℣ Palantir, Applications, 4 pages, (Sep. 19, 2017) https://www.palantir.com/palantir-gotham/applications/.
PalaritirPalantir Metropolis, How Does It Work? It Starts Wth All The Data, 5 pages, (Sep. 19, 2017) https://www.palantir.com/planatir-metropolis/.
Palantir Metropolis Applications ℣ Palantir, Applications, 5 pages, (Sep. 19, 2017) https://www.palantir.com/palantir-metropolis/applications/.

(56) References Cited

OTHER PUBLICATIONS

Risk & Compliance ⁂ Third-Party Risk Assessment—Dow Jones, Identify and Evaluate Third Party Risk, Latest Insights, 11 pages, (Sep. 19, 2017), link https://www.dowjones.com/products/risk-compliance/#insights-analysis.

* cited by examiner

| CONSOLE | FOCUS | CHARTS | Contact Admin SetTenis | Log Out |

ALL INSIGHTS READBOOK

CATAGORIES
SELECT TO NARROW RESULTS

- IMPOR
- ABC SUPPORT NETWORKS
- ANTEGRIA
- FFF TRAFFICKING & GGG CRIME
- PROLIFERATION
- SARKHAN
- RAGAAN

INSIGHT 1
JANUARY 13, 2030
Imporian Economic
Foundation Designated for
ABC S...

READ MORE

INSIGHT 2
JANUARY 13, 2030
Ragaan based charity
supported by designated
Anteg ...

READ MORE

INSIGHT 3
JANUARY 13, 2030
Publicly Listed Ragaan
Steroid Supplier Owns Firm
tha...

READ MORE

INSIGHT 4
JANUARY 13, 2030
Ragaan Company
Sanctioned by the US for
Proliferation...

INSIGHT 5
JANUARY 13, 2030
Son of Sanctioned Sarkhan
Tycoon is CEO of Sarkhan
Multi...

INSIGHT 6
JANUARY 13, 2030
Post-Designation
Ownership Transfers by
Dunham Fami...

FIG. 16

OTHER RISK TYPES:

| ID | Name | Reference Information | Country | Addresses | AKAs | BankAccountsBicCodes | EntityType |
|---|---|---|---|---|---|---|---|
| intent9FPNWl | Filli Investment | According to system, "Philli Investment | [China] | ["20th Floor, 2232, Mondeu | Philli Investment Development | | ["Entity"] |
| intperY5mxXg | WING, Bingq | According to system, "WING, Bingqia | [China] | | WHING, Bingq | | ["Person"] |
| intentsfOLij | ASIA Minut | According to system, "ASIA Minut" meets the criteria for the following risk types: "Sdnr" | | | | | ["Entity", "Vess |
| intentvDYhC3 | El Rida Exch | According to system, "El Rida Exchan | [Egypt] | ["85 Mei Remi St. Mars City, | ["El Redah for Exchange Company, AL Red | | ["Entity"] |
| intentRL3KK0 | Teni Tring Tai | According to system, "Teni Tring Tai (Shenzhen) Jewellery Co., Ltd." meets th | | ["No. 28 Ying Muhn Road,85 | Tene Treng Tae | | ["Entity"] |
| intentl1gdsd | Zepha Sundie | According to system, "Zepha Sundie | [Germany] | | ["ZophaSandieucksvorwaltungs-GbR"] | | ["Entity"] |
| intentolDyhU | TVT UUU | According to system, "TVT UUU" mee | [Russia] | | LVL VUU | | ["Entity"] |
| intent73LOQb | Sandie An Ji | According to system, "Sandie An Ji Sp | [China ] | ["Room 4332, Building 30, S | Sandee An Jo | | ["Entity"] |
| intentbkA9Xv | Sedricks D.O. | According to system, "Sedricks D.O.O | [Iran ', 'Bosnia and Herzegovina] | | Sadrocks D.O. | | ["Entity"] |
| intentbliiJX | Hanam Sir Ge | According to system, "Hanam Sir Gen | [United Arab Emirates"] | ["20th Floor Al Fussa Tower One, Sheik Manta Road, Dubai, United Ara | | | ["Entity"] |
| intentywbWhL | Draco Tradin | According to system, "Draco Tradin | [Czech Republic"] | ["Murdici 700/19, Czech Republic"] | | | ["Entity"] |
| intentwEluLD | Mecha Firring | According to system, "Mecha Firring Port" meets the criteria for the following r | | ["D. 26 Kedsilvna St, Mecha | Mocha Firring | | ["Entity"] |
| intentnWGMNk | Treo Minerals | According to system, "Treo Minerals Tr | [Switzerland'] | | | | ["Entity"] |
| intentnF4raB | Limelegs Ex | According to system, "Limelegs Ex | [Singapore] | ["2 Katrisa Blvd., No. 66-08, The Sail at Katrisa Bay, Singapore"] | | | ["Entity"] |
| intentOS0Px5 | 30 Crashers | According to system, "30 Crashers" m | [Russia] | | 30 Smashers | | ["Entity"] |
| intentRA2iLC | TPVUs UUU | According to system, "TPVUs UUU" m | [Russia] | | LPNUs VUU | | ["Entity"] |

FIG. 24B

| ID | Name | Chart | AKAs | Addresses |
|---|---|---|---|---|
| intent9FPNWD | Filii Investment Development | https://system.com/urigen/vis/4J7MK4 | Philii Investment Development | ['20th Floor, 2232, Mondeua 5th Road, |
| intperY5mXgV | WING, Bingqiang | https://system.com/urigen/vis/EA1hii | WHING, Bingq | |
| intentsfOLij | ASIA Minut | https://system.com/urigen/vis/XzvOKM | | |
| intentvDYhC3 | El Rida Exchange SAE | https://system.com/urigen/vis/5fis7gh | [El Redah for Exchange Company, Al Redah Exchange, Col | ['85 Mei Remi St., Mars City, CSiro, Egy |
| intentfRL3KK0 | Teni Tring Tai (Shenzhen) Jewellery Co., Ltd. | https://system.com/urigen/vis/rozvCh | Tene Treng Tae | ['No. 28 Ying Muhn Road, 2818 Oversea |
| intentI1gdsd | Zepha Sundieucksverwaltungs-GbR | https://system.com/urigen/vis/hLTXM | ['Zopha Sandieucksvorwaltungs-GbR'] | |
| intentoIDyhU | TVT UUU | https://system.com/urigen/vis/n8RUCh | LVL VUU | |
| intent73LOQb | Sandie An Ji Special Medical Equipment Co., Ltd. | https://system.com/urigen/vis/EA1hii | Sandee An Jo | ['Room 4332, Building 30, Sandie indu |
| intentbkAgXv | Sedricks D.O.O Sarajevo | https://system.com/urigen/vis/eJoheW | ['Sadirocks D.O. za inzinjering, proizvodnju, ugovaranje i integraciju za energetske i automatske s |
| intentciliJX | Hanam Sir General Trading LLC | https://system.com/urigen/vis/0M7Nc7 | | ['20th Floor Al Fussa Tower One, Sheik |
| intentywoWhU | Draco Trading s.r.o. | https://system.com/urigen/vis/XOplNU | | ['Murdici 700/19, Czech Republic'] |
| intentwEluLD | Mecha Firring Port | https://system.com/urigen/vis/QuxOVZ | Tleo Minerals | ['D, 26 Kedsivina St, Mecha 298320, Ch |
| intentWGMNk3 | Treo Minerals Trading AG | https://system.com/urigen/vis/cMZ1JH | | |
| intentnF4raB | Limelegs Expo Pte. Ltd. | https://system.com/urigen/vis/6T3FqR | | ['2 Katrisa Blvd., No. 66-08, The Sail at |
| intentOSOPx5 | 30 Crashers | https://system.com/urigen/vis/5RvxMz | 30 Smashers | |
| intentfRA2iLC | TPVUs UUU | https://system.com/urigen/vis/ruSIL1 | LPNUs VUU | |

FIG. 25

DYNAMIC ANALYTICS

| HOME | VIEWER ANALYTICS |

| SUBSCRIPTION NAME | MANAGER | LAST UPDATED | LAST ACCEPTED |
|---|---|---|---|
| > 50+ | person@banka.com | 2019/7/9 | 2019/7/1 |
| > VESSELS | person@banka.com | 2019/7/10 | 2019/7/2 |
| > 10+ | person2@banka.com | 2019/7/9 | 2019/7/10 |
| > ANALYTICS: Mandipria Network | person2@banka.com | 2019/6/5 | 2019/7/5 |

FIG. 30

| ID | Name | Alternate Names | City | Country | Risk | Labels Registration Numbers |
|---|---|---|---|---|---|---|
| intent00zhZ | Drul Production Company Vector TUPP | Drewl Production Company Vector TUBB<br>JSK SCB Vector<br>UBB Andore AU<br>UBB Andore<br>JSK BBM Vector<br>🔗 UBB Andore UAU<br>🔗 Drewlskoe Proizvodstvennoe Predpriyatie Andore UAU | | Russia | (Sell) | 6555512530<br>5585602655129 |
| intent01gz0g | PQQ Electronic Materials AO | PKK Elektronik Materials AU<br>Mitorilov<br>PKKEM AO | | Russia | (Sell) | 1513227350<br>5555513019343 |
| intent02jn0r | SvPQQNP PAO | SuPKKNP PAU<br>issledovitelskiy Institut po Neftepereribotke | | Russia | (Sell) | 7880922352<br>1087777770510 |
| intent02o2o0 | Wallan AOA | | | Russia | (Sell) | 990434232<br>1719447669<br>1088888822516 |
| intent02PUIp | CPO im. I. Romyintsavi AOA | CBU im. I. Romyintsavi AUA<br>imeni I. Romyintsavi | | Russia | (Sell) | 3714333921<br>1447744009995 |
| intent04gIFK | Prentik Stars International Limited | Prantic Starz International Limited | Hong Kong | China | (Sell) | 4222666 |
| intent04K4SX | Predentile Creative Group | | | North Korea | (Sell) | |
| intent04SDTy | Club Zaredhye UUU | Klub Zoredhye UUU | | Russia | (Sell) | 331344355<br>7705056618<br>102553923138 |
| intent04wIxXs | Alacdromontash UUU | Alacdromontash UUU | | Russia | (Sell) | 1122055610<br>10714025526664 |
| intent06GHag | Meri Moter s.n.c. Di Grelnile Zagaria & C. | | | Italy | (Sell) | 1166780819<br>3128780062 |

FIG. 34

SYSTEMS AND METHODS FOR INVESTIGATING AND EVALUATING FINANCIAL CRIME AND SANCTIONS-RELATED RISKS

CROSS-REFERENCE TO RELATED APPLICATIONS

This application is a continuation-in-part of U.S. application Ser. No. 16/506,772, filed Jul. 9, 2019, which is a continuation of U.S. application Ser. No. 16/104,706, filed Aug. 17, 2018, now U.S. Pat. No. 10,373,091, which is a continuation of U.S. application Ser. No. 15/713,260, filed Sep. 22, 2017, now U.S. Pat. No. 10,127,511. Each of the foregoing applications is expressly incorporated by reference herein.

COPYRIGHT NOTICE

The present application includes material that is subject to copyright protection. The copyright owner does not object to the facsimile reproduction of the application by any person as the application appears in the records of the U.S. Patent and Trademark Office, but otherwise reserves all rights in the copyright.

FIELD OF INVENTION

The present invention is generally directed to systems and methods for investigating and evaluating financial crime and sanctions-related risks. More particularly, the present invention is related to systems and methods involving an internal production environment configured to interact with analysts and an external production environment configured to interact with customers. The combination of the two environments and other mechanisms help maintain and evaluate financial crime and sanctions-related risks.

BACKGROUND OF THE INVENTION

Today's banking and financial systems are subject to complex regulations that can subject those institutions to significant fines, other regulatory penalties, and reputational risk. Various procedures and systems have been developed to assist these institutions in monitoring, investigating, and avoiding risks addressed by such regulations. Financial crime and sanctions-related risks can arise from directly or indirectly conducting or supporting financial transactions with entities under sanctions or otherwise engaged in illicit activity. These regulations can be complex and can involve identified entities and other entities that fall under sanctions by association. There are a number of existing systems but they have been found thus far to be inadequate in providing the institution with a cogent and quick representation of the risk as new situations arise. There is a tremendous amount of information, and understanding and assessing the information down to relevant parts has been difficult to achieve. The efficiency in providing such services and the way the information is interactively made available have also been inadequate.

SUMMARY OF THE INVENTION

In accordance with principles of the invention, a computer implemented system for providing a visual interactive software tool that permits users to investigate and evaluate financial crime and sanctions-related risks is contemplated.

In one embodiment, the system may comprise a graph database configured to store edges, nodes, and properties, a first subsystem configured to store and publish a style guide over a network, a document library, an internal production environment configured to interact with analysts, and an external production environment configured to interact with customers. The graph database is located in nonvolatile memory or stores nodes, edges, and properties in nonvolatile memory. The first subsystem is implemented on a computer configured with volatile and non-volatile memory and configured to communicate over a network. The style guide includes a plurality of data models that are identified in the style guide to model different categories of situations and contains requirements for a structure and format of data used to enter nodes, edges, and properties for a particular data model. The document library is also implemented on a computer configured with volatile and non-volatile memory and to communicate over a network. The document library can communicate with different sources to receive information to be reviewed by analysts and save received information that is used by analysts to enter nodes, edges, and properties. Each of the internal production environment and the external production environment is implemented on one or more servers configured with volatile and non-volatile memory and configured to communicate over a network. The internal production environment can communicate with analysts' computers over a network. The external production environment can communicate with customers' computers over a network.

The internal production environment implements an electronic online workspace for analysts. The internal production environment configures the electronic online workspace to provide analysts with a software interface to enter a first category of information to identify and input individual nodes and to enter a second category of information specifying edges (i.e., different types of relationships) between the nodes in the first category. The inputted nodes include source nodes and corridor endpoint nodes. The internal production environment, in response, stores the entered nodes, edges, and properties in the graph database.

The internal production environment also comprises a software engine that finds corridors. The software engine, in response to the entered nodes, edges, and properties, automatically traverses pathways which are available starting from each source node through connected edges and nodes. The software engine identifies any new pathways and traverses the pathways until it reaches a corridor endpoint node before a maximum number of degrees of node-traversal as specified by the software engine has been reached, or it reaches a node or edge in the traversal process that has no risk relevance or low risk relevance for the purpose of corridor generation.

The software engine then eliminates some of the identified pathways. The elimination process includes eliminating pathways that include the nodes or edges that have no risk relevance or low risk relevance for the purpose of corridor generation and the pathways that include a total number of nodes at or above the maximum number of degrees of node-traversal. The software engine stores a set of weights in correspondence with the different types of edges and assigns weights based on the type of edge or connected node to the edges in each pathway. In response to eliminating pathways and assigning weights, the software engine identifies the remaining pathways to be the resulting corridors for the source node and further based on a cumulative value of weights on edges in each resulting corridor specifies a variable degree of relevance to the resulting corridors.

The system also comprises a second subsystem configured to perform a publish process. The publish process approves and transmits the resulting one or more corridors and the nodes, edges, and properties to an external production environment. The second subsystem is implemented on a computer configured with volatile and nonvolatile memory to communicate over a network.

The external production environment is configured to receive and store the one or more resulting corridors and the nodes, edges, and properties in an external graph database which aggregates corridors and nodes, edges, and properties and maintains edge connections between nodes in different corridors.

The external production environment comprises an electronic online customer platform. The platform includes a visual interactive interface having interactive tools. The tools include a search engine that provides keyword searching capability that surfaces possible matching nodes in the external graph database, that provides the user with the ability to add an identified node to the visual workspace, that generates a visual graphic as representation of the identified node in the workspace, that communicates that the identified node has a number of connections (connected nodes) that include a number of corridors, and that permits the user to select one of the connections or corridors to add to the visual workspace. In response to adding the connection or corridor to the visual workspace, the engine displays additional nodes and edges that are part of the connection or corridor using separate visual graphical elements for nodes and edges that visually illustrate the connection or corridor.

The external production environment can communicate a relative relevance of a plurality of corridors based on the weights. The external production environment is further configured to display underlying properties for the nodes and edges by retrieving the underlying properties from the external graph database.

The electronic online customer platform is further configured to permit the customer to add a node to the workspace that already contains the identified node. In response to the addition, the workspace automatically displays a graphic representation of a connection between the added node and the identified node, if a relationship between the two nodes exists.

The electronic online customer platform is further configured to permit the customer to add a corridor to the workspace that already contains the identified node. In response to the addition, the workspace automatically displays graphic representations of nodes and edges of the added corridor.

The electronic online customer platform is further configured to provide the customer with option to interactively select a node displayed on the workspace. In response to the selection, the workspace communicates corridors associated with the selected node that can be added to the workspace.

The electronic online customer platform is further configured to provide the customer with option to interactively select a node displayed on the workspace. In response to the selection, the workspace communicates other nodes associated with the selected node that can be added to the workspace.

In accordance with principles of the invention, a computer implemented method for investigating and evaluating financial crime and sanctions-related risks is contemplated. In one embodiment, the method comprises storing edges, nodes, and properties in a graph database, storing and publishing a style guide over a network, receiving information in a document library to be reviewed by analysts and saving received information in the document library that is used by analysts to enter nodes, edges, and properties, implementing an internal production environment configured to interact with analysts, and implementing an external production environment configured to interact with customers. The graph database is located in nonvolatile memory. The style guide is stored in and published via a first subsystem implemented on a computer configured with volatile and non-volatile memory and to communicate over a network. The style guide includes a plurality of data models that are identified in the style guide to model different categories of situations and contains requirements for a structure and format of data used to enter nodes, edges, and properties for a particular data model. The document library is also implemented on a computer configured with volatile and non-volatile memory and to communicate over a network. The document library can communicate with different sources to receive information to be reviewed by analysts and save received information that is used by analysts to enter nodes, edges, and properties. Each of the internal production environment and the external production environment is implemented on one or more servers configured with volatile and non-volatile memory and to communicate over a network. The internal production environment can communicate with analysts' computers over a network. The external production environment can communicate with customers' computers over a network.

The internal production environment implements an electronic online workspace for analysts. The workspace is configured to provide analysts with a software interface to enter a first category of information to identify and input individual nodes or groups of nodes and to enter a second category of information specifying edges (i.e., different types of relationships) between the nodes in the first category. The inputted nodes include source nodes and corridor endpoint nodes. In response to entering the first and second category of information, the method stores the entered nodes, edges, and properties in the graph database.

The internal production environment implements a software engine that finds corridors. In response to the stored nodes, edges, and properties, the method, via the software engine, automatically traverses pathways which are available starting from each source node through connected edges and nodes. The method identifies, via the software engine, any new pathway and traverses the pathways until it reaches a corridor endpoint node before a maximum number of degrees of node-traversal as specified by the software engine has been reached, or it reaches a node or edge in the traversal process that has no risk relevance or low risk relevance for the purpose of corridor generation.

The method then eliminates, via the software engine, some of the identified pathways. The elimination process includes eliminating pathways that include the nodes or edges that have no risk relevance or low risk relevance for the purpose of corridor generation and the pathways that include a total number of nodes at or above the maximum number of degrees of node-traversal. The method stores, via the software engine, a set of weights in correspondence with the different types of edges and assigns weights based on the type of edge or connected node to the edges in each pathway. In response to eliminating pathways and assigning weights, the method, via the software engine, identifies the remaining pathways to be the resulting corridors for the source node and further based on a cumulative value of weights on edges in each resulting corridor specifies a variable degree of relevance to the resulting corridors.

The method also includes a publication process that approves and transmits the resulting one or more corridors and the nodes, edges, and properties to an external production environment. The publication process is performed by a second subsystem that is implemented on a computer configured with volatile and non-volatile memory and to communicate over a network.

The method also includes receiving and storing, via the external production environment, the one or more resulting corridors and the nodes, edges, and properties in an external graph database which aggregates corridors and nodes, edges, and properties and maintains edge connections between nodes in different corridors.

The method includes implementing an electronic online customer platform in the external production environment. The platform provides a visual interactive interface that comprises a visual workspace and interactive tools. The tools include a search engine that is configured to provide keyword searching capability that surfaces possible matching nodes in the external graph database, that provides the user with the ability to add an identified node to the visual workspace, that generates a visual graphic as representation of the identified node in the workspace, that communicates that the identified node has a number of connections that include a number of corridors, and that permits the user to select one of the connections or corridors to add to the visual workspace. In response to adding the connection or corridor to the visual space, the method, via the engine, displays additional nodes and edges that are part of the connection or corridor using separate visual graphical elements for nodes and edges that visually illustrate the connection or corridor.

The method further comprises communicating, via the external production environment, a relative relevance of a plurality of corridors based on the weights.

The method further comprises displaying, via the external production environment, underlying properties for the nodes and edges by retrieving the underlying properties from the external graph database.

The method further comprises permitting, via the electronic online customer platform, the customer to add a node to the workspace that already contains the identified node. In response to the addition, the method automatically displays, via the electronic online customer platform, a graphic representation of a connection between the added node and the identified node, if a relationship between the two nodes exists.

The method further comprises permitting, via the electronic online customer platform, the customer to add a corridor to the workspace that already contains the identified node. In response to the addition, the method automatically displays, via the electronic online customer platform, graphic representations of nodes and edges of the added corridor.

The method further comprises providing, via the electronic online customer platform, the customer with option to interactively select a node displayed on the workspace. In response to the selection, the method communicates, via the electronic online customer platform, corridors associated with the selected node that can be added to the workspace.

The method further comprises providing, via the electronic online customer platform, the customer with option to interactively select a node displaced on the workspace. In response to the selection, the method communicates, via the electronic online customer platform, other nodes associated with the selected node that can be added to the workspace.

In accordance with principles of the invention, a computer readable data medium storing computer-executable instructions that, when executed by a processor, cause the processor to perform a method for investigating and evaluating financial crime and sanctions-related risks is contemplated. The method comprises establishing a graph database configured to store edges, nodes, and properties in nonvolatile memory, storing and publishing a style guide, receiving information in a document library to be reviewed by analysts and saving received information in the document library that is used by analysts to enter nodes, edges, and properties, communicating with an internal production environment configured to interact with analysts, and communicating with an external production environment configured to interact with customers. The graph database is located in nonvolatile memory. The style guide is stored in and published via a first subsystem implemented on a computer configured with volatile and non-volatile memory and to communicate over a network. The style guide includes a plurality of data models that are identified in the style guide to model different categories of situations and contains requirements for a structure and format of data used to enter nodes, edges, and properties for a particular data model. The document library is also implemented on a computer configured with volatile and nonvolatile memory and to communicate over a network. The document library can communicate with different sources to receive information to be reviewed by analysts and save received information that is used by analysts to enter nodes, edges, and properties. Each of the internal production environment and the external production environment is implemented on one or more servers configured with volatile and non-volatile memory and to communicate over a network. The internal production environment can communicate with analysts' computers over a network. The external production environment can communicate with customers' computers over a network.

The internal production environment implements an electronic online workspace for analysts. The workspace is configured to provide analysts with a software interface to enter a first category of information to identify and input individual nodes or groups of nodes and to enter a second category of information specifying edges (i.e., different types of relationships) between the nodes. The inputted nodes include source nodes and corridor endpoint nodes. In response entering the first and second category of information, the method stores the entered nodes, edges, and properties in the graph database.

The internal production environment implements a software engine that finds corridors. In response to the stored nodes, edges, and properties, the method, via the software engine, automatically traverses pathways which are available starting from each source node through connected edges and nodes. The method identifies, via the software engine, any new pathway and traverses the pathways until it reaches a corridor endpoint node before a maximum number of degrees of node-traversal as specified by the software engine has been reached, or it reaches a node or edge in the traversal process that has no risk relevance or low risk relevance for the purpose of corridor generation.

The method then eliminates, via the software engine, some of the identified pathways. The elimination process includes eliminating pathways that include the nodes or edges that have no risk relevance or low risk relevance for the purpose of corridor generation and the pathways that include a total number of nodes at or above the maximum number of degrees of node-traversal. The method stores, via the software engine, a set of weights in correspondence with the different types of edges and assigns weights based on the type of edge or connected node to the edges in each pathway.

In response to eliminating pathways and assigning weights, the method identifies, via the software engine, the remaining pathways to be the resulting corridors for the source node and further based on a cumulative value of weights on edges in each resulting corridor specifies a variable degree of relevance to the resulting corridors.

The method also includes a publication process that approves and transmits the resulting one or more corridors and the nodes, edges, and properties to an external production environment. The publication process is performed by a second subsystem that is implemented on a computer configured with volatile and non-volatile memory and to communicate over a network.

The method also includes receiving and storing, via the external production environment, the one or more resulting corridors and the nodes, edges, and properties in an external graph database which aggregates corridors and nodes, edges, and properties and maintains edge connections between nodes in different corridors.

The method includes implementing an electronic online customer platform in the external production environment. The platform provides a visual interactive interface that comprises a visual workspace and interactive tools. The tools include a search engine that is configured to provide keyword searching capability that surfaces possible matching nodes in the external graph database, that provides the user with the ability to add an identified node to the visual workspace, that generates a visual graphic as representation of the identified node in the workspace, that communicates that the identified node has a certain number of connections that include a number of corridors, and that permits the user to select one of the connections or corridors to add to the visual workspace. In response to adding the connection or corridor to the visual workspace, the method, via the engine, displays additional nodes and edges that are part of the connection or corridor using separate visual graphical elements for nodes and edges that visually illustrate the connection or corridor.

The method further comprises communicating, via the external production environment, a relative relevance of a plurality of corridors based on the weights.

The method further comprises displaying, via the external production environment, underlying properties for the nodes and edges by retrieving the underlying properties from the external graph database.

The method further comprises permitting, via the electronic online customer platform, the customer to add a node to the workspace that already contains the identified node. In response to the addition, the method automatically displays, via the electronic online customer platform, a graphic representation of a connection between the added node and the identified node, if a relationship between two nodes exists.

The method further comprises permitting, via the electronic online customer platform, the customer to add a corridor to the workspace that already contains the identified node. In response to the addition, the method automatically displays, via the electronic online customer platform, graphic representations of nodes and edges of the added corridor.

The method further comprises permitting, via the electronic online customer platform, the customer with option to interactively select a node displayed on the workspace. In response to the selection, the method communicates, via the electronic online customer platform, corridors associated with the selected node that can be added to the workspace.

In accordance with principles of the invention, another computer implemented system for providing a visual interactive software tool that permits users to investigate and evaluate financial crime and sanctions-related risks is contemplated. The system comprises a database configured to store graph data structures including edges, nodes, and properties in nonvolatile memory. The system also comprises a style guide comprising a plurality of data models that model different categories of situations and contains requirements for a structure and format of data used to enter nodes, edges, and properties for a particular data model. The system further comprises a system configured to receive data input and use the inputted data to enter nodes, edges, and properties pursuant to the style guide into the database. Additionally, the system comprises a software engine that finds nodes based on user specified criteria. The software engine is configured to automatically traverse pathways which are available starting from a corridor endpoint node through connected edges and nodes, to identify any pathways and traverse the pathways until there are no connecting edges that meet an edge type specified in the user specified criteria. The software engine is also configured to identify and eliminate pathways by analyzing edges connecting two nodes, properties of the edges connecting two nodes, and the number of edges a node has and determining whether each edge of the node meets the specified edge type. The software engine is further configured to identify nodes that have the specified edge type from the identified pathways for the corridor endpoint node as matching nodes. Additionally, the software engine is configured to save the identified pathways and matching nodes that meet the user specified criteria starting from the corridor endpoint node and to save a subset of the identified pathways and matching nodes for use by customers. Moreover, the system comprises an electronic online customer platform configured to provide a visual interactive interface and interactive tools over a web browser. The web browser-based tools include a search engine with capability to display one or more of the matching nodes when the one or more of the matching nodes are selected. The web browser-based visual interactive interface provides the user with the ability to add other nodes to the web browser-based visual interactive interface and automatically generates a unique and interactive visual graphic as a representation of the selected one or more matching nodes in the web browser-based visual interactive interface. The system is configured to transmit the subset of the identified pathways and matching nodes in bulk in a particular type of file to customers, which is adapted to allow customers to access the subset without using the electronic online customer platform.

In one embodiment, the edge type specified in the user specified criteria is ownership.

In one embodiment, the edge type specified in the user specified criteria is officer or director.

BRIEF DESCRIPTION OF THE DRAWINGS

The nature and various advantages of the present invention will become more apparent upon consideration of the following detailed description, taken in conjunction with the accompanying drawings, in which like reference characters refer to like parts throughout, and in which:

FIGS. 7-11, 13, 14A, 15, and 16 depict illustrative screenshots of a graphical user interface, an interactive window(s), and related displayed features generated by the system through which the user interacts on their computer or PC to use the advantages provided by the system in accordance with some embodiments of the present invention;

FIG. 24B depicts an illustrative table produced by the system upon performing one or more of the above traversal processes on the research graph of FIG. 24A in accordance with some embodiments of the present invention;

FIG. 25 depicts another illustrative table produced by the system upon performing one or more of the above traversal processes on a research graph in accordance with some embodiments of the present invention;

FIG. 30 depicts an illustrative screen showing an identifier field in accordance with some embodiments of the present invention;

FIG. 34 depicts an illustrative selected subscription in accordance with some embodiments of the present invention.

DETAILED DESCRIPTION OF THE INVENTION

Figure 1:
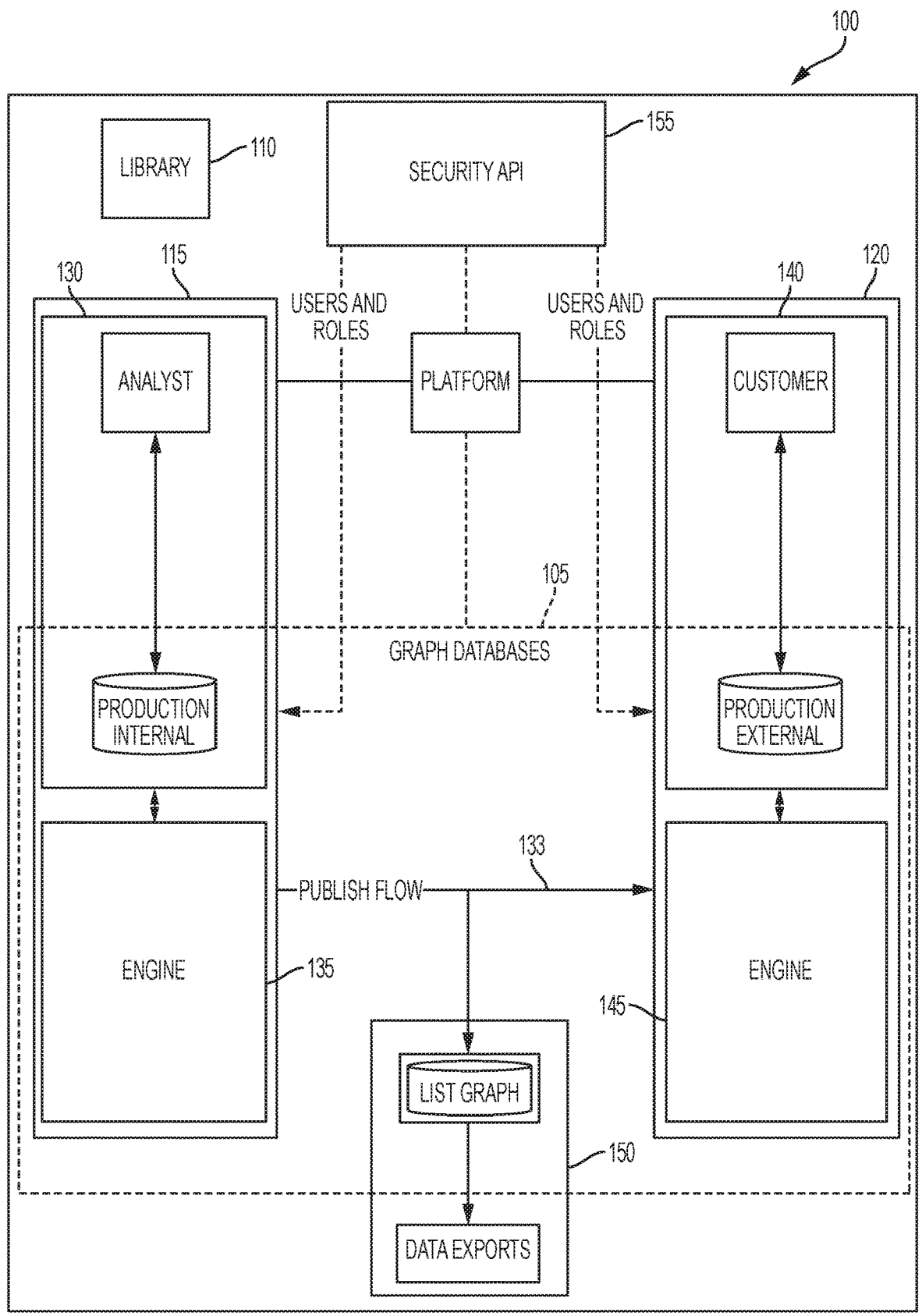
FIG. 1 depicts an illustrative computer-implemented system for providing a visual interactive software tool that permits user to investigate and evaluate financial crime and sanctions-related risks in accordance with some embodiments of the present invention.

In accordance with principles of the present invention, a system is provided that can efficiently identify for users direct and indirect relationships between an actor that does not appear on a sanctions list and other actors that do appear on a sanctions list using, among other things, a graph database and a style guide. The style guide allows many analysts to incrementally add to the data in the graph database in a consistent, structured, and connected way. As new nodes are added to the system, a computer implemented process is implemented that traverses pathways from the new node to a node that is identified on a sanctions list and which relies on rules that identify only a subset of pathways for use by the customers. The system eliminates pathways that have a degree of separation at or above a predetermined threshold and implements other rules such as rules eliminating pathways that include nodes or edges that have no risk relevance or low risk relevance for the purpose of corridor generation. The resulting pathways that are found are considered "corridors" and are saved by the system in the graph database. Thus, for example, in some embodiments, the system incrementally adds corridors and stores them instead of traversing the entire graph. This technique also supports an interactive graphical interface of the system which provides an interactive tool for users to quickly and cogently understand risk using a visualization of one or more corridors. The interface provides a visual workspace that allows the user to search by keywords and the interface, in response, lists search results for possible matching nodes in the database. The interface further permits the user to select a node from the list of search results (e.g., a person) and in response, the interface or system generates a related list that includes a list of corridors (pathways in the graph database from that starting node to a node that appears on a sanctions list, also referred to as a corridor endpoint node) and other connected nodes under subject groupings. The user can interact with the interface to select a corridor and add it to the workspace. The user can select other corridors from the list and add to the workspace and display it. This provides a powerful and elegant solution to the needs of the institution with respect to financial crime and sanctions compliance. The interface permits the user to select individual nodes that are in the workspace and in response, lists of related information including corridors that are associated with that node, and other connected nodes, and the user can similarly add those to the workspace. This technique quickly adapts the source data and in operation, quickly surfaces the relevant information in a visual way for understanding by those in charge of evaluating financial crime and sanctions compliance issues at institutions. The known prior art is not able to accomplish such powerful results.

Embodiments of the present invention are directed to a software platform that allows analysts and customers to research and map the commercial, financial, and facilitation networks of sanctioned or other actors that may be associated with illicit activity. Through embodiments to the present invention, financial institutions, multinational corporations, legal professionals, and other stakeholders can access visual graphs depicting relationships between sanctioned and non-sanctioned actors in order to evaluate their possible exposure to financial crime or sanctions-related risks. Embodiments illustrated herein are directed to financial crime and sanctions-related solutions and have particular suitability to solving and assisting users with financial crime and sanctions compliance related issues. It should be understood that described features or systems can have broader or different applications. Sanctions refers to laws or regulations issued by a government that places commercial restrictions on certain identified entities or entities that are described in more general terms or indirectly (e.g., all subsidiaries of an entity that is specifically identified) and also place restrictions on commercial activities involving the restricted entities. Individuals, companies, or organizations that violate the restrictions are subject to civil or criminal penalties, which can be significant source of risk, typically arising from being a primary or secondary actor in a financial transaction. In the United States, government organizations involved in issuing and enforcing such regulations include the Department of the Treasury, the Department of State, and the Department of Justice, but others exist in the U.S. and in other countries.

FIG. 1 depicts an illustrative computer-implemented system 100 for providing a visual interactive software tool that permits users to evaluate financial crime and sanctions-related risks. The system 100 comprises a graph database 105 configured to store nodes, edges, and properties a document library 110 configured to communicate with different sources over a network to receive financial crime and sanctions-related risk information and save received information used by analysts to create nodes, edges, and properties, an internal production environment 115 configured to interact with analysts, and an external production environment 120 configured to interact with customers. The graph databases 105 include an internal graph database and an external graph database. The internal graph database is configured to store nodes, edges, and properties inputted into the internal production environment 115 by analysts, store nodes, edges, and properties for access and use by analysts in the internal production environment 115, and store other information entered and produced from the internal production environment 115. The information produced from the internal production environment 115 may be information created using the nodes, edges, and properties (e.g., connections and corridors). The external graph database is configured to store nodes and edges for customers' use in the external production environment 120 and store visual graphs produced and saved by customers in the external production environment 120. The graph database 105 may be a component separate from the internal production environment 115 and the external production environment 120 or be integrated with the internal production environment 115 and the external production environment 120 (e.g., with the internal graph database built into the internal production environment 115 and with the external graph database built into the external production environment 120). The system 100 is configured to logically divide (e.g., by a mechanism such as user authentication executed by subsystem 155) between the internal graph database and the external graph database, wherein customers are not permitted to access or interact with nodes or edges in the internal graph database.

A node represents a subject. The system 100 is configured to allow for the subject to be an individual, entity, postal address, e-mail address, event, number, telephone number, campaign, or other subject. The subject may be one that appears on a sanctions list or one that has a criminal record (sanctioned subject), one that is materially associated with a sanctioned subject but does not appear on a sanctions list (associated subject), or one that is neutrally associated with a sanctioned subject or an associated subject and does not appear on a sanctions list (neutral subject). A node is described by properties that include one or more words, numbers, symbols, or a combination thereof by which the underlying subject is known or referred to. When the subject (or property) is a number, the number may be a phone number, fax number, driver license number, social security number, passport number, bank account number (including credit card and debit card account numbers), identification number used by the system 100, or other number.

Figure 2:
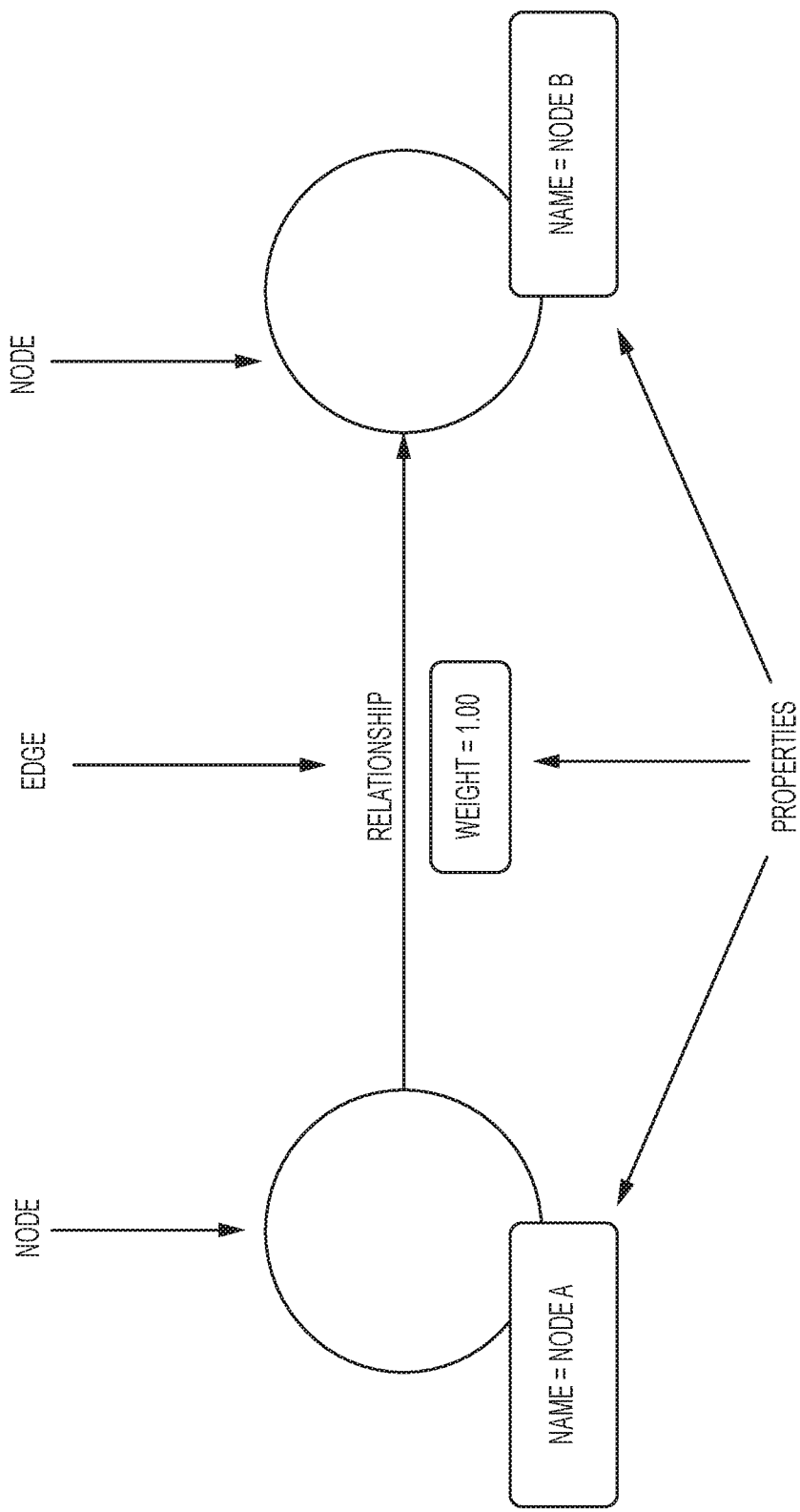
FIG. 2 depicts illustrative nodes, properties, and an edge and their respective roles in accordance with some embodiments of the present invention.

An edge represents a relationship between two nodes. The relationship may be a business relationship (e.g., creditor, supplier, joint-venture, etc.), an ownership relationship (e.g., majority shareholder, minority shareholder, subsidiary, etc.), a position relationship (e.g., director, manager, owner, etc.), a banking relationship (e.g., account holder, mortgagor, etc.), a familial relationship (e.g., father, daughter, cousin, etc.), and other relationships. An edge is described by properties that include one or more words, numbers, symbols, or a combination thereof by which the underlying subject is known or referred to. FIG. 2 depicts an illustrative node, property, and edge and their respective roles. FIG. 2 depicts a graphical structure of the node, property, and edge that is presented to user when he or she assembles them through the workspace in the internal or external production environment. The graph database 105 stores nodes, edges, and information from the environments 115, 120 in nonvolatile memory. Nodes and edges are part of a graph database and can also have a graphical representation as part of a user interface.

The internal production environment 115 includes an electronic online workspace for analysts 130 and a software engine 135. The workspace 130 provides a software interface that allows an analyst to enter a first category of information to input individual nodes or group of nodes. The nodes may be inputted into or created in the internal production environment 115 from information stored in the document library 110. Analysts can access the internal production environment 115 over network connections as over an Internet connection. The document library 110 communicates with different data sources over a network to receive financial crime and sanctions-related information. Data sources may include government sanctions lists, court records, records of incorporation, corporate filings, shipping records, news, websites, public social media postings, multimedia, and other sources. An analyst may review the stored information, determine subjects from the stored information, and enters each determined subject and relevant information into the internal production environment 115 to create or input a node and related properties. The information relied on by the analyst to create nodes can be saved in the document library so it is available for review by the analyst and other analysts and users. In this way, analysts and users can check accuracy of the entered nodes and properties, and review the actual received information directly (instead of just the nodes, edges, and properties) if necessary. For example, the received information may include an article from a newspaper (or other source), a link to the article, or information about the article, and the analysts and users can review that article. An analyst may also obtain financial crime and sanctions-related information from places other than the document library and use the internal production environment 115 to merely input or create nodes. Once an inputted node is identified by the system or an analyst as appearing on a sanctions list, the system designates it as a corridor endpoint node. The designation imparts to the inputted node different characteristics and effects that enables the software engine 135 to find paths and corridors (further discussed below) accordingly and that allows the electronic online platform of the external production environment 120 to generate a visual graphic as a distinctive representation. A node can also be created to represent an article or other data that serves as a source for additions made by an analyst. This type of node is configured not to have a graphical node inserted into a workspace.

The software interface also allows the analyst to enter a second category of information specifying an edge and related properties between inputted nodes. The software interface provides a list of available edges, and the analyst can select and specify an edge from the list. The analyst may also create additional edges from the software interface if they are not in the list. In some embodiments, inputting a certain node and/or specifying the type and direction of the relationship between two nodes may cause the system 100 to automatically select a certain relationship between that certain inputted node and another inputted node. The relationship selected by the system 100 may be a mandatory relationship. In some embodiments, specifying a certain relationship may cause the system 100 to automatically change or specify the type of inputted node (e.g., source or corridor endpoint node). The type of node selected by the system 100 may be a mandatory type of node.

The first category of information and the second category of information are stored in the graph database 105 and can be accessed by the workspace 130.

The internal production environment 115 or the system 100 includes a first subsystem that is configured to store and provide a style guide. The style guide includes a plurality of data models defined by analysts or administrators to model different situations and contains requirements for a structure and format of data used to enter nodes, edges, and properties for a particular data model. For example, the situations may include arrest, investigation, and litigation situations, and the data model can specify how the information of each situation should be entered into the internal production environment 115. For instance, in an arrest situation, the data model may specify the types of nodes that should be used, the edges that should be used for each type of node, the properties that should be used for each type of node and edge, and the format that the node, edge, and property should be entered to clearly convey the information represented by the nodes, edges, and properties. For example, the data model may require the analyst to enter the nodes, edges, and properties in an "Arrest of [Person A] in [Country], who is [relationship] of [Person B]" format with the nodes, edges, and properties inserted in the corresponding bracket. The text in the format (e.g., "Arrest of," "who is," and "of") may be entered by the analyst or automatically generated by the environment 115 when the analyst selects the data model of the arrest situation to be used for the information he is about enter. The data model may have similar specifications for investigation, litigation, and other situations. In this way, analysts can follow the same rules and requirements for each situation and build the information for each situation in the same manner.

A data model can govern what and how each piece of information is entered into the internal production environment 115 in each situation, relate the entered information to a node in the graph database 105 based on information in the entered information, and determine how the entered information should be linked to or integrated with the node if the entered information is related. In some embodiments, a data model may be available as a template for entering the first and/or second category of information. In some embodiments, an analyst can enter the first and/or second category of information and the system 100 can automatically select the appropriate data model to add or integrate the information in the data model into the graph database 105. The data model may include the corresponding fields and the required data structure and format so that the system 100 or the graph database 105 can be built and maintained uniformly across all analysts. The data models can also be created for other situations.

The development and publication of the style guide can be an important component of the system 100. A rigorous set of requirements and definitions can be specified in the style guide for a wide range of situations, subjects, or relationships. This approach embeds structured consistency in the analyst-created nodes, edges, properties, graphs, or related information (the creation of which may involve many different analysts and can involve many different sources of information or types of sources) that permits the database to grow efficiently. The system 100 can, in using the created information, automatically identify edges or relationships between subjects. This can for example result in avoiding having multiple representations of the same subject in the database which can create disconnects or result in duplicate or redundant paths. Other advantages are also gained from such a system. Note that this is one option and in some embodiments other variations can be implemented.

The system is configured to allow collaboration. The system can be configured to have many analysts interact and save their work on the system. The system can be configured to allow analysts to see the work of other analysts on the system and to build on that work (efficiently building a larger and more complex set of information). The system can be configured to allow analysts to view the work saved by other analysts or can have restrictions in place that limit the access of analysts to nodes, edges, or properties that have been approved and added to the external production environment. For example, the internal production environment 115 allows analysts to collaborate and build a database storing information that visually identifies direct and indirect relationships between an actor that does not appear on a sanctions list and other actors that do appear on a sanctions list. Analysts (e.g., other analysts) can then add additional actors or nodes to the database to continue the direct and indirect relationships and/or new actors or nodes to the database to create new direct and indirect relationships that are not already in the database. The internal production environment 115 also includes an approval process for new information that is being added by an analyst. The approval process can be configured as an automated process involving a workflow in which the contributing analyst specifies to the system that a new set of subjects or relationships are being added to the system and in response, an automated approval process is implemented that can involve approval by peers through the system or by supervisory reviewers.

The software engine 135 includes a set of computer implemented rules (generally referred to as rules) that are configured to traverse paths and find ("surface") a subset of the paths that meet certain rules (and therefore, eliminate other paths). The subset that meets the rules is referred to herein as corridors. The software engine 135 is configured to find or identify corridors based on the stored first and second category of information. A corridor is a pathway connecting any node that is not a corridor endpoint node to a node that is designated as a corridor endpoint node via one or more edges and/or one or more connecting nodes. A connecting node can be any node except a node designated as a corridor endpoint node and/or other nodes deemed to have no (or low) illicit finance or sanctions-related risk relevance for the purpose of corridor generation. As a matter of clarification, at the time an analyst creates a new node for a subject, the system 100 may not be configured to require that the analyst specifies whether it is a corridor endpoint node or some other kind of node (e.g., a node that has no risk relevance or low risk relevance for the purpose of corridor generation, or any further specificity with respect to the type of node can for example be determined by the software engine 135 based on the edges or paths connected to that node). At a base level, a corridor is determined (found) by identifying a node (that is not a corridor endpoint node) from the first category of information and connecting the identified node to a designated corridor endpoint node in the first category of information via a direct edge connection or via other nodes in the first category of information and the edges in the second category of information. Rules are incorporated into the software engine 135 that traverses or finds paths from identified nodes to designated corridor endpoint nodes and finds corridors as a subset of all paths where a path from an identified node can be traversed by the software engine 135 to reach a designated corridor endpoint node. In operation, the software engine 135 automatically traverses from the identified node through connected nodes and edges until it reaches a designated corridor endpoint node. A corridor endpoint node is a type of node that is specified or designated within the system as having different properties than other nodes. A corridor endpoint node cannot be the starting point of a corridor and is only available to end a pathway or corridor. The corridor endpoint node is defined by the system 100 (e.g., by rules, configurations, or data structures) to function that way with respect to identified nodes. A corridor is found when the identified node is connected to a corridor endpoint node and also certain rules are satisfied. A corridor can be graphically illustrated by the system 100 (e.g., as part of the graphical user interface) using a graphical structure comprising the connected nodes, edges and corridor endpoint node that form the corridor. Subject to meeting certain additional rules (discussed herein) a corridor can be identified by the software engine 135 whenever an identified node can reach a corridor endpoint node. Multiple corridors can be generated for an identified node. The multiple corridors may be pathways between an identified node and a corridor endpoint node, between an identified node and multiple corridor endpoint nodes, or a combination thereof.

Figure 3:
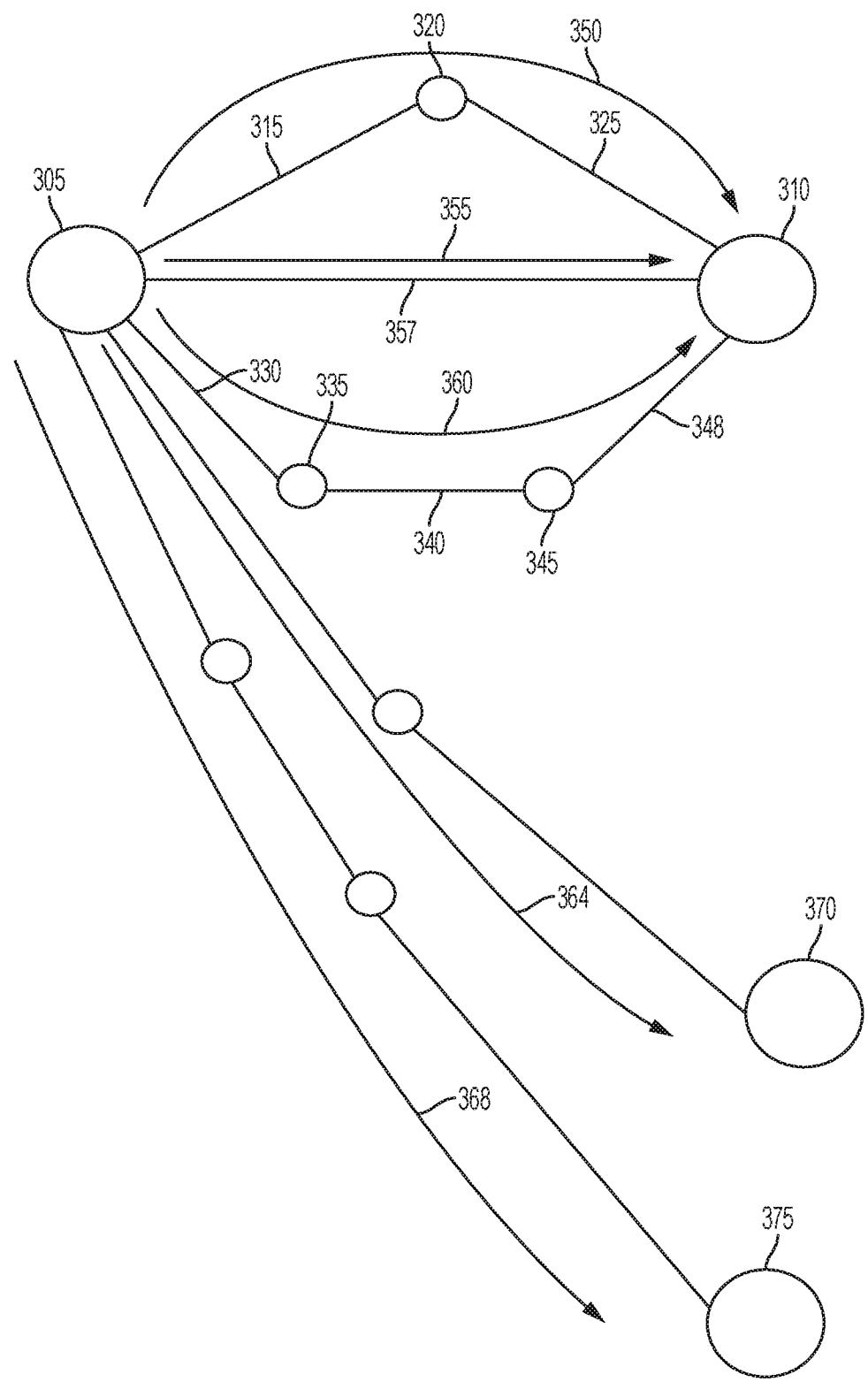
FIG. 3 depicts illustrative corridors in accordance with some embodiments of the present invention.

FIG. 3 depicts illustrative corridors 350, 355, 360, 364, 368. As mentioned above, a corridor is a pathway between a source node and a corridor endpoint node that meets certain rule requirements. For discussion purposes, in connection with FIG. 3, corridors are discussed in more general terms and additional specificity is discussed further below. The corridors 350, 355, 360 represent pathways between a source node 305 and a corridor endpoint node 310. The corridor 350 includes an edge 315 joining the source node 305 and a connecting node 320, a connecting node 320, and an edge 325 joining the connecting node 320 and the corridor endpoint node 310. The corridor 355 is an edge 357 between the source node 305 and corridor endpoint node 310. The corridor 360 includes an edge 330 joining the source node 305 and a connecting node 335, a connecting node 335, an edge 340 joining the source node 335 and a connecting node 345, a connecting node 345, and an edge 348 joining the connecting node 345 and the corridor endpoint node 310. The corridor 364 represents a pathway between the same source node 305 and a different corridor endpoint node 370. The corridor 368 represents a pathway between the same source node 305 and another different corridor endpoint node 375. The software engine 135 may not generate corridors for some of the source nodes since not all the source nodes can be connected to a corridor endpoint node.

The software engine 135 is programmed with a maximum number of degrees of node-traversal. The maximum number of degrees of node-traversal refers to the number of nodes in a pathway the software engine 135 is permitted (by rule) to traverse to reach a corridor endpoint node from a particular source node. The software engine 135 will end the node traversal, exits the traversed pathway, and eliminates that traversed pathway from qualifying as a corridor when the software engine 135 determines that the current traversed node is equal to the maximum number of degrees of node-traversal. The software engine 135 is configured to eliminate a pathway when the number of nodes in the path (after the source node) reaches a maximum. The maximum can be specified internal to the system and not otherwise visible to users or analysts when interacting with the system. The maximum can for example be selected to be one of 4, 5, 6, 7, or 8 nodes, which can have advantages in processing, relevancy, and presentation. Other maximums are contemplated. With this rule, the software engine 135 prevents pathways that exceed the maximum number of degrees of node-traversal from qualifying to be corridors. If the software engine 135 has reached the maximum number and no corridor endpoint node is found, then the software engine 135 moves onto traversing another pathway (e.g., which can start from the same source node again if that source node has other pathways or from the next source node) to find a corridor endpoint node. Since the graph database 105 may store a large number of nodes and edges, their combinations may produce an enormous number of pathways. The maximum number can control the number of iteration performed by the software engine 135 to save processing time and power consumption. For brevity, the term maximum number of degrees of node-traversal is sometimes referred to or abbreviated as the maximum number, the maximum number of node traversal, the maximum number of node traversal or degrees of traversal, or the maximum number of traversal nodes.

Figure 4:
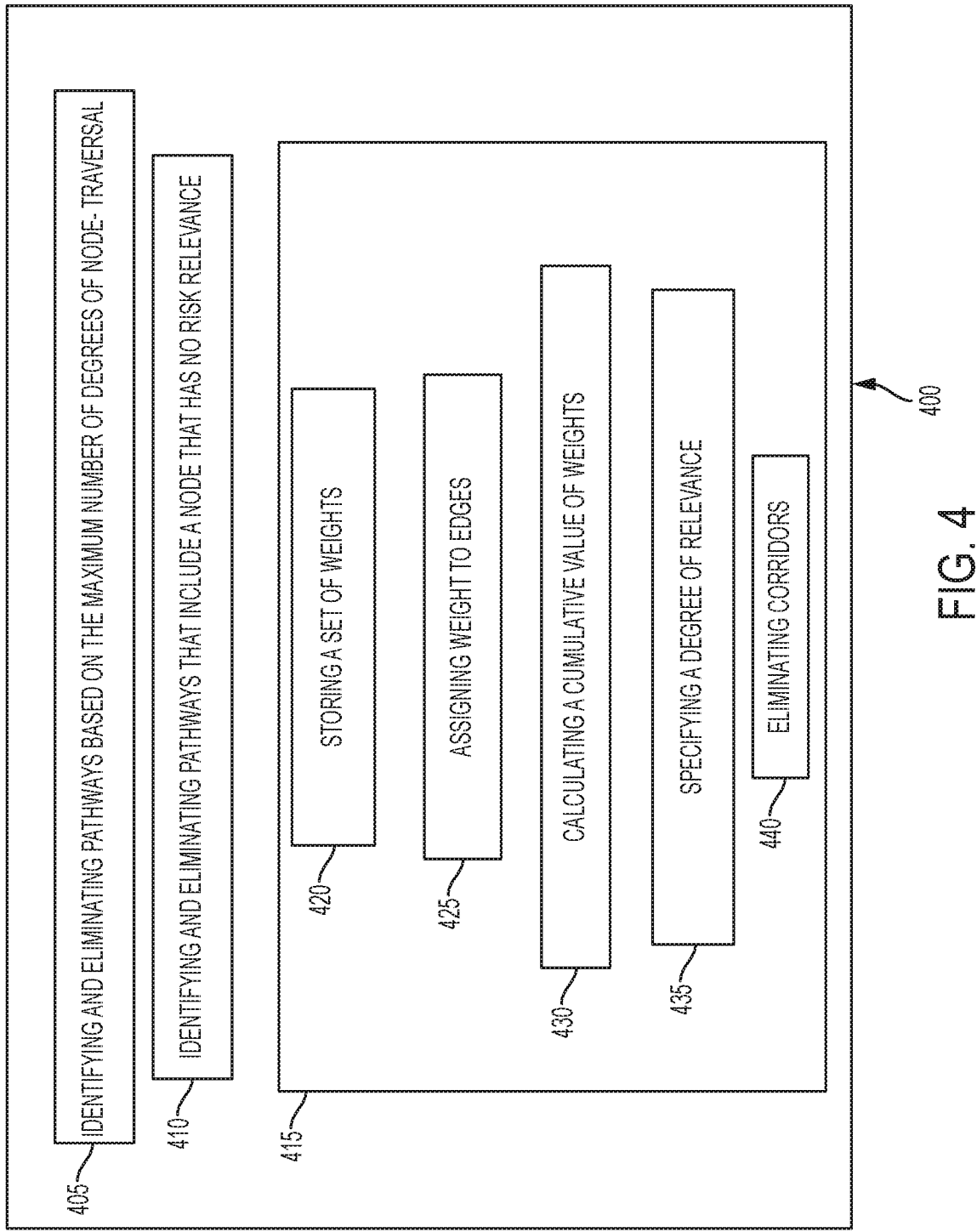
FIG. 4 depicts an illustrative process for finding corridors in accordance with some embodiments of the present invention.

FIG. 4 depicts an illustrative process 400 for finding corridors. In addition to the programmed maximum number, the software engine 135 is configured to apply a process that identifies and eliminates pathways that include a node in the path (between a source node and a corridor endpoint node) that has been designated as having no risk relevance or low risk relevance for the purpose of corridor generation when traversing through that node to a corridor endpoint node. The determination by the system of which nodes (or edges) are ones that have no risk relevance or low risk relevance for the purpose of corridor generation can be performed in one or more ways (or combinations thereof) that are described herein as illustrative examples. A node (or edge) can be designated as having no risk relevance or low risk relevance by an analyst via the electronic online analyst workspace. The software engine 135 can also determine whether a node is one that has no risk relevance or low risk relevance, without an analyst identifying it as such. The software engine 135 can make the determination by analyzing the edge connecting the two nodes, the properties of the edge and two nodes, the number of edges the node has, or a combination thereof, and determining that the inclusion of the node, or the path associated with the node, would indicate a neutral or primarily neutral relationship between the two nodes. If desired, a software module that incorporates artificial intelligence or a set of rules can be implemented in some embodiments that determines whether a node or edge has no or low risk relevance for the purpose of corridor generation. Low risk relevance is mentioned to explain that a low level of relevance would still not be sufficient to reach a threshold value for the purpose of corridor generation. The software engine 135 is configured to recognize nodes that have no risk relevance or low risk relevance (e.g., government node).

This configuration improves the technical and informational aspects of the resulting corridors. For example, a node for a government entity is removed by this rule because its inclusion provides very limited or no relevance for the purpose of evaluating financial crime and sanctions-related risks for two distinct nodes that connect through the government node. In operation, in one embodiment, the system implemented a process in which as part of the automated node traversal process, it determines whether each node is identified as a type of node that the system has stored with a designation that this type of node has no risk relevance or low risk relevance for the purpose of corridor generation. If the system identifies a match, the system would eliminate that pathway and would discontinue traversing that pathway. The node and related connection would be available and displayed (if desired) in a workspace to provide additional information to a user.

Figure 5:
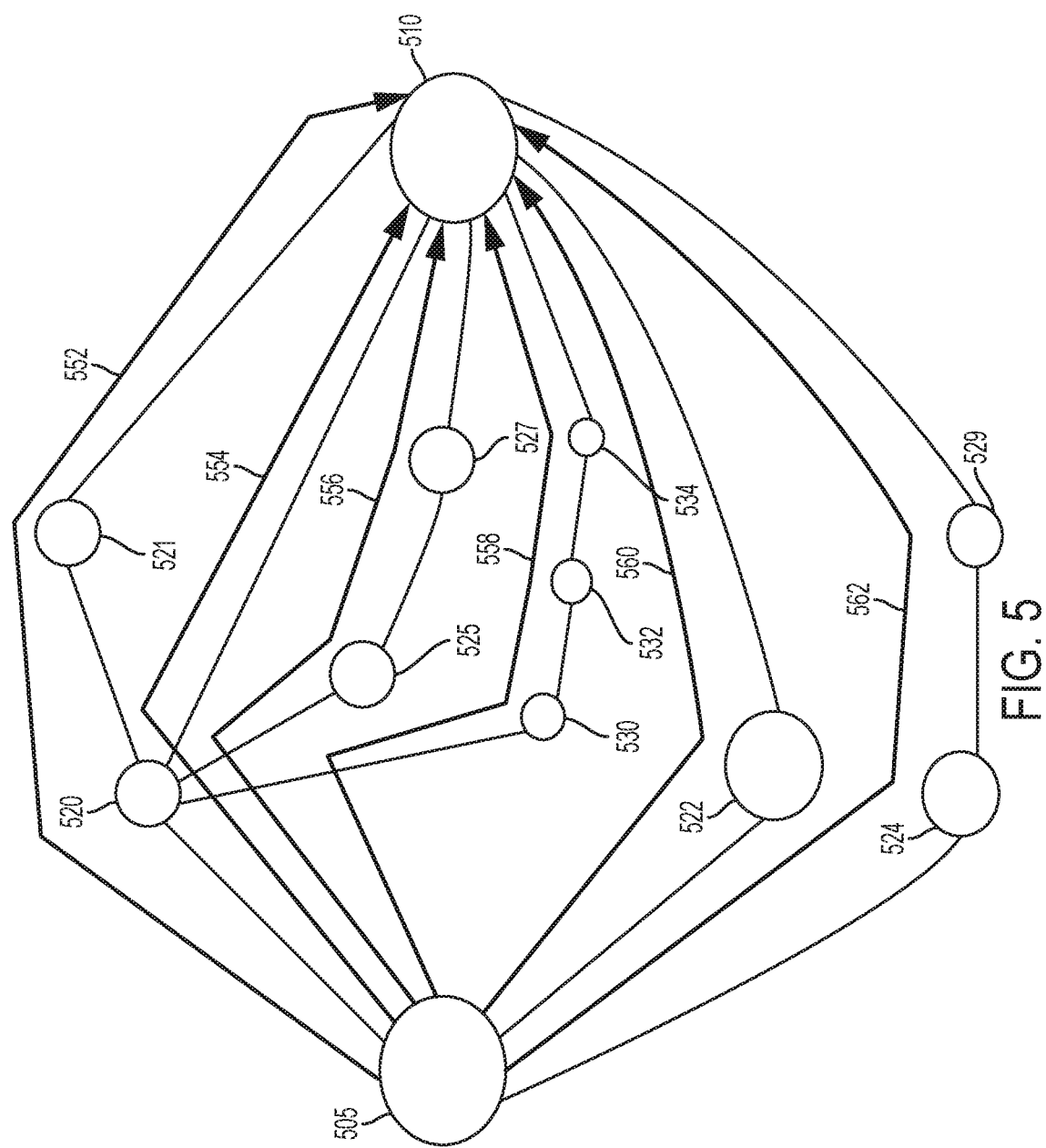
FIG. 5 depicts illustrative steps that determine whether pathways have satisfied certain automated rules to be qualified as corridors in accordance with some embodiments of the present invention.

FIG. 5 depicts illustrative steps 405 and 410 of FIG. 4. In this example, a low maximum number (e.g., 3) is used for explanatory purposes. FIG. 5 shows a graphical illustration of the process in order to further elaborate about its operation. If desired, the graphical illustration could be incorporated into an interactive graphical interface. In FIG. 5, node 505 may have been recently added to the internal production environment and approved to be added to the external production environment. At this point, for example, the system processes the addition as part of the already existing nodes and edges in the already existing external production environment. The system will automatically start at node 505 and traverse connections (e.g., one by one, at the same time, or some variation thereof) and applies automated rules to select corridors. In this case, node 505 has connections to node 510 (a node on a sanctions list and thus a corridor endpoint node) through nodes 520, 521, 525, 527, 530, 532, 534, 522, 524, and 529. The software engine 135 would traverse connected edges and nodes until reaches node 510 or the node traversal is terminated before it reaches node 510 when the software engine 135 determines that the current path it is traversing has reached a maximum number of nodes before reaching a corridor endpoint node or a node or edge (reached in the traversal process) that is in the category of nodes or edges that have no risk relevance or low risk relevance for the purpose of corridor generation. In the illustration, for convenience, lines 552, 554, 556, 558, 560, and 562 are provided as a way to mark and discuss an associated set of nodes and edges that (based on information stored in the environment) establish a path from node 505 to node 510. Those lines are markers for discussion purposes. For example, in this case, using step 405 of FIG. 4, the software engine 135 identifies pathways, referenced using associated markers, 552, 554, 556, 558, 560, 562 that connect node 505 to corridor endpoint node 510 and eliminates pathway 558 because pathway 558 involves more than 3 connecting nodes (e.g., 520, 530, 532, and 534). In operation, the process would stop the traversal process when it reaches the maximum number of traversal nodes (3 in this example) and the system would not identify or "know" that there is a pathway 558 to node 510 because it would have stopped the traversal process when it reached the maximum (i.e., node 532). By performing step 410 of FIG. 4, the software engine 135 identifies that node 522 has no risk relevance or low risk relevance for the purpose of corridor generation, when it reaches that node in the node traversal process, and eliminates pathway 560 associated with node 522. Similarly, in operation, the process would stop the traversal process when it reaches the node 522 (determines node has no risk relevance or low risk relevance for the purpose of corridor generation) and at that point the system would not identify or "know" that there is a pathway 560 to node 510 because it would have stopped the traversal process when it reached node 522. As a result, the software engine 135 keeps only pathways 552, 554, 556 and 562 after performing steps 405 and 410 and the kept pathways are determined to be corridors associated with node 505 in relation to node 510 (since there can be other relations). Corridors are automatically added to the external production environment when or in response to being found by the software engine 135. Other implementations are also contemplated.

The predetermined node type for non-traversal, the type of node that the process should identify and use to eliminate path being traversed (no risk relevance or low risk relevance), and the predetermined number of connecting nodes (maximum number of node traversal or degrees of traversal) may be inputted by the analyst into the software interface but is preferably pre-programmed in the software engine 135 (in the implementation of the overall system).

The process 400 (FIG. 4) further comprises determining a degree of relevance for the corridors 415. The step 415 comprises storing a set of weights in correspondence with the different types of edges 420, assigning weights based on the type of edges in each corridor 425, calculating a cumulative value of weights for each found corridor based on the assigned weights 430, and specifying a degree of relevance to other corridors for each corridor 435 based on the cumulative value. The types of edges may be based on whether the relationship is a shareholder one, an employment one, a banking one, a familial one, or other one and/or the rank in the relationship (majority shareholder vs. minority shareholder, director vs. associate, son vs. cousin, etc.). Each relationship type and rank has an assigned weight, and certain relationships types and ranks have a weight higher than other relationship types and ranks. Higher weight may refer to a higher assigned number or a higher multiplier in the calculation step 430 or the formula used in the calculation step 430. The calculation step 430 may be based on adding all the assigned weights of the connecting edges in a corridor. The total sum or cumulative value may be used as the only parameter in the specifying step 435 to determine the degree of relevance. The cumulative value may also be used with other parameters or in another procedure to determine the relevance in step 435. A higher cumulative value may represent that the corridor has a higher relevance compared to other corridors. In some embodiments, a lower cumulative value may represent that the corridor has a higher relevance compared to other corridors. The degree of relevance may be output as a number on a scale configured to convey such degree. For example, the corridor with the strongest degree of relevance may be marked with "1", the corridor with the second strongest degree of relevance may be marked with "2," and so forth. Other numbers, letter, characters, or orders (e.g., from large number to small number) may also be used. The number may be different from the cumulative value. The system can be configured to only assign weights that are equal or greater than 1 (with 1 indicating most relevant and ascending numbers, totals, indicating lower relevance, in relation to a weight of 1).

If desired as an option, the step 415 may further comprise a step 440 that eliminates corridors based on relevance determined from calculating weights. The step 440 may eliminate corridors based on assigned weights in step 425 and before the calculation step 430. In this case, steps 430 and 435 calculate a cumulative value and specify a degree of relevance for the remaining corridors. The step 440 may eliminate corridors based on the calculated cumulative value in step 430. The step 440 may eliminate corridors that do not have a cumulative value that is above, below, or matches a predetermined cumulative value. In this case, step 435 specifies a degree of relevance for the remaining corridors. The predetermined cumulative value may be provided by analyst from software interface or be pre-programmed in the software engine 135 and be subsequently modified to a different number by analyst from the software interface.

The step 415 may be performed after the step 405 is executed, after the step 410 executed, or after both steps 405 and 410 are executed. In any of these scenarios, the step 415 may operate to determine a degree of relevance for corridors kept by step 405 and/or 410 without the step 440. The step 415 may also operate to further eliminate one or more corridors kept by step 405 and/or 410 and determine a degree of relevance for the remaining corridors. In other words, the step 440 may be optional in some embodiments.

In some embodiments, the step 415 may be configured to perform before steps 405 and/or 410. In that situation, steps 405 and/or 410 may further eliminate corridors kept by the step 415 (whether step 415 performs the eliminating step 440 or not). In some embodiments, the step 415 may be configured as an alternative step to steps 405 and 410. The process 400 may operate based on the step 415 to eliminate corridors without steps 405 and 410.

All the data available to (e.g., all the predetermined numbers, assigned weights, etc.) and produced by the software engine 135 (e.g., the generated corridors, the cumulative values, kept/resulting corridors, etc.) may be stored in the internal graph database.

The system 100 includes a second subsystem that is configured to approve and provide the kept or resulting corridors and the associated nodes, edges, and properties from the internal production environment 115 (or the internal graph database) to the external production environment 120 (or the external graph database) via link 133 (FIG. 1). In one embodiment, the second subsystem may provide a multi-stage approval process. In the first stage, the second subsystem may transmit the work added by an analyst (e.g., a set of new nodes and edges that are related to a sanctioned subject based on a court record) to the computers of peer analysts for peer analysts' review (which is understood to include web browser implementations, which should be generally understood with respect to other aspects as well). The second subsystem may require a certain number of analysts to approve the work (added research) in order to advance to the next stage. Upon approval by the required number of analysts, the second subsystem may transmit the analyst-approved work to the computer of a senior analyst for the senior analyst's review. Upon approval by the senior analyst, the work (a particular set of nodes, edges, or properties) are provided (inserted and saved) to the external production environment 120. The approval process may have additional or fewer stages. During any of the stages, any rejected work will not be transferred to the external production environment 120. The kept or resulting corridors are used interchangeably throughout this application to refer to corridors that remain after an eliminating step is performed, which may be step 405, 410, and/or 415. The second subsystem is configured to automatically feed approved work to the external production environment 120. The second subsystem also provides approved work to the third subsystem.

The external production environment 120 (FIG. 1) is configured to receive and store the resulting corridors and the associated nodes, edges, and properties in the external graph database. The external graph database can aggregate resulting corridors and associated source nodes (e.g., adding current resulting corridors and associated nodes, edges and properties to resulting corridors and associated nodes, edges, and properties previously stored in the external graph database) and maintain edge connections between nodes in different corridors.

Figure 17:
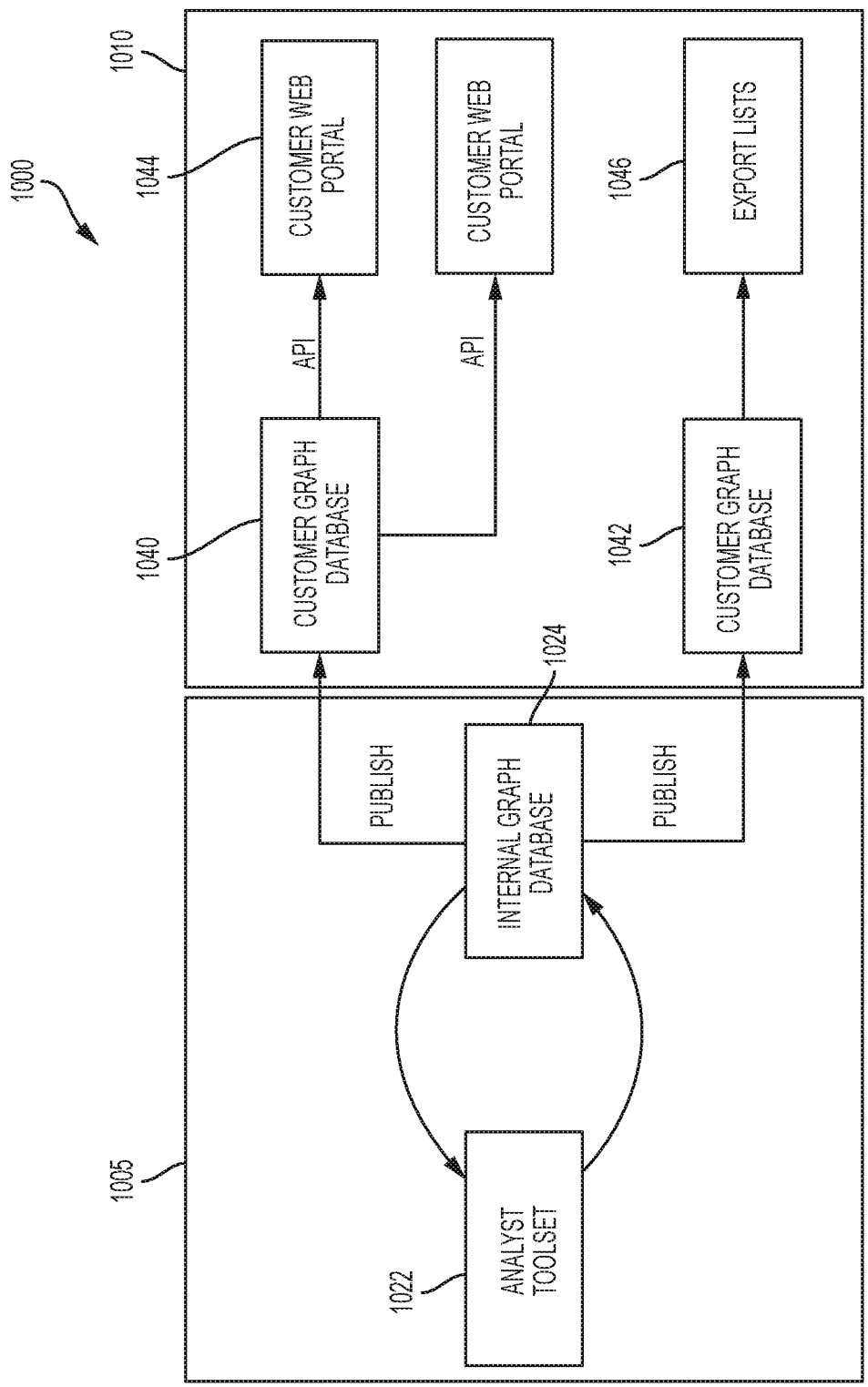
FIG. 17 depicts another illustrative computer-implemented system for providing a visual interactive software tool that permits user to investigate and evaluate financial crime and sanctions-related risks in accordance with some embodiments of the present invention.

The external production environment 120 includes an electronic online customer platform 140 (and is accessible via a web portal 1044 as shown in FIG. 17) and a software engine 145. The customer platform 140 provides a visual interactive interface that allows a customer to enter a keyword search, search for nodes with properties that match the keyword search in the external graph database, add a node that matches the keyword search to an electronic workspace, view information accompanying a node in a side panel, and add additional nodes and/or a corridor to the workspace. The customer platform 140 perform its functions through the software engine 145. As the customer enters a keyword search through the interface, the software engine 145 searches indexed properties on nodes in the external graph database and identifies nodes that match or are similar to the search query. When the customer selects and adds an identified node to the workspace, the software engine 145 adds the identified node to the workspace by generating and displaying a visual graphical element as representation of the identified node in the workspace. The software engine 145 also retrieves the accompanying information (which includes properties) of the identified node from the external graph database and displays that information through the visual interactive interface. The displayed or accompanying information may include the relevant information entered by analyst during the input step, other nodes directly connected to the identified node, and a number of corridors. Upon the customer selecting and adding one of the corridors, the software engine 145 generates and displays a visual graphic as representation of the corridor in the workspace. The visual graphic for the corridor is generated and displayed by the nodes and edges that form the corridor. Customers can access the external production environment 120 over network connections such as over an Internet connection.

Figure 6:
FIG. 6 depicts illustrative visual graphical elements with color indicating a particular type of node and symbol indicating a particular type of subject in accordance with some embodiments of the present invention.

The software engine 145 is configured to generate and display a plurality of visual graphical elements. The software engine 145 may generate a circle as the visual graphical element for a node (see FIGS. 2, 3, and 5). The circle may have a different size or color to indicate whether the node is identified as a particular type of node, including, for example, a corridor endpoint node. The circle may be further produced with a symbol indicating a particular type of subject. FIG. 6 depicts illustrative visual graphical elements 600 of a node with color 605 indicating a particular type of node and symbol 610 indicating a particular type of subject. The software engine 145 may generate a line as the visual graphical element for an edge (see FIGS. 2, 3, and 5). The line may have a different thickness, length, or color to indicate the type of relationship. The line may also have an arrow at either end to indicate the direction of the relationship. The visual graphic of corridor can be generated based on the above circle and line. A separate traversal line (e.g., arrow lines in FIGS. 3 and 5) can also be provided to illustrate the path of the corridor. Visual graphic refers to a visual representation created by one or more visual graphical elements. The software engine 145 may also generate other shapes to represent node, edge, and corridor.

Figure 7:
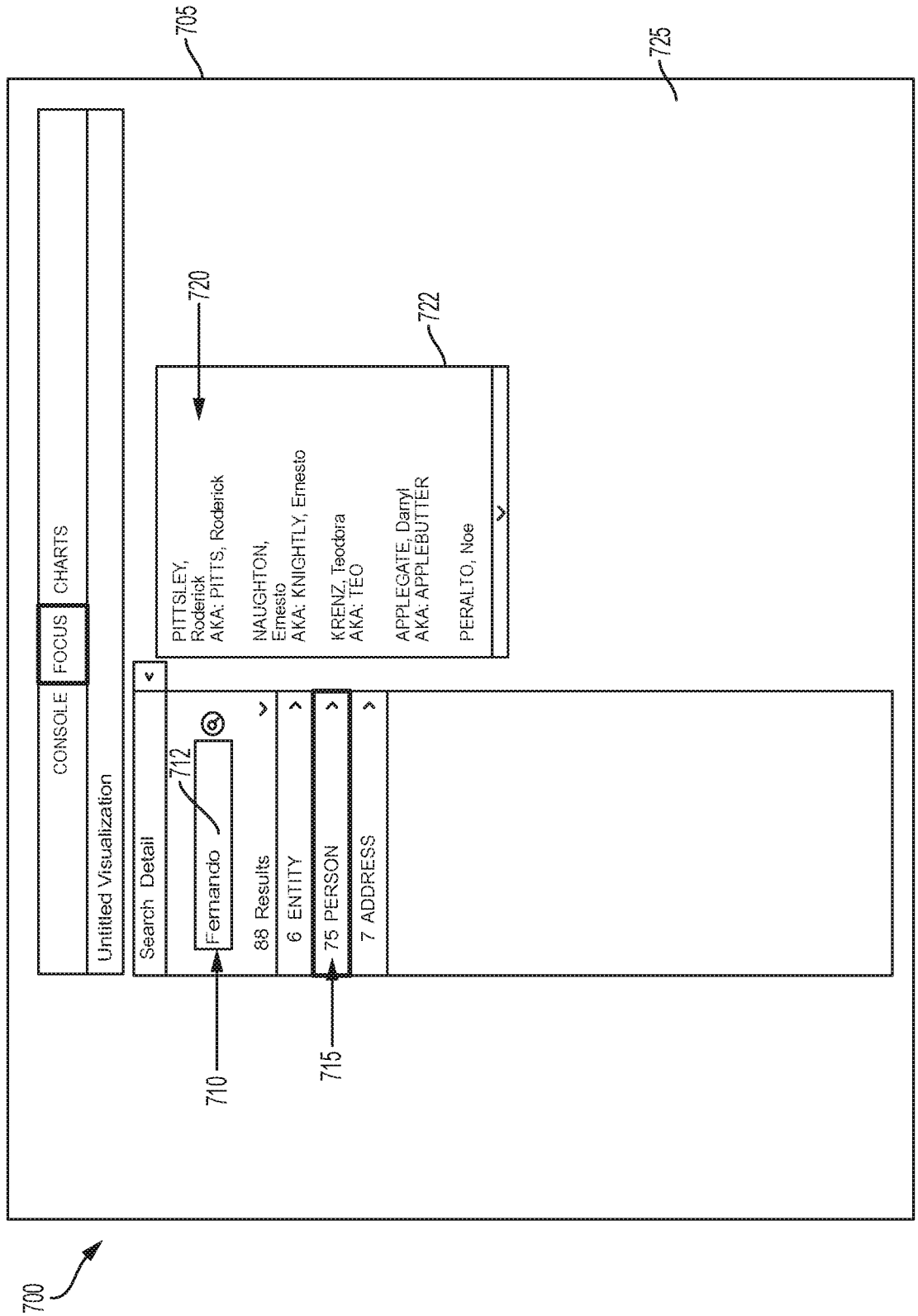

FIGS. 7-11, 13, 14A, 15, and 16 depict illustrative screenshots of a graphical user interface 700 (FIG. 7) for customers and its operation through a software engine. Referring to FIG. 7, the graphical user interface 700 comprises a visual interactive interface 705. The visual interactive interface 705 includes a first command 710 configured to enter keyword searches on the external production environment. Customer conducts keyword searches for a node 712 by typing letters, numbers, symbols, marks, or a combination thereof in the first command 710 and the interface 705 displays the search results 715 in categories. The categories include an entity category, a person category, an address category, or other categories. Each category includes nodes of the corresponding category that match the keyword search. The search results include nodes that are similar or match the keyword search node 712. The interface 705 displays the number of results (or nodes) in each category and the total number of results (or nodes) of all the categories. The results delivered in response to the keyword search 712 can include any type of node, including any corridor endpoint node. Customer may select a category to view all the results 720 in that category from the interface 705. In FIG. 7, the customer selects the person category and the interface 705 displays the nodes 720 in that category in a window 722. The interface 705 includes buttons, tabs, windows, screens, and other mechanisms to receive customer selection and to display search results. The interface 705 also includes an electronic workspace 725 to which nodes can be added and displayed via visual graphical elements. The interface 705 is software that is implemented and running on a computer using computer instructions that are stored in memory that, when executed by a processor, displays or provides the graphical and user-interactive features described herein (wherein the user can interact with the interface using an input device of the computer such as a keyboard). This includes the situation where the interface 705 is provided through a web browser such as when a customer or analyst logs into the platform from their Internet browser running on their computer over an Internet connection to the platform. The interface 705 is configured to implement the various related features described herein.

Figure 8:
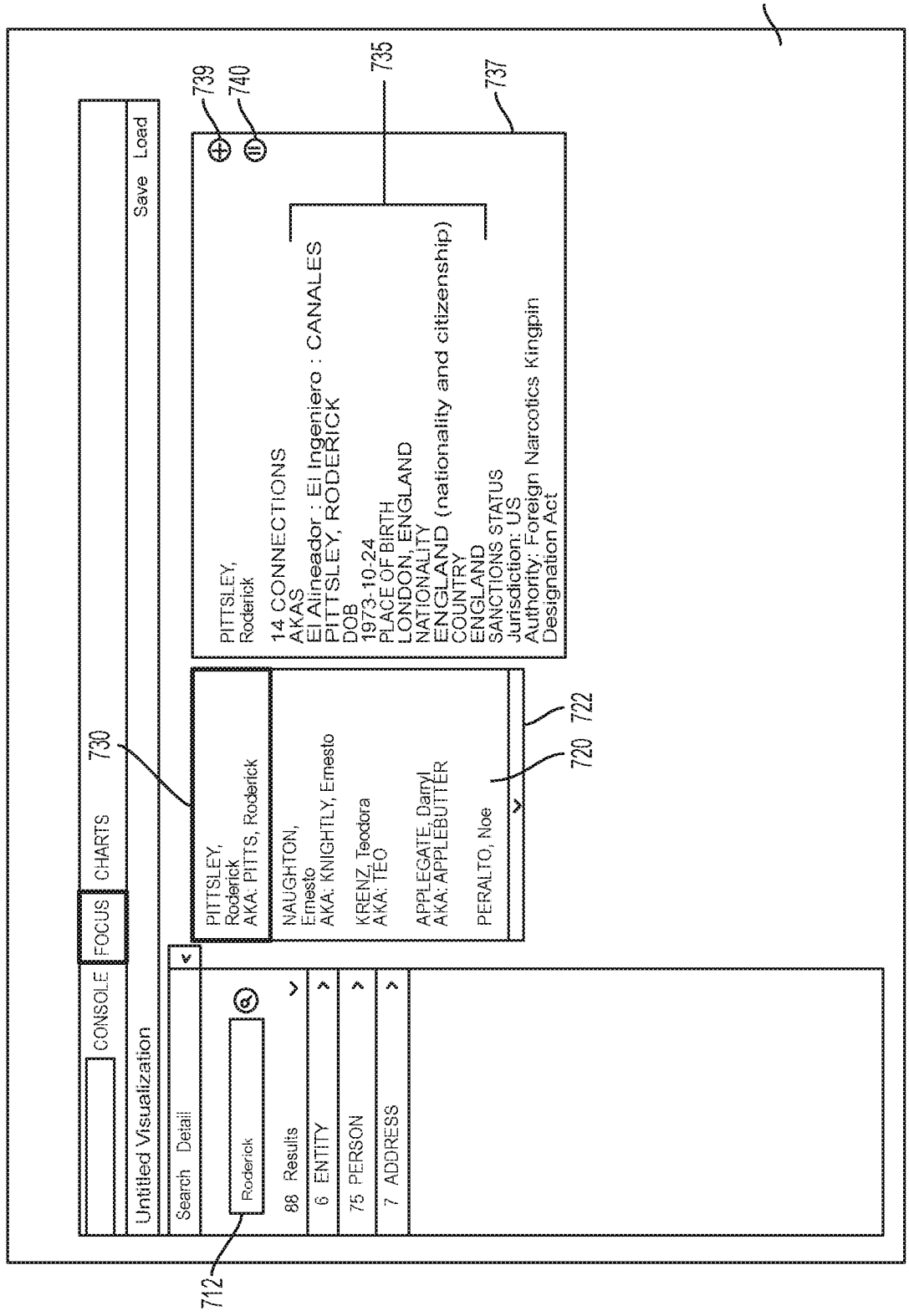

From the search results 720, the customer may select a displayed node 730 to view additional information 735 about the selected node 730 as shown in FIG. 8. Additional information 735 helps the customer decide if the selected node 730 matches the keyword search 712 or the node the customer intends to investigate for sanctions-related risks. The nodes in each category have their corresponding additional information. For example, additional information 735 of the person category may include a total number of connections (explained below), the real name, alias, date and place of birth, nationality, resident country, sanctions status of the person, and other information. Sanctions status information may include the jurisdiction (e.g., country or state) that sanctioned the person or entity represented by the node, the date the person committed the illegal act, and other information. Additional information 735 is displayed in another window 737 configured with one or more commands 739, 740 to add the selected node 730 to the electronic workspace 725. The command 739 may allow the customer to add and place a node on the workspace 725 immediately upon clicking the command 739. The location of the node is determined by the software engine 145. The location can be subsequently changed by the customer if needed. The command 740 may allow the customer to drag a node onto the workspace 725. Upon clicking and holding the mouse on the command 740, the selected node may be affixed to the mouse cursor and be moved along with the mouse cursor. The location of the node is determined by the customer and the customer can move the node to a location he or she desires. The node can be placed at the desired location upon releasing the mouse at the desired location. The node that appears on the workspace 725 is the visual graphical element of the node generated by the software engine 145. The visual graphical element of the node is referred to as node in the description of FIGS. 7-16 for the ease of reading the instant application. Adding a node to the electronic workspace 725 (visual workspace) may also be referred to as adding a node to the workspace.

Figure 9:
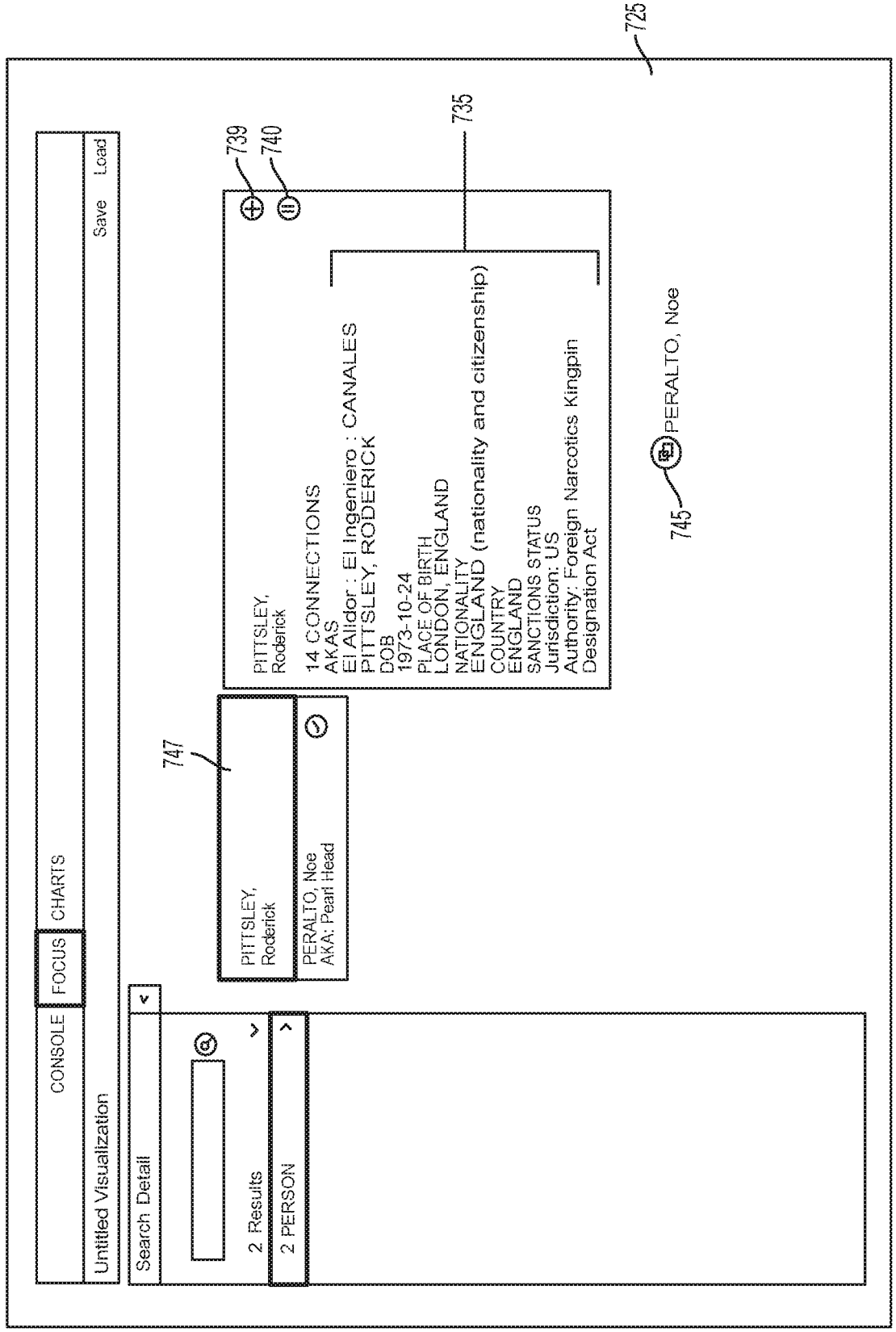

FIG. 9 depicts an illustrative visual interactive interface displaying a node 745 (a node that has been displayed on the workspace 725 by the user interacting with the interface). The customer may select another node 747 to add to the workspace 725. The node 747 may be one of the connections (explained below) of the node 745 or another node searched by the customer. The customer may view the additional information 735 and decide whether to add the node 747 to the workspace 725 via the command 739 or 740.

Figure 10:
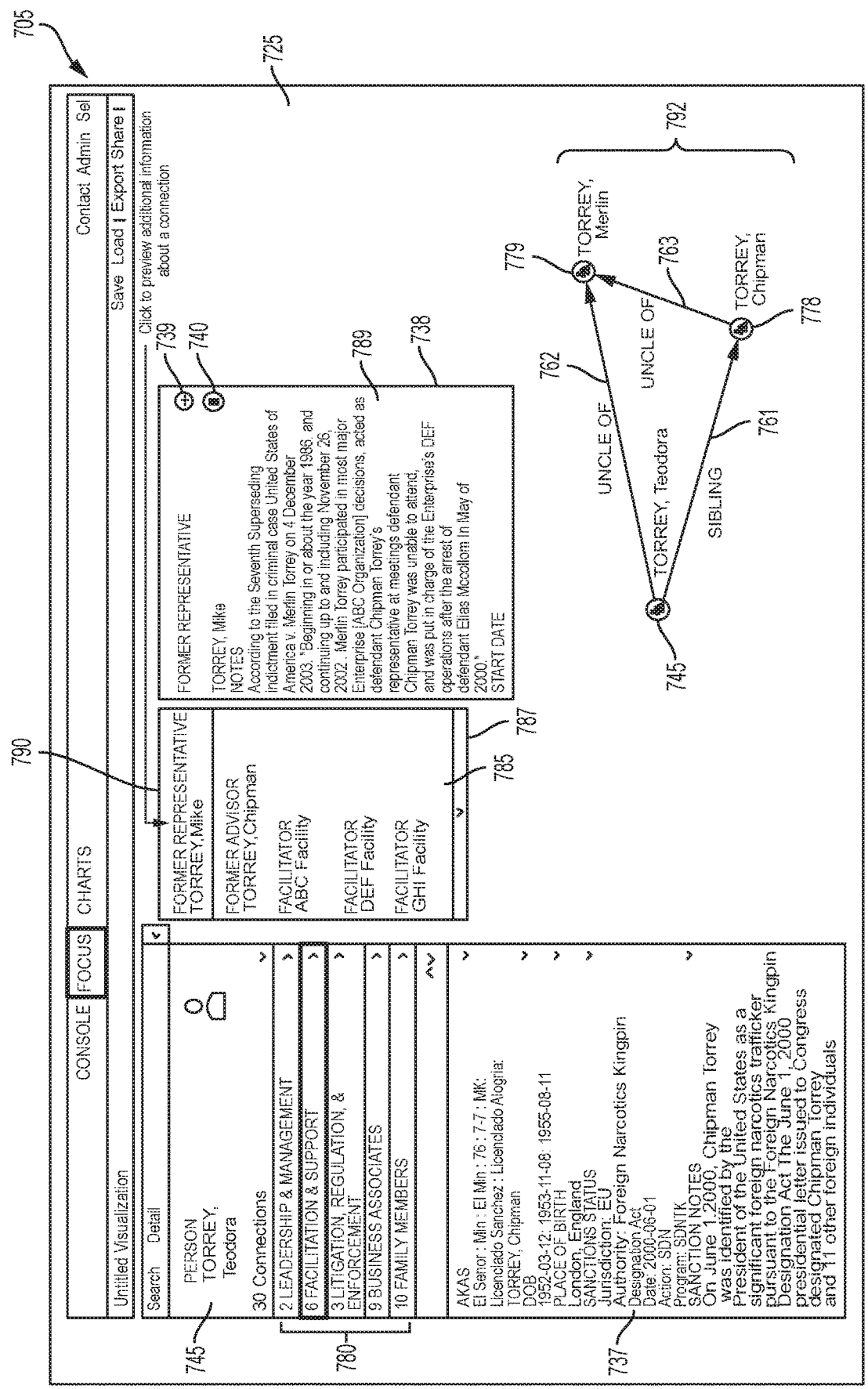

FIG. 10 depicts adding additional nodes 778, 779 to a node 745. Upon adding a node 745, the customer may view connection information 780 of the node 745 by selecting the node 745 on the workspace 725. In this example, the subject of the node 745 is a person. The connection information 780 includes nodes connected to the node 745, and the visual interactive interface 705 also displays the connected nodes in categories 780. A connected node is a node that has an edge connection to the displayed node. The categories are based on the relationship of the connected nodes to the node 745 (displayed node that is clicked on/selected by the user resulting on the system retrieving relationship information, instantly). The categories for relevant nodes connected to a displayed node (e.g., node 745) may include a leadership & management category, a facilitation & support category, a litigation, regulation enforcement category, a business associates category, and a family members category. The interface 705 displays the number of relevant nodes in each category and the total number of relevant nodes of all the categories. The total number of relevant nodes of all the categories is also the total number of connections the node 745 has. The interface 705 also displays the additional information 737 about the added node 745 in conjunction with the connection information 780. The customer may select a category to view all the relevant nodes 785 in that category from the interface 705. In FIG. 10, the customer selects the facilitation & support category and the interface 705 displays the relevant nodes 785 in that category in a window 787. To clarify, in the context of the interface 705, the system permits the user to search and add nodes to the workspace 725 that fall in the category of nodes that have no risk relevance for the purpose of corridor generation. These can also be found as part of connected nodes to a displayed node (e.g., when a user clicks on the displayed node and the system provides relationship information). This can add another dimension of visual information that can aid the user. With respect to associated corridors, corridors that are retrieved and listed for node 745 when the customer selects node 745, contain only the nodes or edges in resulting pathways that were identified by the node traversal process to produce corridors, which was performed before this information is made available on the external production environment.

From the connected nodes 785, the customer may select a node 790 to view additional information 789 contained in window 738 about the node 790. The additional information 789 includes the name of the connected node 790 and a description of the relationship between the connected node 790 and the node 745. Additional information 789 helps the customer decide if the connected node 790 should be added to the workspace 725 to view their relationship in a graphical form. Window 738 is configured with one or more commands 739, 740 to add the connected node 790 to the workspace 725. The commands 739, 740 operate in the same manners discussed above. Relevant nodes 778, 779 are illustrative nodes added via the steps explained above. When the nodes 778, 779 are added to the workspace 725, their corresponding edge connections 761-763 to the nodes 745, 778, and 779 are also added to the workspace 725. The edge or edge connection that appears on the workspace 725 is the visual graphical element of the edge or edge connection generated by the software engine 145. The visual graphical element of an edge or edge connection is referred to as an edge connection in the description of FIGS. 7-16 for the ease of reading the instant application. The nodes 745, 778, 779 and the edge connections 761-763 create a visual graphic 792. The visual graphic 792 can be created with any number of nodes and edge connections. The structure or shape of the visual graphic 792 can be changed by moving a node to a different location on the workspace 725 to arrange the nodes and their relationships in different manners and to facilitate the understanding of their relationships. When a node is being moved to another area, the corresponding edge connection remains connected to the displayed node during the moving process. When the node is moved to another area, and the edge connection is also moved to another area.

Figure 11:
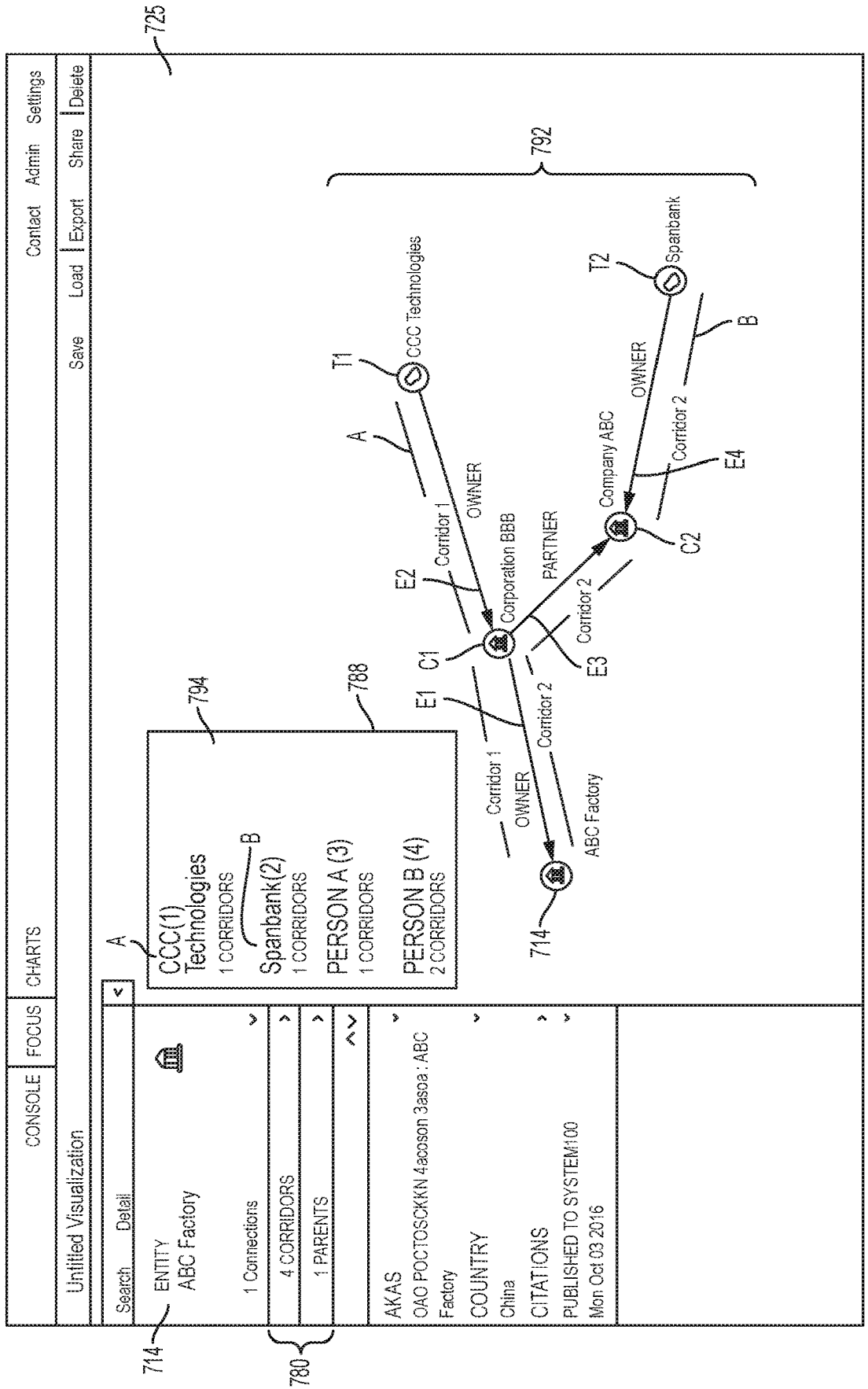

When a node 714 has corridors, the connection information 780 also includes corridor information and corridors are stored in a corridor category for selection and display as shown in FIG. 11. When the customer selects the corridor category, the interface displays corridors 794 in a window 788. The corridors 794 are the resulting corridors from the second subsystem. The corridors 794 may be ranked by the determined degree of relevance and be displayed based on the rank. The corridors 794 may be displayed with the one having the highest degree of relevance first and with the remaining ones arranged in a descending order. The corridors 794 may also be displayed in other orders. The interface may also display the corridors 794 with a measurement (e.g., (1), (2), (3), (4)) indicating the number of connecting nodes between the displayed node and the corridor endpoint node.

From the displayed corridors 794, the customer may select and add a corridor to the workspace 725. The selected corridor is visually illustrated in the workspace 725. The corridor is generated and presented with nodes and edge connections and their corresponding graphical elements. For example, when corridor A is added, corridor A is produced with edge connection E1, connecting node C1, edge connection E2, and corridor endpoint node T1. For another example, when corridor B is added, corridor B is produced with edge connection E1 (if not already produced or if corridor A is not added yet), connecting node C1 (if not already produced or if corridor A is not added yet), edge connection E3, connecting node C2, edge connection E4, and corridor endpoint node T2. Although the node 714 is not mentioned in the above corridors, it is also part of the corridor. The line associated with the corridor is used to illustrate the path of the corridor and it may or may not be displayed on the interface. The interface allows the customer to add one or more corridors for the node 714. The subject of the node 714 is an entity, and the customer can evaluate financial crime and sanctions-related risks associated with the entity from the visual graphics 792.

Figure 12:
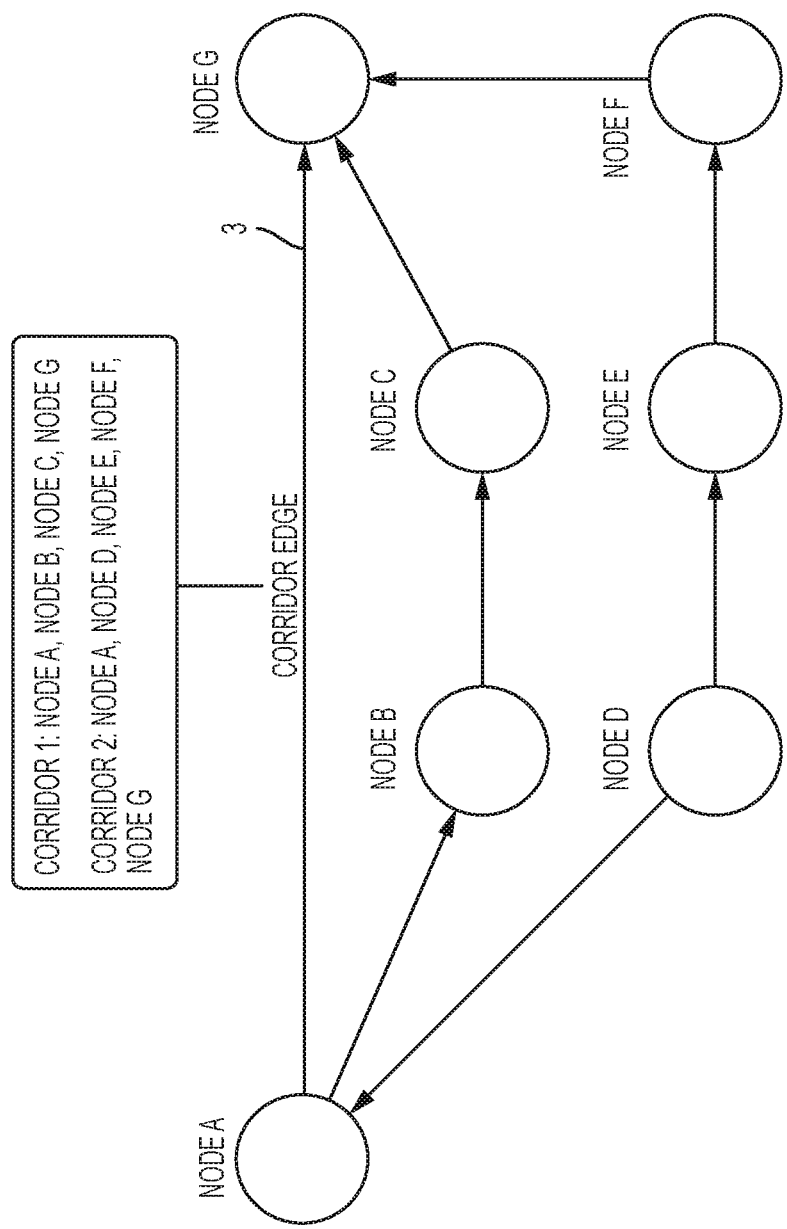
FIG. 12 depicts additional illustrative corridors and an illustrative corridor edge in accordance with some embodiments of the present invention.

FIG. 12 depicts additional corridors 1 and 2 and corridor edge 3 to illustrate the concept of corridors. Corridors 1 and 2 are pathways between node A and corridor endpoint node G. Corridor edge 3 is an edge that stores corridors 1 and 2 using nodes and properties. For simplicity, only the nodes involved are mentioned (not the edge connections). Corridor 1 includes node A, connecting node B, connecting node C, and corridor endpoint node G. Corridor 2 includes node A, connecting node D, connecting node E, connecting node F, and corridor endpoint node G.

Additional information depicted in 735 (FIG. 9), 789 (FIG. 10) and connection information depicted in 780 (FIG. 10) are derived from the accompanying information or the relevant information an analyst entered during the input step discussed above.

Figure 13:
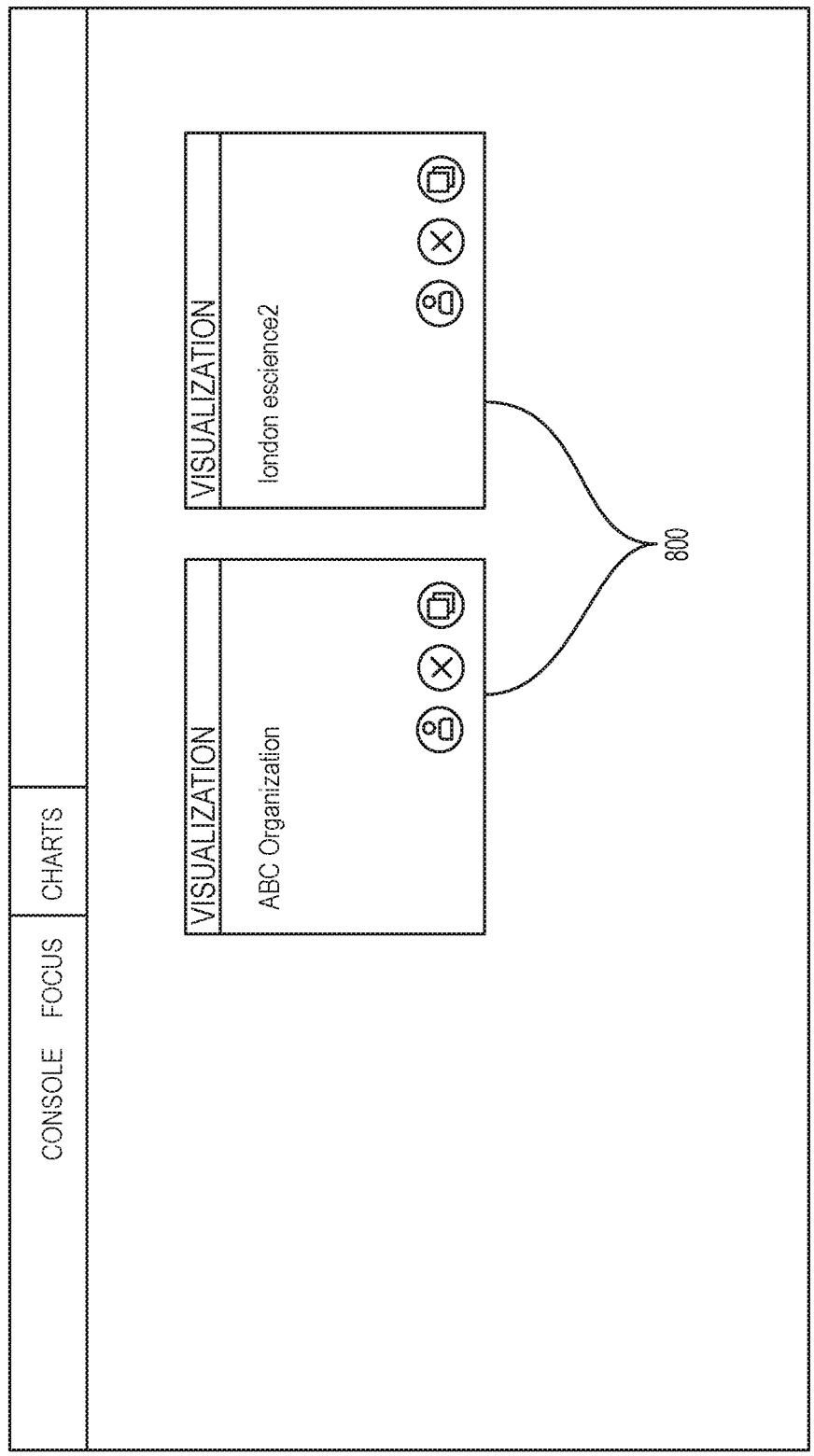
Figure 14A:
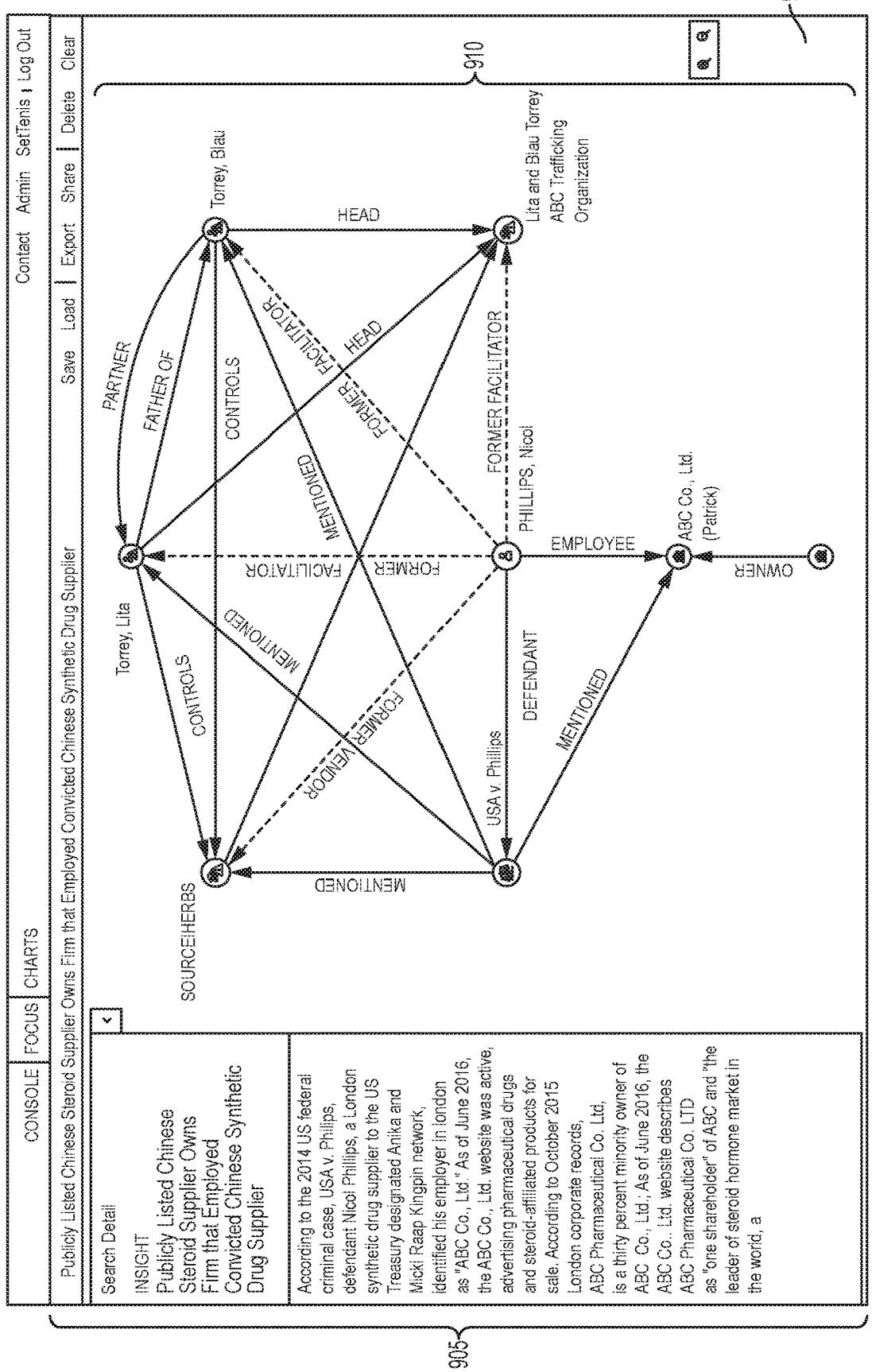

The visual interactive interface also allows the customer to save created visual graphics 800 in the external graph database, load previous created and saved visual graphics 800 from the external graph database, and share created visual graphics 800 with other individuals as shown in FIG. 13. Each saved visual graphic 800 may be referred to as a chart. The visual interactive interface also allows the customer to export created visual graphics and the accompanying information to a particular file format (e.g., PDF, Word, Powerpoint, etc.) for saving or communicating with another computer system. The visual interactive interface also allows the customer to view charts or insights specifically created by an analyst. An insight is a specific research conducted by analyst for a particular subject or certain relationships that are illustrative, instructive, interesting, or unique. FIG. 14*a* depicts an illustrative insight 900. The insight 900 includes a short summary 905 and a visual graphic 910 representing the summary 905. The insight may be provided to a customer only if an insight is relevant to or contains information that has appeared in the customer's search or work history or the customer's previous inquiries. The insight may also always be provided to customers whenever it is created by analyst.

Figure 14B:
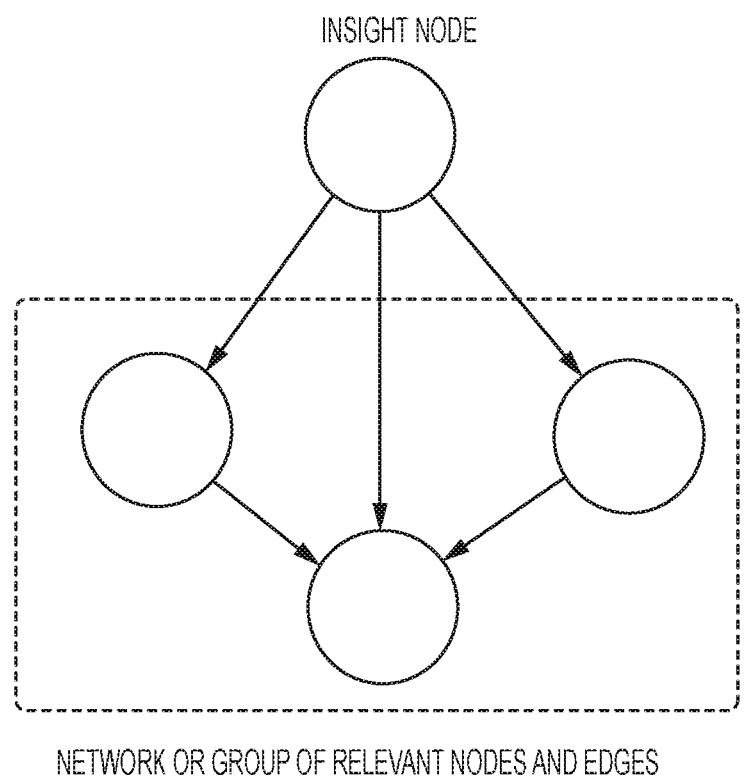
FIG. 14B depicts an illustrative structure for constructing the visual graphic of an illustrative insight in accordance with some embodiments of the present invention.

An insight is created through an insight node with insight edges and relevant nodes and properties. An insight node is created by an analyst in the internal production environment and may be published to the external production environment. An insight is intended to provide a brief summary so the visual graphic should have only a certain amount of complexity. An insight node and relevant nodes selected by analyst may have a limited number of edges or may be a node having a plurality of edges but only a few of them are used by analyst. The insight node, relevant nodes, and edges are created to form a narrative or description that corresponds to the brief summary. FIG. 14*b* depicts an illustrative structure for constructing the visual graphic of an insight.

Figure 15:
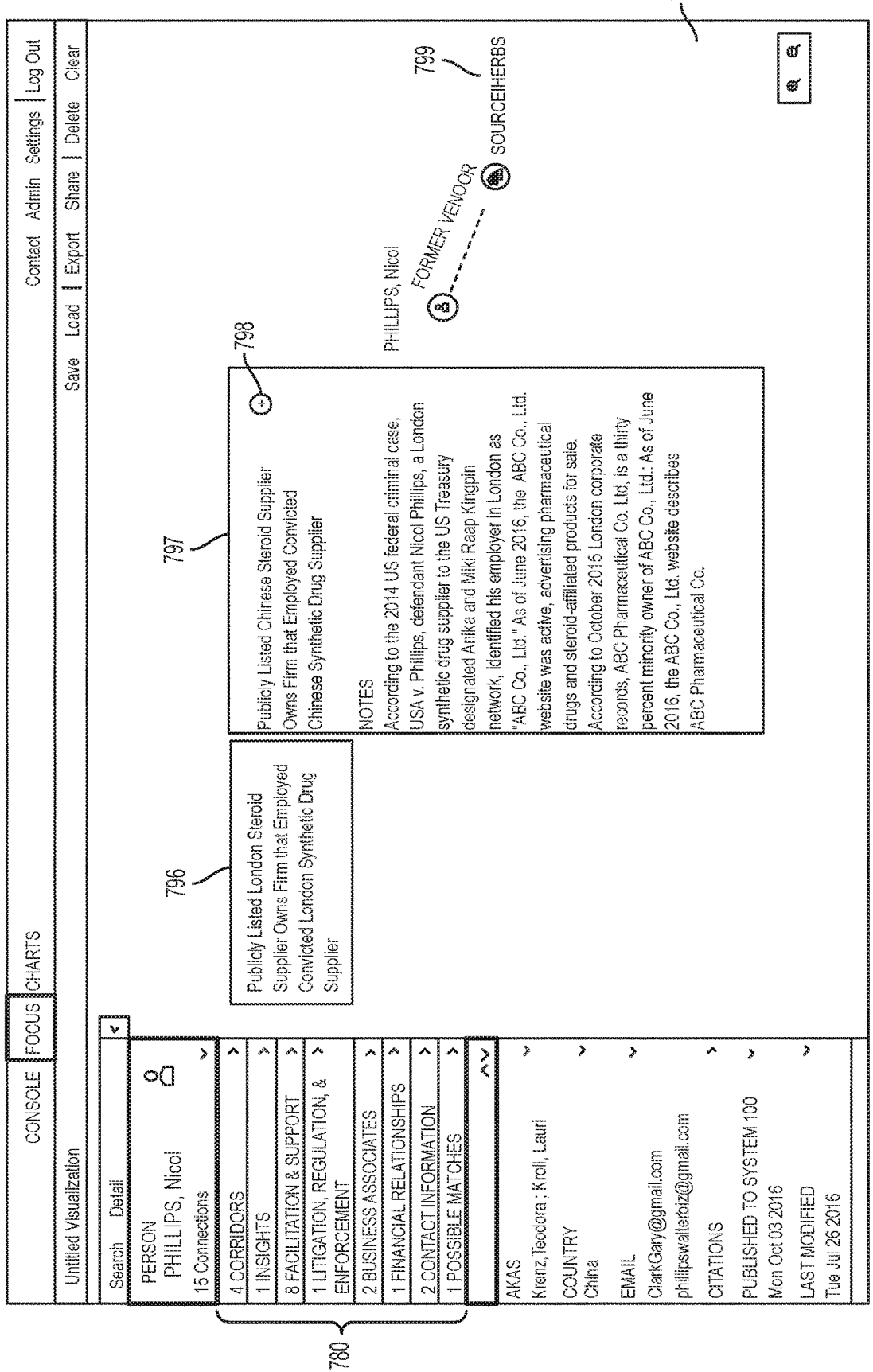

The interface may provide insights to customer through two locations. The customer may access insights from the connection information 780 as shown in FIG. 15. The connection information 780 includes an insight category, and insights associated with a node will be displayed in a window 796. Upon selecting from the displayed insights in 796, the customer may view a short summary of the selected insight in another window 797 configured with a command 798 to add its visual graphic 799 to the workspace 725.

The customer may also access insights from a location 930 that stores and displays insights as shown in FIG. 16 among other things, without the customer first querying a node or obtaining the connection information. The stored insights may be divided into different categories and the customer may select a category 935 to view insights 940 in that category. Each insight 945 may be depicted as a small window 945 displaying a portion of the brief summary. The window 945 is configured with a command 950 that can access the entire brief summary and the associated visual graphic.

The system 100 also includes a third subsystem 150 (FIG. 1) configured with a list graph that enables bulk exporting of tailored subsets of data and a fourth subsystem 155 (FIG. 1) configured to provide user authorization and secure communications. The list graph in the third subsystem 150 receives data from the publish flow 133 (FIG. 1) from the internal production environment 115 (FIG. 1). The list graph in the third subsystem 150 is configured to allow internal users to apply advanced query searches to identify all nodes in the list graph that meet customer specified requirements. For example, a customer may want a list of all nodes that are identified as majority owned by corridor endpoint nodes; or for example, a customer may want a list of all nodes that are identified as officers or directors of corridor endpoint nodes. To identify nodes matching customer specified requirements, the corridor endpoint node may serve as the starting node from which the relationships are traversed (rather than querying a node that is related to a corridor endpoint node and that does not appear on a sanctions list). The certain subset of information and work produced by executing customer specified queries on the third subsystem 150 can be exported in bulk to a particular type of file and/or distributed by other means. The exportation allows individuals to access the information without using the external production environment 120.

The fourth subsystem 155 is configured to provide user authorization and secure communication. The fourth subsystem 155 can determine whether a user is authorized to access the system 100 and the level of access of the user. User can be analyst, customer, administrator, or other individuals. Analyst refers to individuals who use the internal production environment (including the internal graph database) or who build a database of financial crime and sanctions-related information. Customer refers to individuals who access the external production environment (including the external graph database) via a web portal or who evaluate financial crime-related and sanctions-related risks based on the information built by analyst. Analyst and customer may not have access to the other's environment and graph database. Administrator refers to individuals who monitor and maintain the system 100 to ensure that the system 100 is operating in the correct manner. Administrator may also be individuals who can grant access to analyst and customer. The technology of the fourth subsystem 155 may be based on security API and may include protocols such as RDS MySQL, LDAP, OAuth2, and other protocols.

FIG. 17 depicts another illustrative computer-implemented system 1000 for providing a visual interactive software tool that permits user to investigate and evaluate financial crime and sanctions-related risks. The system 1000 comprises an internal production environment 1005 and an external production environment 1010. The internal production environment 1005 includes an analyst toolset 1022 and an internal graph database 1024. The analyst toolset 1022 includes the electronic online workspace for analysts 130 in FIG. 1. The internal production environment 1005 also includes the software engine 135 in FIG. 1, and the software engine 135 may be part of the analyst toolset 1022. The analyst toolset 1022 communicates with the internal graph database 1024 to save and access the information and work analyst produced from the workspace 130. The internal graph database 1024 is configured to feed or publish the information and work the analyst produced to the external production environment 1010 or external graph databases 1040, 1042 (customer graph database). The publication process is performed by the second subsystem, and the second subsystem may be part of the internal graph database 1024 or the internal production environment 1005. The external graph databases may include one 1040 dedicated to customer web portal 1044 and one 1042 dedicated to bulk exporting of tailored subsets of data. Customer may log into the external production environment 1010, or the platform for customers 140 shown in FIG. 1, via the portal 1044. The communication between customer and the platform 140 and between the customer web portal 1044 and the internal graph database 1024 may be based on an application programming interface (API) to determine whether a customer is an authorized user and to ensure that the communications are secure. The customer platform 140 communicates with the external graph database 1040 to access the information and work analyst produced and to save the work customer produced from the platform 140. The external graph database 1042 is configured to allow bulk exporting of tailored subsets of data or files containing the information and work analyst produced. The lists may be exported periodically from the database 1042 and for distribution. Exported lists allow individuals to view information and work analyst produced without the individuals keyword searching through the external production environment 1010.

In some embodiments, databases 1040 and 1042 may be one single database configured to be accessible by customer web portal 1044 and to export lists 1046. The external production environment 1010 also includes the software engine 145 in FIG. 1 to perform the operations of the platform 140.

Figure 18:
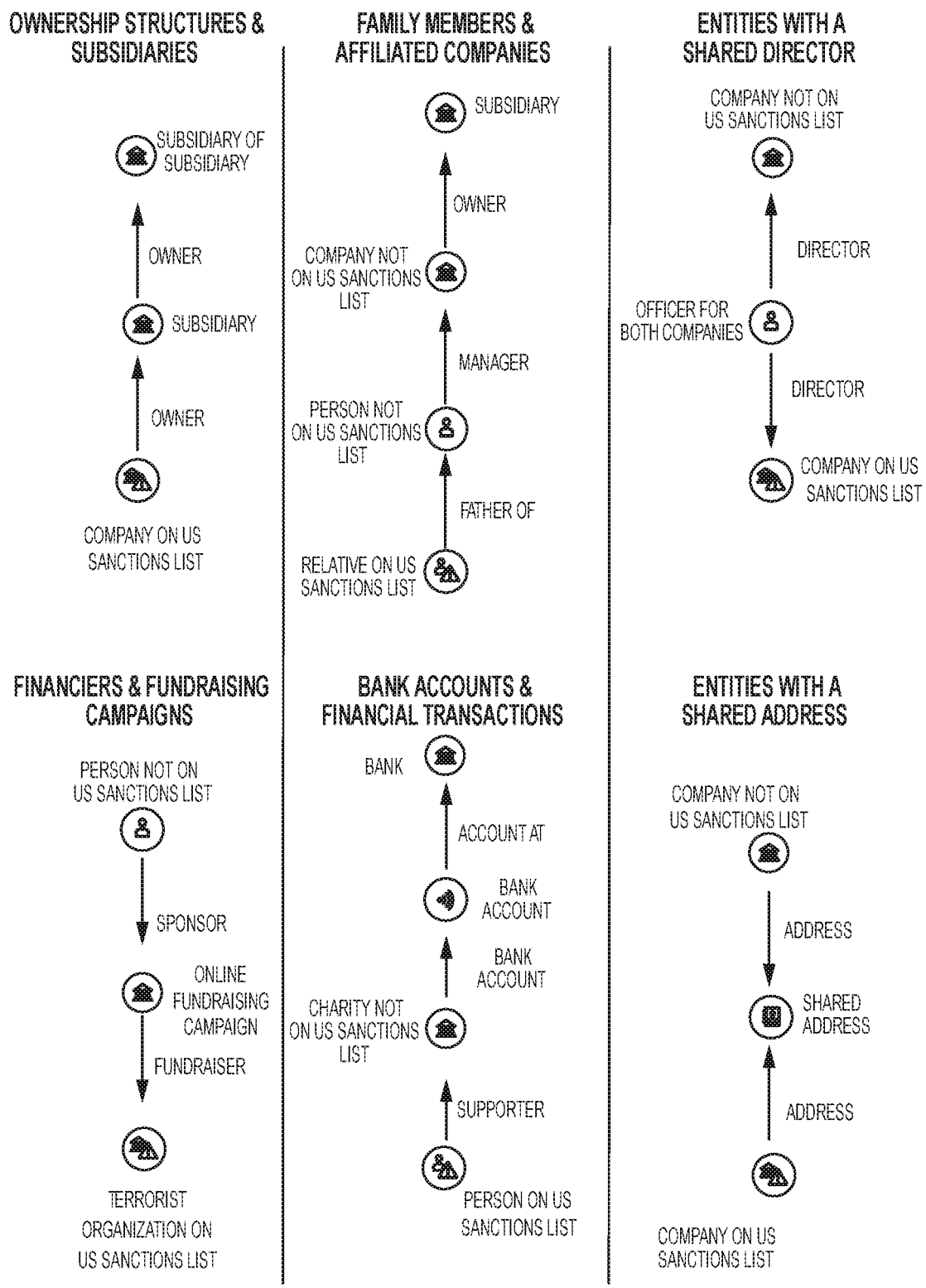
FIG. 18 depicts additional illustrative corridors that have certain types of relationships in accordance with some embodiments of the present invention.

FIG. 18 depicts additional illustrative corridors that have certain types of relationships. The types of relationships may include ownership structures & subsidiaries, family member & affiliated companies, entities with a shared director, financiers & fundraising campaigns, bank accounts & financial transactions, entities with a shared address, and other types of relationships.

Figure 19:
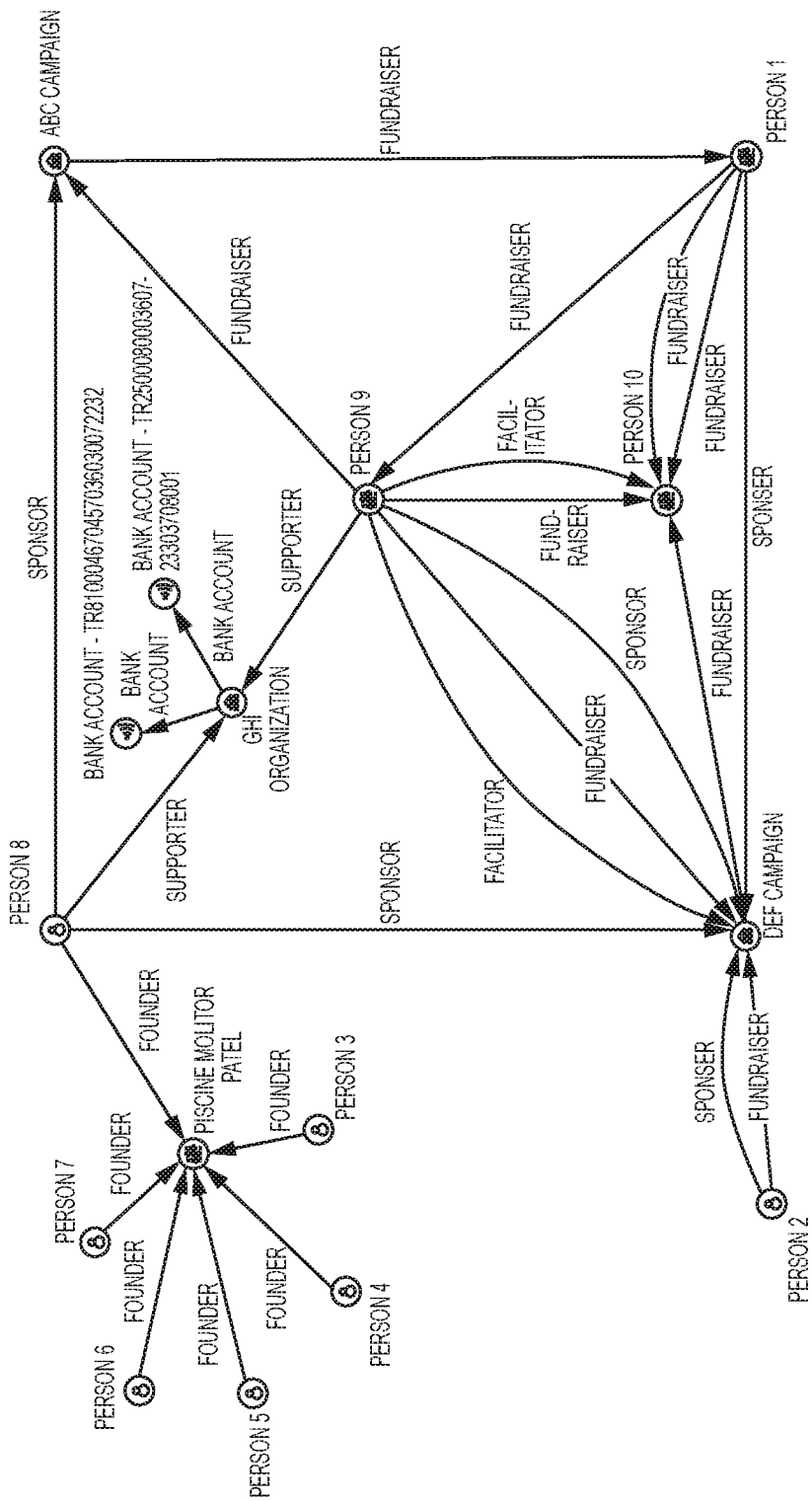
FIG. 19 depicts an illustrative visual graphic of one or more identified nodes in accordance with some embodiments of the present invention.

FIG. 19 depicts an illustrative visual graphic of one or more nodes. The complexity of the visual graphic may depend on the number of nodes and edges involved. From FIG. 19, the customer can visually determine the relationships between different nodes, view their properties and evaluate financial crime and sanctions-related risk. The visual graphic can include additional nodes and edges if there are additional relevant nodes or if the customer adds more nodes.

Each of the system 100, the internal and external production environments, the graph databases, and the subsystems in FIG. 1 can be implemented on one or more computer systems and be configured to communicate via a network connection. They all may also be implemented on one single computer system. In either situation, the computer system(s) can communicate with analysts' computers and customers' client devices. The computer system(s) may also be referred to as servers. The computer system(s), the analyst's computer, and the customer's client device may adopt the following computer system.

In one embodiment, the computer system includes a bus or other communication mechanism for communicating information, and a hardware processor coupled with bus for processing information. Hardware processor may be, for example, a general purpose microprocessor.

The computer system also includes a main memory, such as a random access memory (RAM) or other dynamic storage device, coupled to bus for storing information and instructions to be executed by processor. Main memory also may be used for storing temporary variables or other intermediate information during execution of instructions to be executed by processor. Such instructions, when stored in non-transitory storage media accessible to processor, render computer system into a special-purpose machine that is customized to perform the operations specified in the instructions.

Computer system further includes a read only memory (ROM) or other static storage device coupled to bus for storing static information and instructions for processor. A storage device, such as a magnetic disk or optical disk, is provided and coupled to bus for storing information and instructions.

Computer system may be coupled via bus to a display, such as a cathode ray tube (CRT), for displaying information to a computer user. An input device, including alphanumeric and other keys, is coupled to bus for communicating information and command selections to processor. Another type of user input device is cursor control, such as a mouse, a trackball, or cursor direction keys for communicating direction information and command selections to processor and for controlling cursor movement on display. This input device typically has two degrees of freedom in two axes, a first axis (e.g., x) and a second axis (e.g., y), that allows the device to specify positions in a plane.

Computer system may implement the techniques described herein using customized hard-wired logic, one or more ASICs or FPGAs, firmware and/or program logic which in combination with the computer system causes or programs computer system to be a special-purpose machine. According to one embodiment, the techniques herein are performed by computer system in response to processor executing one or more sequences of one or more instructions contained in main memory. Such instructions may be read into main memory from another storage medium, such as storage device. Execution of the sequences of instructions contained in main memory causes processor to perform the process steps described herein. In alternative embodiments, hard-wired circuitry may be used in place of or in combination with software instructions.

The term storage media as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device. Volatile media includes dynamic memory, such as main memory. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus. Transmission media can also take the form of acoustic or light waves, such as those generated during radio-wave and infra-red data communications.

Various forms of media may be involved in carrying one or more sequences of one or more instructions to processor for execution. For example, the instructions may initially be carried on a magnetic disk or solid state drive of a remote computer. The remote computer can load the instructions into its dynamic memory and send the instructions over a telephone line using a modem. A modem local to computer system can receive the data on the telephone line and use an infra-red transmitter to convert the data to an infra-red signal. An infra-red detector can receive the data carried in the infra-red signal and appropriate circuitry can place the data on bus. Bus carries the data to main memory, from which processor retrieves and executes the instructions. The instructions received by main memory may optionally be stored on storage device either before or after execution by processor.

The computer system also includes a communication interface coupled to bus. Communication interface provides a two-way data communication coupling to a network link that is connected to a local network. For example, communication interface may be an integrated services digital network (ISDN) card, cable modem, satellite modem, or a modem to provide a data communication connection to a corresponding type of telephone line. As another example, communication interface may be a local area network (LAN) card to provide a data communication connection to a compatible LAN. Wireless links may also be implemented. In any such implementation, communication interface sends and receives electrical, electromagnetic or optical signals that carry digital data streams representing various types of information.

Network link typically provides data communication through one or more networks to other data devices. For instance, network link may provide a connection through local network to a host computer or to data equipment operated by an Internet Service Provider (ISP). ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface, which carry the digital data to and from computer system, are example forms of transmission media.

Computer system can send messages and receive data, including program code, through the network(s), network link and communication interface. In the Internet example, a server might transmit a requested code for an application program through Internet, ISP, local network and communication interface.

The received code may be executed by processor as it is received, and/or stored in storage device, or other non-volatile storage for later execution.

In some embodiments of the present invention, an alternative use of graph databases can be provided to end users (customers) while retaining the power of the system and being able to surface highly relevant information for the customer. Due to different operational use cases or other reasons, including technical reasons, customers may want to use a complimentary alternative to the application of the graph database or the related interactive interface previously described. These reasons can be because of the need for financial institutions and companies to identify and receive data about subsets of actors that are associated with sanctioned actors or other actors of interest according to specific criteria. Financial institutions and other companies are prohibited from providing services to or conducting business with sanctioned actors and certain other materially associated parties. The data are used in a different operational use case where financial institutions and companies screen customers, transactions, and/or counterparties to determine if they have material associations with sanctioned actors. Financial institutions and companies incorporate data about this subset of actors into their operations to screen for possible exposure to sanctions or illicit activity, or to perform other analytics.

The system can be configured to include a tool that is configured to permit the selection of a criteria to perform a customized navigation, such as traversal in accordance with an algorithm that traverses by a particular edge type, or combination of edge type, node types, and properties, to find nodes of a certain type that are of interest to the customer. The system provider or customer can select the criteria and the system is configured to apply the criteria to the graph database of the external product environment of the system, for example. The traversal can involve starting from a node of interest (e.g., a sanctioned node, a node that does not appear on a sanctions list but is associated with a sanctioned node, a node that presents financial crime and sanctions-related risks but does not appear on a sanctions list, or a non-sanctioned node that the provider or customer wishes to investigate) and only traversing an edge if its immediately connected edge meets the specified criteria. The traversal will end if there is no connected edge that meets the criteria (e.g., that edge type). An edge is a particularly suitable criterion but other criteria are contemplated and in some cases, the traversal can traverse multiple nodes and check multiple properties as long as the criteria is satisfied as the traversal proceeds through a node and its edges. Examples of this are further described below.

Nodes that meet the criteria are identified and information associated with that node such as name and related information are output in a structured data extract that can be ingested into other computers. The structured data extract includes information represented in the form of data structures (e.g., graph, tree, queue, stack, linked list, array, etc.) and the data structures are arranged according to a data structure hierarchy standard (e.g., JSON, XML, CVS, etc.) Edge information may not be presented as a record in the extract but the extract can include other textual information about the nature of a relationship. This is because one objective is to generate a simple structured data extract, for example a list in table format, that may be ingested by third party systems that integrate with conventional file formats or spreadsheet applications. In one embodiment, the system is further configured to generate a web link that includes a corresponding web link for each node in the list. The web link for each node on the list is automatically (and uniquely) generated to connect a user that receives the list to a website related to the results in the table. The system is configured to present a website when a web link is selected from a browser. The website recognizes the web link and automatically displays the path traversed that met the criteria for the node to be included on the list. In one embodiment, the system is further configured to generate a unique code for each node on the list. The identifier for each node on the list is automatically (and uniquely) generated to connect a user that receives the list to a user interface related to the results of the node corresponding to the identifier. The user may select the identifier to bring up the user interface with the appropriate information, or search the identifier in a field provided by a website implemented by the system provider in order to access that user interface. The unique code may include numbers, characters, symbols, or a combination thereof that are randomly generated (alphanumeric code). The list may also include both web links and unique codes for accessing the results. The website displays text that explains the reason for why the node was placed on the list and includes interactive options. The interactive capability includes selectable options specifying a criteria and the capability to display the pathway traversed to identify the node, including its relationship(s), that is part of the graph and that resulted in the node's selection to be on the list based on the criteria. The system allows the user to select different options to visually see additional types of relationship displayed together on the website. The system can be configured to select more than one criteria and for example provide a consolidated result to a customer.

With this approach, the customer can be provided with a simple interface or a list but is also given the ability to benefit from the power of the system and to visually see and interact over the Internet (for example) with a graph that shows the limited set of nodes and edges that caused the node to be on the list and further to be able to interact with the display in a simple way such as to add other relationships through a browser. Further examples of embodiments are provided herein.

Embodiments of the present invention can also explore an actor that appears on a sanctions list (e.g., sanctioned node) and identify actors that do not appear on a sanctions list but are associated with the sanctioned actor via certain relationships and present financial crime or sanctions-related risk (e.g., associated nodes). For ease of convenience, the text will refer to government issued sanctions (e.g., individuals or entities that are subject to direct government sanctions) but it is understood to also be applicable to financial crime (financial crime and sanctions-related risks can arise from directly or indirectly conducting or supporting financial transactions with entities under sanctions or otherwise engaged in illicit activity). An actor can be an individual or entity or another type of node. In general, embodiments of the present invention are particularly suited for sanctions and financial crimes applications but can be applicable in other areas (e.g., general embodiments are contemplated). In operation, the system, through the software engine, can start traversing from the sanctioned node (e.g., always starts from a sanctions node) through its connected edges and nodes and finds the associated nodes based on a specified criterion or traversal process. The sanctioned node, the associated node(s) (meaning those identified through traversal to meet the specified criteria), and the relationship(s) connecting the sanctioned node and the associated node(s) can be represented and saved as a subgraph according to the type of traversal (e.g., type of relationship or edge) used to identify the associated node(s). A subgraph is a graph obtained from the information stored in the graph database or from the overall graph constructed using a subset the information stored in the graph database. Subgraphs can be stored in the graph database. The data in a graph or subgraph can be visually represented using nodes, edges, and properties. The subgraph can be quickly accessed by the system in response to a request from users (analysts or customers) and provide users data surfacing or showing paths that survived a specified traversal process emanating from the sanctioned node (by way of a data table, graph data, or visual representation).

Figure 20:
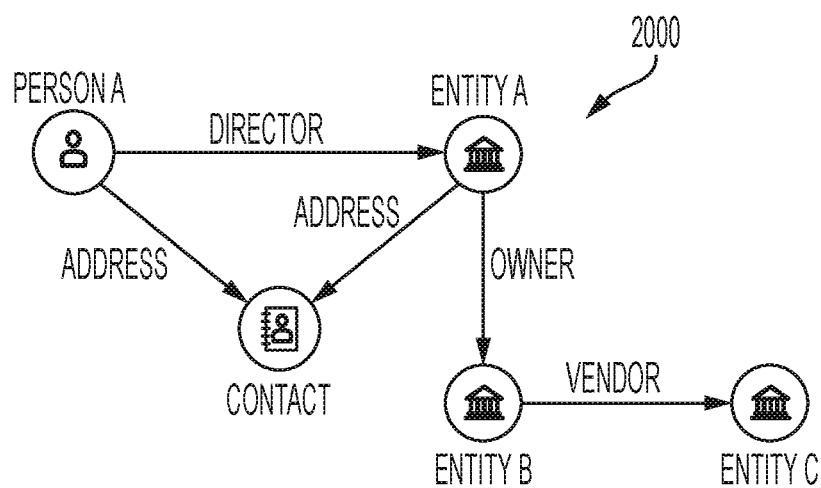
FIG. 20 depicts an illustrative research graph in accordance with some embodiments of the present invention.

As discussed earlier in the application, the system includes an internal production environment that allows analysts to enter information such as research data in the form of nodes, edges, and properties. For example, the analyst can input a node by entering the name of an entity, input another node by entering the name of another entity, and select the relationship between the two nodes. The analyst may not be aware that the information he entered includes sanctioned entities or individuals, or entities or individuals that are not sanctioned but are related to sanctioned entities or individuals. The nodes, edges, and properties entered by the analyst (or the information the analyst entered for the nodes, edges, and properties) are a subset of information of all the available information in the graph database, or form a research graph that is a subset of the overall graph. The entered information can be modeled according to a style guide and stored as a research graph. FIG. 20 depicts an illustrative research graph 2000.

The research graph 2000 may be a separate graph from the existing overall graph (e.g., if any of the nodes in the research graph 2000 do not already exist in the overall graph or cannot be connected with the overall graph) or a graph that can be integrated with the existing overall graph (e.g., person A node is already in the overall graph, and the nodes, edges, and properties other than person A node can be connected to the overall graph via person A node to expand the overall graph). A research graph may be referred to as a research subgraph because a research graph is part of the overall graph. The overall graph may include the existing overall graph and one or more research graphs (if the graphs cannot be integrated), or may be one overall graph where one or more branches of the overall graph are research graphs (if the graphs can be integrated).

The system is configured to receive financial crime and sanctions-related information. The information may include information from government-issued sanctions lists. Government-issued sanctions lists may include sanctions lists from different countries and organizations, such as US, UK, EU, UN, or any other sanctioning authority. Government sanctions lists or information identifies entities and individuals that have a sanctioned status. The system may be configured to communicate with the computer systems or servers that have sanctions information and receive sanctions information from those systems or servers on a regular basis. The system is also configured to create nodes, edges, and properties to represent entries on the sanctions list or other sanctions information. The resulting graph may be referred to as a sanctioned actor graph, a sanctions & enforcement graph, or a sanctions graph.

Figure 21:
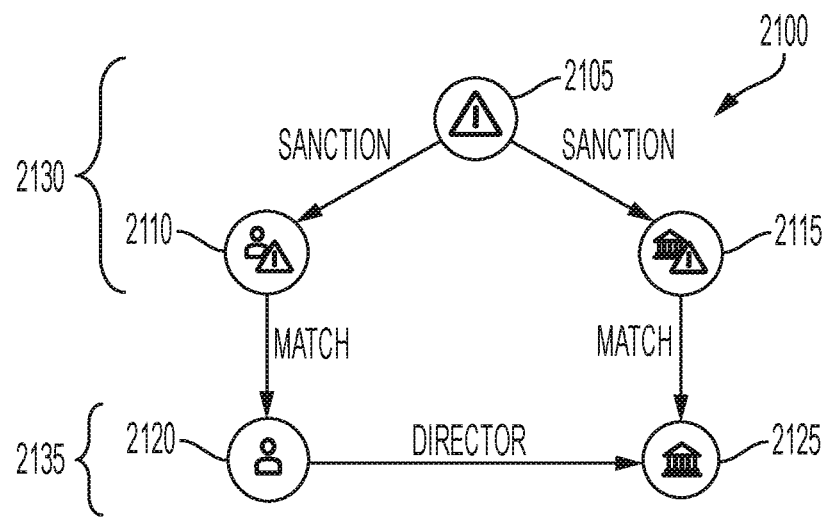
FIG. 21 depicts a graph including an illustrative sanctions graph in accordance with some embodiments of the present invention.

FIG. 21 depicts a graph 2100 including an illustrative sanctions graph 2130. The sanctions graph 2130 may be created to represent a US sanctions list 2105 that includes a sanctioned individual 2110 and a sanctioned entity 2115. The system can use the sanctions graph to determine whether a node in the research graph is a sanctioned node. If a node in the sanctions graph matches a node in the research graph, then the system identifies the node in the research graph as a sanctioned node. In one embodiment, the system may identify the node in the research graph as a sanctioned node by using an edge or a matched edge to connect the sanctions graph node and the research graph node. The connection allows the system, overall graph, or research graph to know that the research graph node is a sanctioned node. For example, the system may determine that the sanctioned individual 2110 matches person A in the research graph of FIG. 20 (person 2120 in FIG. 21) and that the sanctioned entity 2115 matches entity A in the research graph of FIG. 20 (entity 2125 in FIG. 21) and use a matched edge to connect the node 2110 and 2120 and a match edge to connect the node 2115 and node 2125. As such, the sanctions graph 2130 or part of the sanctions graph 2130 is connected to the research graph 2135 via the matched edges. FIG. 21 only shows a portion of the research graph 2000 (i.e., person A depicted by reference number 2120 and entity A depicted by reference number 2125).

The connection between a sanctioned node and a research graph node imparts the research graph node a status that enables the software engine to know that the traversal process should start from a research graph node. The traversal process starts from the research graph node and then through relevant nodes and edges in the overall graph (including the research graph) determined by the specified criteria until the process covers all the relevant nodes and edges determined by the specified criteria. In some embodiments, the traversal process may be applied to the research graph only and does not cover any nodes and edges in the overall graph. Sanctioned nodes serve as predefined starting points for a traversal process to find nodes that are not on a government-issued sanctions list and have a relationship by way of edges and intermediate nodes to the starting point that is relevant (by way of specified value or information) to the application of the technology, e.g., risk related to financial crimes and sanctions. Nodes found by this traversal process are referred to as associated nodes.

In some embodiments, sanctioned nodes can be identified using the research graph or government-issued sanctions list alone. For example, analysts may already know the entities or individuals that are on sanctions lists and designate those entities or individuals as sanctioned nodes as they enter those entities or individuals into the system. The system may also directly use the entities or individuals on the government-issued sanctions list as predefined starting points. The system may include subsystems and processes that facilitate the system to operate in these manners.

The non-matching nodes in the research graph, or the nodes in the research graph that are not connected to a sanctions graph node, are not sanctioned nodes.

A sanctions graph may be referred to as a sanctions subgraph because a sanctions graph can be a subset of the research graph which can be a subset of the overall graph. Therefore, a sanctions graph can also be a subgraph of the overall graph. A sanctions graph may be enriched with custom data. For example, subsets of the sanctions graph can be classified by sanctions program, research area, themes, or topics such as Russia, North Korea, China, al-Qaeda, or Taliban to enable specific reporting on the sanctions information or other information. For instance, a subset of the sanctions graph can be classified as related to Russia to enable reporting on sanctions information related to Russia gathered from all the sanctions lists or other information. The sanctions subgraph can provide information that may not be available from the sanctions list and in a manner that can be easily digested by users.

The system can find associated nodes by several methods that use a sanctioned node. The particular method, or traversal process, to be performed by the system in revealing the associated nodes can be set by specifying a criterion. One of the criteria is ownership. Ownership means the share of ownership a sanctioned node has in another node. The share of ownership can be represented using percentage and available percentages for user selection (either analyst or customer) can be pre-stored in the database. The percentage may also be adjustable. For example, the sanctioned node's share of ownership in another node can be 30%, 50%, 80%, or other percentages. By specifying ownership, the system executes a traversal process that involves ownership edges (involves primarily ownership edges or only ownership edges). An ownership edge that includes an ownership percentage property can be used to calculate the share of ownership the sanctioned node has in another node. The traversal process uses the specified percentage to find associated nodes. This traversal process may be referred to as the ownership traversal method.

The process traverses from the sanctioned node and finds nodes in which the sanctioned node has ownership and the aggregate share of ownership meets the specified percentage (e.g., equal to or greater than the specified percentage). The software engine traverses from the sanctioned node through ownership edges, finds nodes connected through ownership edges (nodes in which the sanctioned node has ownership), and determines whether the share of ownership meets the specified percentage. The software engine can determine whether the share of ownership meets the specified percentage directly or indirectly, and individually or in aggregate by one or more sanctioned nodes (i.e., directly and individually, directly and in aggregate, indirectly and individually, and indirectly and in aggregate). The share of ownership meets the specified percentage when the share of ownership (individually or in aggregate) is equal to or more than the specified percentage (or is at least equal to the specified percentage). Some law and regulations subject entities that are 50% or more owned by sanctioned actors to the same restrictions as sanctioned actors. Financial institutions and other companies need lists of entities that are 50% or more owned by sanctioned actors to screen against customers or transactions.

For example, the percentage threshold for ownership by a sanctioned node is set to 50%. If the share of ownership is set to determine directly and individually, then a node may be an associated node when it is directly connected to the sanctioned node via an ownership edge and the sanctioned node owns at least 50% of that node. If the share of ownership is set to determine indirectly and individually, then a node may be an associated node when it is indirectly connected to the sanctioned node via one or more intermediary nodes and the total share of ownership in one of the available paths or edges needs to be at least 50%. For instance, a sanctioned node is connected to node A and owns 25% of node A, and node A is connected to node B and owns 25% of node B, and the total share of ownership in that series or in each path is 25%. Therefore, node B is not an associated node. Node B would be an associated node if the sanctioned node owns 50% of node A and node A owns at least 50% of node B.

If the share of ownership is set to determine directly and in aggregate, then a node may be an associated node when it is owned by one or more sanctioned nodes directly and the total share of ownership by the one or more sanctioned nodes is at least 50%. If the share of ownership is set to determine indirectly and in aggregate, then a node may be an associated node when it is owned by one or more sanctioned nodes indirectly and the total share of ownership in all the paths is at least 50%. In some embodiments, the total share of ownership can be calculated using only certain paths from all the paths. The in-aggregate option is used to detect situations or associated nodes when each sanctioned node may not have enough share of ownership in a certain node to qualify as a majority owner (e.g., each sanctioned node is a minority owner), but in aggregate the sanctioned nodes own the majority of the node.

The following procedures can also determine whether the share of ownership meets the specified percentage. If a node is 50% or more owned by a sanctioned node, then the software engine identifies that node as an associated node. If aggregate ownership by one or more sanctioned nodes in a node is 50% or more, then the software engine identifies that node as an associated node. For example, if a sanctioned node A owns 20% of node Z and another sanctioned node B owns 35% of node Z, then the software engine identifies node Z as an associated node.

The software engine performs iterations to determine whether the share of ownership meets the specified percentage. Whether the software engine finds an associated node or a node that is not yet determined to be an associated node, ownership percentage from a previous iteration can be used in a subsequent iteration to determine whether the share of ownership meets the specified percentage. If aggregate ownership by one or more sanctioned nodes in a node is less than 50% and there are additional ownership edges that are connected to that node, the node has an undetermined status and is revisited in a subsequent iteration.

Subsequent iterations check other nodes owned by a sanctioned node or associated node (a 50% or more node), determine ownership percentage in those nodes by the sanctioned node or associated node, and determine whether the share of ownership in those nodes meets the specified percentage by including any additional ownership percentage determined in the previous iteration. For example, if a node with an undetermined status is owned in the aggregate by a sanctioned node and another sanctioned node or by a sanctioned node and an associated node, the node with an undetermined status is identified as an associated node (50% or more node) if aggregate ownership by the sanctioned nodes or by the sanctioned node and associated node is 50% or more. One of the ownership percentages may be determined from a previous iteration and another ownership percentage may be determined from a subsequent iteration. For instance, ownership percentage in the node with an undetermined status by one of the sanctioned nodes may be determined from a previous iteration and ownership percentage in the same node by another sanctioned node may be determined from a subsequent iteration. For instance, ownership percentage in the node with an undetermined status by the sanctioned node may be determined from a previous iteration and ownership percentage in the same node by the associated node may be determined from a subsequent iteration.

Figure 22A:
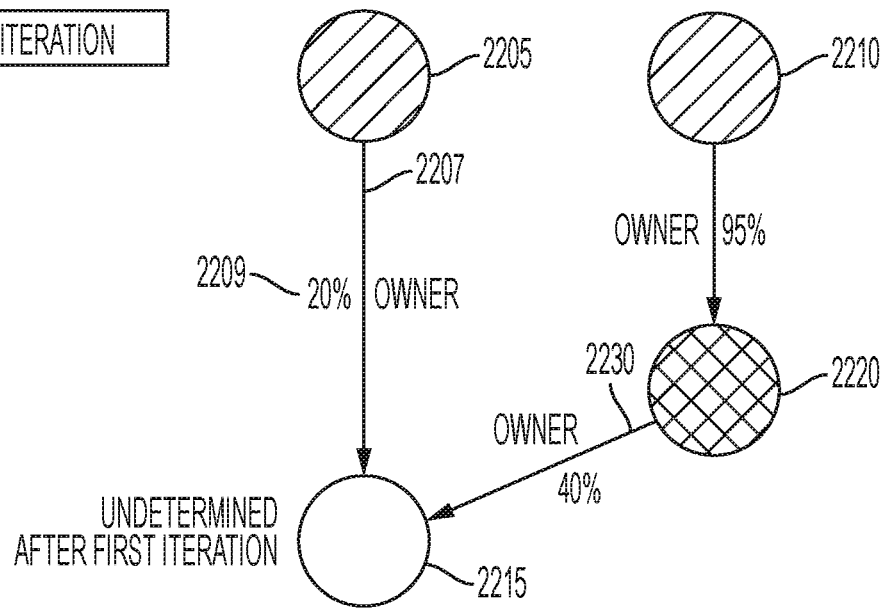
FIG. 22A depicts an illustrative iteration performed by the software engine to determine whether the share of ownership meets the specified percentage in accordance with some embodiments of the present invention.
Figure 22B:
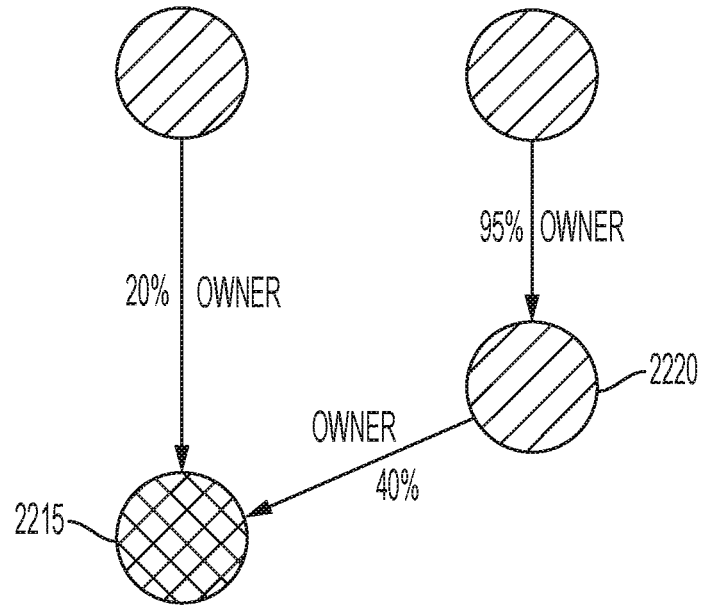
FIG. 22B depicts another illustrative iteration performed by the software engine to determine whether the share of ownership meets the specified percentage in accordance with some embodiments of the present invention.

FIGS. 22a-22b depict illustrative iterations performed by the software engine to determine whether the share of ownership meets the specified percentage. The traversal process starts from sanctioned nodes 2205, 2210 which are identified from the research graph and the sanctions graph. In the first iteration, the software engine finds that sanctioned node 2205 has ownership in node 2215 (through ownership edge 2207) and the share of ownership is 20% (from the ownership edge property 2209). The software engine also finds that node 2215 has another ownership edge 2217. Since aggregate or total ownership in node 2215 at this moment is less than 50% and there is another ownership edge 2217 to node 2215, node 2215 has an undetermined status and will be revisited in a subsequent iteration. The determination of whether node 2215 is an associated node is postponed until a later iteration, or until another iteration when the share of ownership by a sanctioned node or associated node through ownership edge 2217 is determined. The software engine further finds that sanctioned node 2210 has ownership in node 2220 and the share of ownership is 95%. Since sanctioned node 2210 owns 50% or more of node 2220, the software engine identifies node 2220 as an associated node. Therefore, in the first iteration, the software engine discovers node 2215, and discovers that node 2215 has an undetermined status, and node 2220 is an associated node.

In the second iteration, the software engine finds that associated node 2220 has ownership in node 2215 and the share of ownership is 40%. Since aggregate ownership in node 2215 is 60% (20%+40%) after the second iteration, the software engine also identifies node 2215 as an associated node because aggregate ownership in node 2215 is 50% or more (or changes node 2215's undetermined status to an associated node status).

The software engine iterates until all relevant nodes have been visited (determined by the specified criterion). It is understood that 50% and other percentages shown in FIGS. 22a-22b are merely used for illustration purposes only. Other ownership percentages may also be specified. Moreover, other determination procedures and combinations are also contemplated. Furthermore, the software engine can perform more than two iterations to determine whether the share of ownership meets the specified percentage based on the concepts discussed above. A subsequent iteration may refer to an iteration that occurs after the previous iteration concludes or an iteration that occurs after the previous iteration begins (the previous iteration does not necessarily need to end first).

Ownership refers to an entity or individual's ultimate and exclusive rights, conferred by a lawful claim or title, to property. Share of ownership refers to the proportion of rights an entity or individual has to an entity or other property and can be represented in percentage. Share of ownership can be determined by identifying the number of shares the sanctioned node has in the other node, by identifying a title or other information indicating ownership, or by other methods.

The traversal process could also be based on a sanctioned node's ownership or control of another node only, without considering the share of ownership because that information is unknown or not relevant to the data being analyzed. This traversal process may be referred to as the expanded ownership and control method. This method traverses from the sanctioned node and finds nodes in which the sanctioned node has ownership or control without considering the sanctioned node's share of ownership in that node. Expanded ownership or control is determined by whether a node is a unit of the sanctioned node or controlled by the sanctioned node or owned with an unknown ownership percentage by the sanctioned node. Once this traversal method is initiated, the software engine traverses from the sanctioned node through ownership edges, finds nodes connected through ownership and control edges (nodes in which the sanctioned node has ownership and control), and determines whether a node is a unit of, controlled by, or owned by the sanctioned node. Associated nodes identified by this method may be referred to as expanded ownership and control nodes.

The software engine can use additional criteria to perform a traversal process that identifies other types of associations, or risk types, between sanctioned nodes and associated nodes. The other types of associations or risk types can include identifiers shared between sanctioned nodes and associated nodes, commercial, facilitation, and leadership relationships, and relationships between vessels and their operators. To satisfy the additional criteria, the software engine can also perform traversal processes that include other types of nodes, edges, and properties.

Figure 23A:
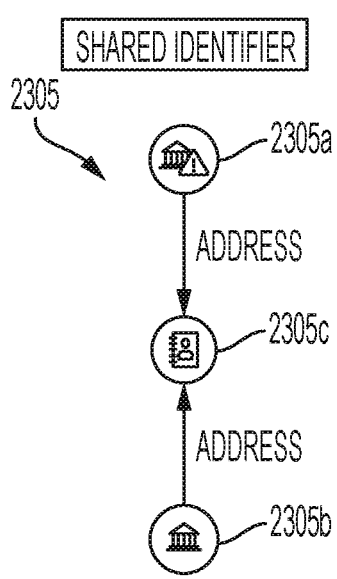
FIG. 23A depicts an illustrative result upon performing the shared identifier traversal process in accordance with some embodiments of the present invention.

Another criterion that can be set to find associated nodes is the shared identifier criterion. Setting the criterion to find a shared identifier instructs the software engine to perform a traversal process that starts from a sanctioned node and traverses through any shared identifier nodes and edges. A shared identifier node is a node that represents information identifying both the sanctioned node and another node, or information shared by both the sanctioned node and another node. The identifying information in a shared identifier node can include location or contact information such as postal addresses, phone numbers, and email addresses. A shared identifier node may also be referred to as an identifying information node. A shared identifier edge is an edge that leads to a shared identifier node. By visiting a shared identifier node, other nodes using or sharing the same identifying information as the sanctioned node can also be identified by the software engine. The identified other nodes are associated nodes. For example, after setting the criterion to shared identifier, a particular type of shared identifier can be further selected such as location or postal address. The traversal process starts from a sanctioned node and traverses through all available location edges and location nodes to reach other nodes connected to location nodes via location edges. The other nodes reached by the traversal process are nodes sharing a location with the sanctioned node and are identified as associated nodes. FIG. 23a depicts an illustrative result 2305 upon performing the shared identifier traversal process. The result 2305 shows that node 2305b uses or shares the same address 2305c as sanctioned node 2305a.

Other criteria that can be set to find associated nodes include commercial, vessel owners and operators, leadership, and facilitation. The traversal process for each of these criteria is similar to the shared identifier traversal process discussed above and is based on the corresponding edges and nodes of the selected criterion. Other criteria are contemplated.

Figure 23B:
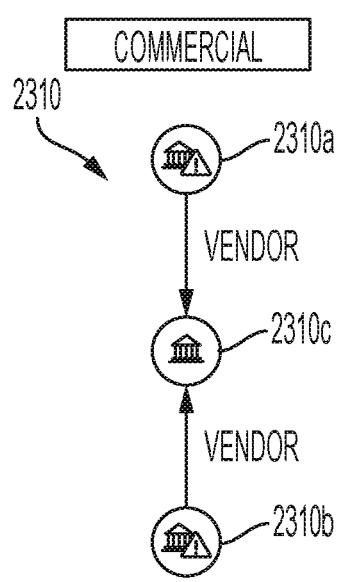
FIG. 23B depicts an illustrative result upon performing the commercial traversal process in accordance with some embodiments of the present invention.

For the commercial criterion, the traversal process relies on commercial edges (e.g., seller, buyer, distributor, vendor, or other commercial relationship) and commercial nodes (e.g., entities or individuals that have commercial activities or do business with others). In some embodiments, the software engine can consider the strength of the commercial edges in deciding whether the commercial nodes should be identified as associated nodes. The strength may be based on a characteristic or property of a commercial edge (e.g., if the commercial edge is vendor, then the commercial edge should be given a higher weight), the number of commercial edges connecting the sanctioned node and the commercial node, or a combination of factors. Other factors that may be considered in determining the strength include the amount or volume of the transaction (or the number of transactions) between the sanctioned node and the commercial node. FIG. 23b depicts an illustrative result 2310 upon performing the commercial traversal process. The result 2310 shows that node 2310c has commercial exposure to sanctioned nodes 2310a, 2310b and is identified as an associated node (e.g., because it has sufficient commercial exposure to sanctioned nodes 2310a, 2310b based on the strength of the commercial edges).

Figure 23C:
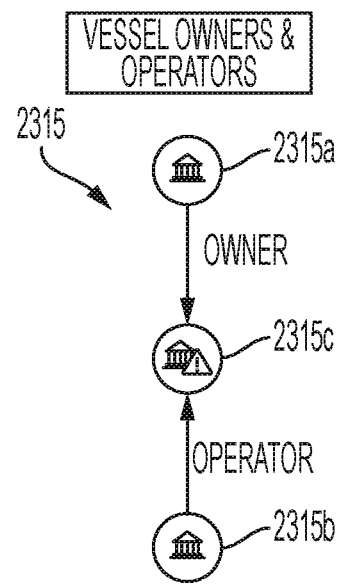
FIG. 23C depicts an illustrative result upon performing the vessel owners and operators traversal process in accordance with some embodiments of the present invention.

For the vessel owners and operators criterion, the traversal process uses a sanctioned node that represents a vessel as a starting point and traverses through owner or operator edges to find non-sanctioned (associated nodes). Other entities owned by the non-sanctioned nodes (non-sanctioned owner or operator or associated owner or operator) of the vessel node can also be identified. The traversal process can also start with a sanctioned node and identify vessels owned or operated by the sanctioned node. The non-sanctioned nodes found by this traversal process are also identified as associated nodes. A vessel may be a land vehicle, watercraft, aircraft, or other types of vehicles. FIG. 23c depicts an illustrative result 2315 upon performing the vessel owners and operators traversal process. The result 2315 shows that sanctioned node 2315c is owned by node 2315a and operated by node 2315b, and nodes 2315a and 2315b are identified as associated nodes.

Figure 23D:
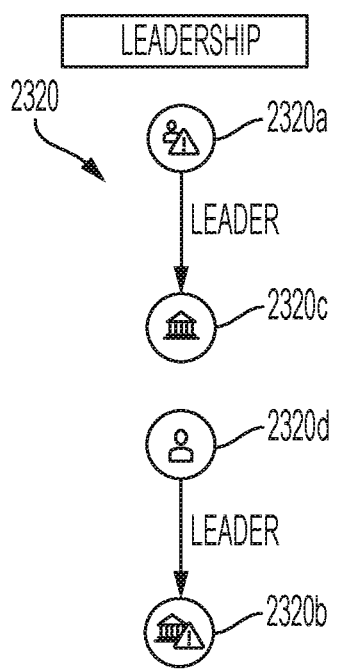
FIG. 23D depicts an illustrative result upon performing the leadership traversal process in accordance with some embodiments of the present invention.

For the leadership criterion, the traversal process uses a sanctioned node as a starting point and traverses through leadership edges to find any non-sanctioned nodes led by the sanctioned node, or any non-sanctioned nodes that are leaders of the sanctioned node. In some embodiments, the software engine can consider the strength of the leadership edges in deciding whether the non-sanctioned nodes should be identified. The strength may be based on a characteristic or property of a leadership edge (e.g., boss, subordinate, or colleague of the sanctioned node), the number of leadership edges connecting the sanctioned node and the non-sanctioned node, or a combination of factors. Other factors that may be considered in determining the strength include the type of leadership activities involved between the sanctioned node and the non-sanctioned node (e.g., management level of meeting, causal or formal one-on-one meeting, number of meetings, etc.). FIG. 23d depicts an illustrative result 2320 upon performing the leadership traversal process. The result 2320 shows that non-sanctioned node 2320c has sanctioned node 2320a as the leader and that non-sanctioned node 2320d is the leader of sanctioned node 2320b. Nodes 2320c, 2320d are identified as associated nodes.

Figure 23E:
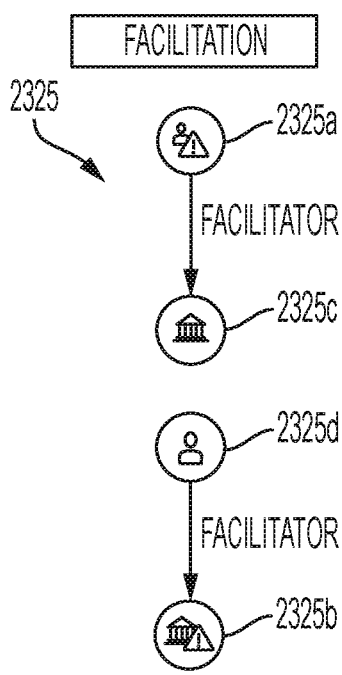
FIG. 23E depicts an illustrative result upon performing the facilitation traversal process in accordance with some embodiments of the present invention.

For the facilitation criterion, the traversal process uses a sanctioned node as a starting point and traverses through any facilitation or support edges to find non-sanctioned nodes. In some embodiments, the software engine can consider the strength of the facilitation edges in deciding whether the non-sanctioned nodes should be identified. The strength may be based on a characteristic or property of a facilitation edge, the number of leadership edges connecting the sanctioned node and the non-sanctioned node, or a combination of factors. Other factors that may be considered in determining the strength include facilitation activities involved between the sanctioned node and the non-sanctioned node. FIG. 23e depicts an illustrative result 2325 upon performing the facilitation traversal process. The result 2325 shows that node 2325c is being facilitated by sanctioned node 2325a and that node 2325d is facilitating sanctioned node 2325b. Nodes 2325c and 2325d are identified as associated nodes.

Each of the results in FIGS. 22-23 may be saved as a subgraph corresponding to the criteria and type of traversal performed. The subgraphs allow queries to rapidly recall the results of the traversal processes. The subgraph can also store information about the parameters used by the traversal processes, such as the threshold percentage and edge types used by the software engine in the traversal processes and the threshold percentage and edge types required by the software engine to continue the traversal process. In some embodiments, the results of each of the above traversal processes are stored by assigning labels to non-sanctioned nodes found by the traversal processes and connecting the non-sanctioned nodes to an additional subgraph that stores any additional information. This enables non-sanctioned nodes or a subset of non-sanctioned nodes identified by the traversal processes to be recalled automatically.

Another method or traversal process that can be performed by the system to reveal associated nodes is based on community detection. The software engine uses edge betweenness (the community detection method) to identify highly interconnected networks of sanctioned nodes. The method finds highly interconnected networks by making partitions to the graph of the sanctioned nodes. The method performs partitions by calculating edge betweennesses for all the nodes and edges in the graph of the sanctioned node, determining edges that have a high edge betweenness or that have an edge betweenness in the top 10% (or other specified percentage) of all the determined edge betweennesses, and removing the determined edges from the graph of the sanctioned node. Removing the determined edges divides the graph of the sanctioned node into subgraphs (or disconnects the graph of the sanctioned node from within to create subgraphs or to break it into subgraphs). Each resulting subgraph or partition is a highly interconnected network. The betweenness of an edge is calculated by computing the total number of shortest paths between a first node and a second node (first total number), computing the total number of shortest paths between the first node and the second node via the edge for which the betweenness is calculated (second total number), and dividing the first total number by the second total number. The method may employ Girvan-Newman algorithm or other process to perform partition. The method can be configured to perform a desired number of iterations to produce a desired number of partitions, instead of partitioning the entire graph to find all the interconnected networks.

A sanctioned node may have one or more highly interconnected networks. Each highly interconnected network includes a set of highly interconnected nodes and edges. A set of highly interconnected nodes and edges can be referred to as a sanctioned actor community. Each partition containing a sanctioned actor community is connected to a community subgraph. The community subgraph allows queries that can rapidly recall the results of the community detection method. The community subgraph may also store details pertaining to risk scoring and qualitative descriptions of the community (e.g., as part of a data model). Risk score may be calculated through a variety of ways, including considering number of nodes, node types, number of edges, edge types, edge weights, and properties, or other measure. The community detection method can detect communities in a complex graph (networks of the sanctioned actor) that may not be distinctly shown in or understood from the complex graph (the graph of or overall information about the sanctioned actor). For example, highly interconnected networks in the graph may be intertwined or otherwise combined such that the system or users may not know such networks exist. The community detection method and community subgraph can provide more detail and precise reporting of sanctioned actors and associated actors than is currently possible based on information governments provide in screening lists. The community detection method and community subgraph can also provide information that may not be available from the sanctions list and in a manner that can be easily digested by users. Girvan-Newman algorithm or other partition process can be connected to the community subgraph to update the community subgraph when an iteration is performed. The number of iterations can determine more or less fine-grained partitions in the graph.

A second traversal process can be executed after the community detection method to identify nodes that interact with the sanctioned actor community. The identified nodes are also nodes that are not on a sanctions list and that may present financial crimes and sanctions-related risks. The process starts from sanctioned nodes that are members of the community (sanction nodes that are different from the sanctioned node used to find that node's interconnected networks) and traverses through a specific edge type or relationship. For example, the process can traverse via commercial type edges and find actors that are involved in commercial activity with the sanctioned actor community. The process can further consider node types and properties of found nodes in filtering identified nodes. The identified or resulting nodes can be referred to as members of a specific dimension (e.g., commercial dimension) of the sanctioned actor community. These nodes are connected to the community subgraph so queries can rapidly recall the results of this traversal process. The community subgraph also stores details of the identified node's risk score and qualitative descriptions explaining its relationship to the sanctioned actor community. Risk score may be calculated through a variety of ways, including by weighting edges used to identify the node in the specific dimension, degrees of separation from a sanctioned node or the starting sanctioned node (e.g., the starting node in the community detection method), or other measure.

The results generated from executing the above methods or traversal processes can be accessed and shown via an interface of the system such as the visual interactive interface in the external production environment or the software interface in the internal production environment. For example, a user can input research data and select a criterion, a relationship type, or risk type from the interface (a query). The selection determines the traversal process the system uses to find associated nodes. The interface may provide additional commands (e.g., buttons) for selection after selecting a criterion. For instance, when ownership is selected, the interface may provide an option allowing users to enter a percentage representing a sanctioned node's share of ownership in a non-sanctioned node. After entering the information, the interface would automatically present a graph, such as those shown in FIG. 23, showing the extent of the financial crimes and sanctions-related risk spreading from the sanctioned node (e.g., nodes that are not on a sanctioned list but are connected to the sanctioned node in some way and may present risk). For example, the sanctioned node may be presented in a location on the visual workspace and some of the associated nodes may be directly connected to the sanctioned node through the selected criterion and some of the associated nodes may be indirectly connected to the sanctioned node via one or more intermediary nodes through the selected criterion, (e.g., nodes that are not on a sanctioned list but are connected to the sanctioned node in some way and may present financial crimes or sanctions-related risk).

The results generated from executing the above traversal processes can also be exported to customizable bulk formats, including Comma Separated Value (CSV), JavaScript Object Notation (JSON), Extensible Markup Language (XML), and other file types, for ingestion in customer's screening, filtering, risk scoring, or other similar systems. When the results are exported to bulk format, the results in bulk format can be information describing the sanctioned node, the associated nodes, and the selected criterion, relationship or type of risk (including the corresponding edges and properties), instead of the actual nodes, edges, and properties used by the external production environment. Each record may have a risk label or risk labels assigned by the system that identifies the specific traversal processes or other criteria used to identify the record. Risk score and qualitative description can also be included. The results in bulk format can be used by a customer screening, filtering, risk scoring system, or other compatible system and present the information to users in the way that the system is designed to present risk information (e.g., textually or graphically showing nodes, edges, and properties if the system has such capabilities). The results can be exported based on research programs, sanctions programs, geographic location, themes, ego network (e.g., a network having a focal node and nodes surrounding the focal node based on some degrees or parameters), or topics.

Figure 24A:
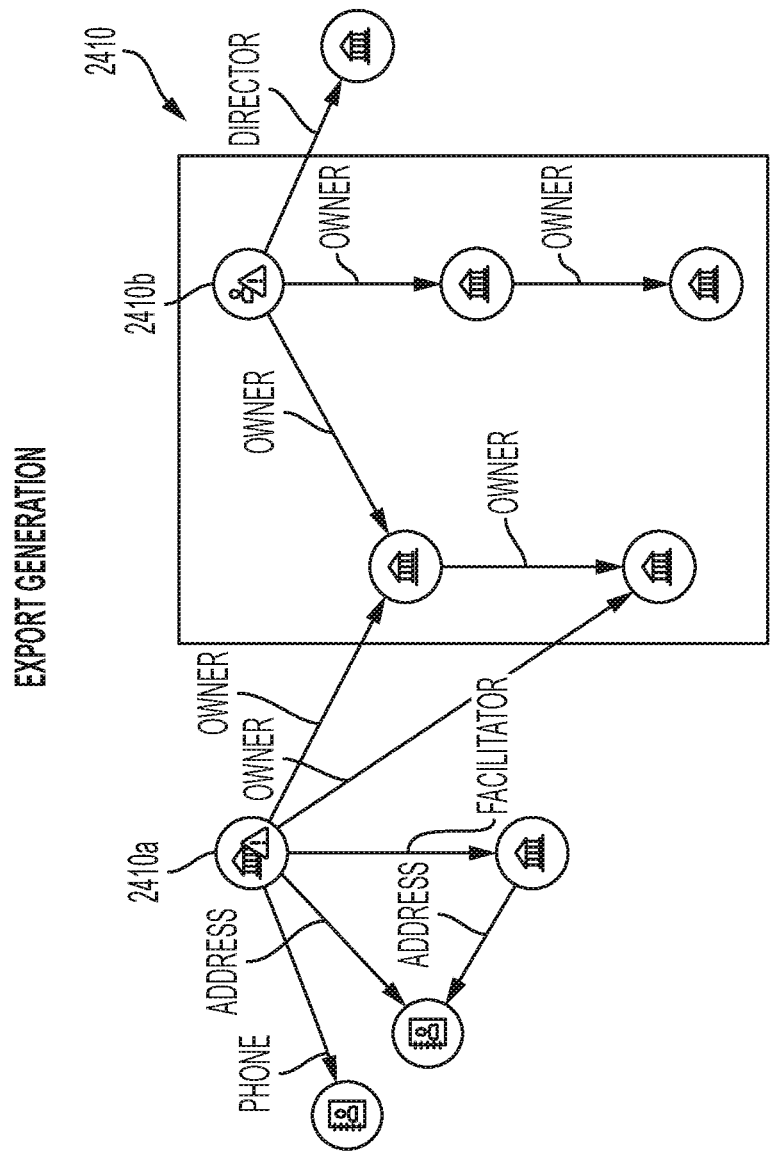
FIG. 24A depicts an illustrative research graph in accordance with some embodiments of the present invention.

The results generated from executing one or more of above traversal processes can also be produced in a table format. FIG. 24B depicts an illustrative table 2405 produced by the system upon performing one or more of the above traversal processes on the research graph 2410 shown in FIG. 24A. The research graph 2410 includes nodes 2410*a*, 2410*b* that are sanctioned nodes according to a sanctions list or graph. One or more of the other nodes in the research graph 410 are non-sanctioned nodes or associated nodes found by the one or more traversal processes. The table 2405 includes a list of non-sanctioned nodes or associated nodes 2415 found by the one or more traversal processes, a unique code 2420 for each of the nodes 2415, and a description 2425 for each of the nodes 2415. Nodes 2415 may be all the nodes or a subset of all the nodes found by the one or more traversal processes. Financial institutions or other customers may want to receive exports of only certain portions of the information identified by the traversal processes according to their risk management policies and screening practices and the system can be configured to produce a table including only a subset of all the nodes found by the traversal processes. The financial institution or other customers' preferences for the subset of information it wants to receive can be configured and stored in the system. Nodes 2415 can be combined with other nodes found by other one or more traversal processes to form a consolidated table. Although FIG. 24 shows a research graph, it is understood that the graph may be an overall graph including a research graph and the sanctioned nodes in the research graph can also traverse through other parts of the overall graph to uncover other associated nodes, in addition to the research graph.

FIG. 25 depicts another illustrative table 2505 produced by the system upon performing one or more of the above traversal processes on a research graph (or an overall graph including a research graph). The table 2505 includes a list of non-sanctioned or associated nodes 2515 found by the one or more traversal processes, a unique code 2520, a description 2525, and a link 2530 for each of the node 2515. Nodes 2415 may be all the nodes, or a subset of all the nodes found by the one or more traversal processes because the financial institution or other company only wants certain information.

In one embodiment, each link 2530 is a web link such as a URL generated by the software engine. A web link is an address of a website comprising a sequence of text that is understood by the web browser to process when selected from a computer to display a website from a server over an Internet connection. The web link represents an address of a website implemented by the system provider (referring to the provider of the system shown in FIG. 1). The website includes an interactive user interface (web-based interface) configured to access and view information of the associated node. The web-based interface allows visualizing the information of the associated node in a graphical format or in graphs using nodes, edges, and properties. The web-based interface is implemented on a private website, private server, or private network that is only accessible by the system provider and others who the system provider has given authorization. Authorization can be given through the URL generated by the software engine, or through other secure means such as using registered user name and password, the unique code (2520) and system provider-supplied password, or other secure login credentials.

Figure 26:
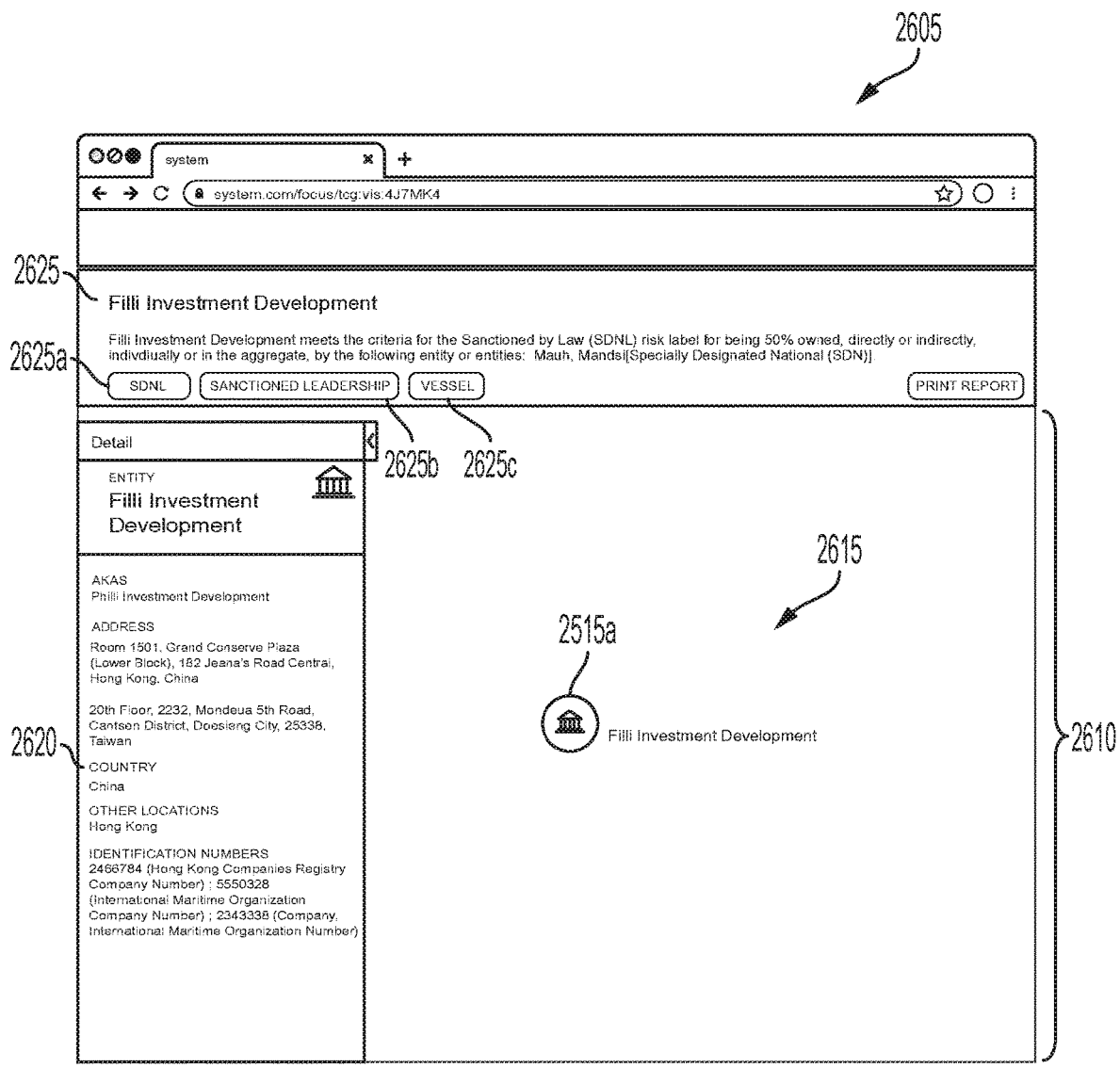
FIG. 26 depicts an illustrative website including an interactive user interface 2610 for associated node after selecting URL in accordance with some embodiments of the present invention.
Figure 27:
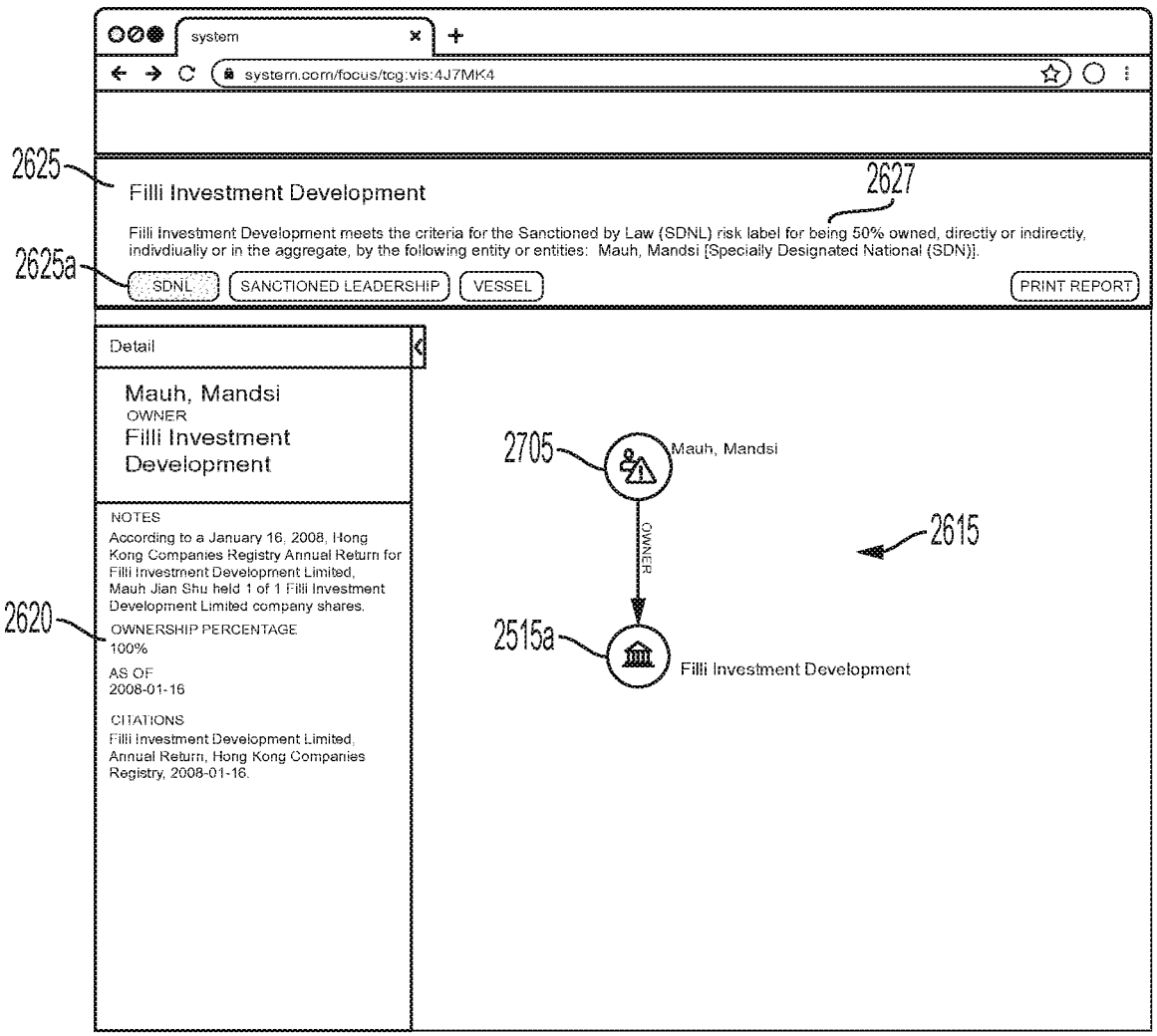
FIG. 27 depicts the website of FIG. 26 when the SDNL option is selected in accordance with some embodiments of the present invention.
Figure 28:
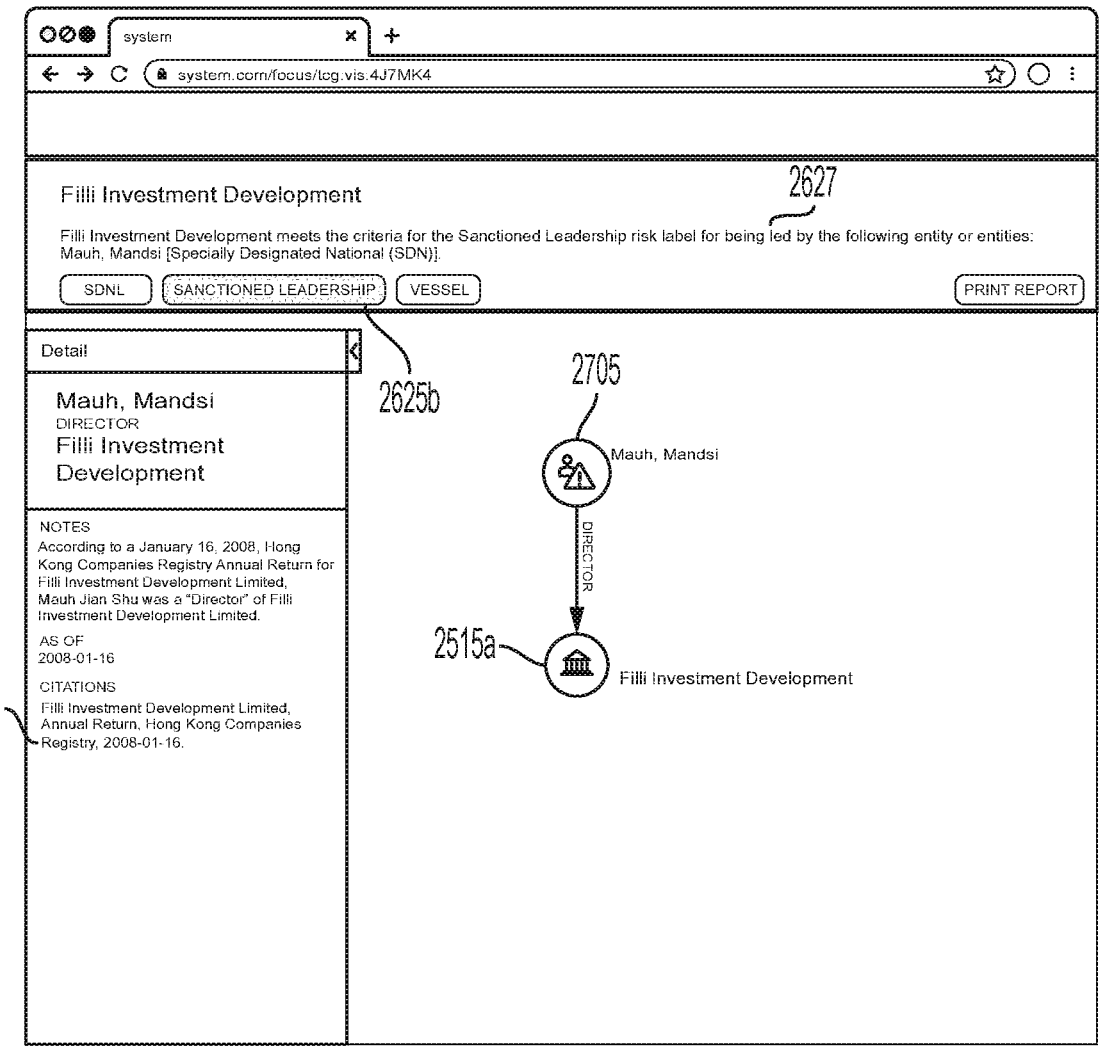
FIG. 28 depicts the website of FIG. 26 when the sanctioned leadership option is selected in accordance with some embodiments of the present invention.
Figure 29:
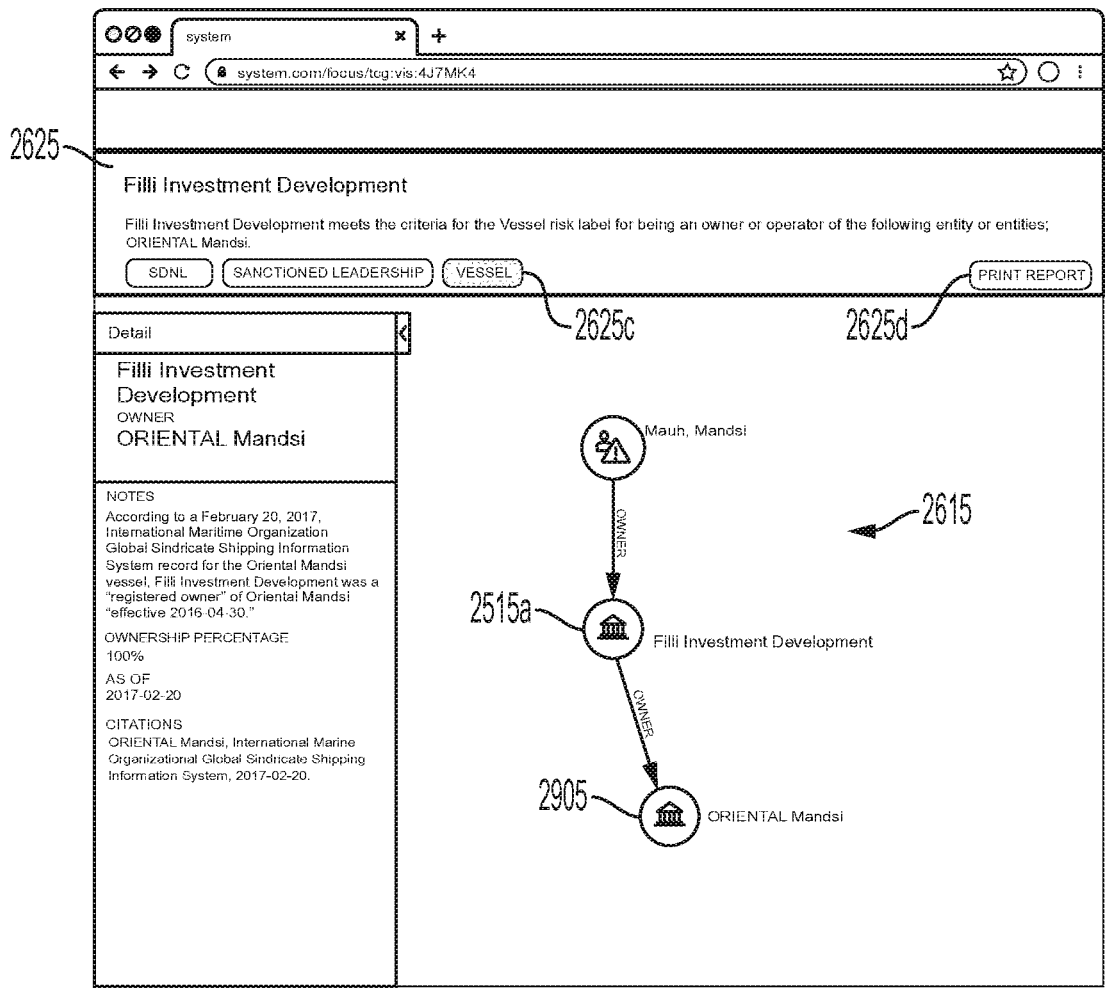
FIG. 29 depicts the website of FIG. 26 when the vessel option is selected in accordance with some embodiments of the present invention.

Upon selecting a URL, the system initializes a web-browser to present the website specified by URL. FIG. 26 depicts an illustrative website 2605 including an interactive user interface 2610 for associated node 2515a after selecting URL 2530a. The web-based interface 2610 includes a network visualization displaying area 2615, a node description area 2620, and a traversal result area 2625. In response to selecting associated node 2515a from table 2505, the web-based interface 2610 displays node 2515a in the network visualization displaying area 2615. The node description area 2620 provides a description of node 2515a and the description may be obtained from the research graph and/or sanctions graph. The traversal result area 2625 describes the traversal processes (e.g., criteria) that found node 2515a, and provides options 2625a, 2625b, 2625c for selecting each traversal process (e.g., criterion) to view sanctioned nodes from which each traversal process begins, nodes that satisfy the specified criterion, and other information in the network visualization displaying area 2615. Only options 2625a, 2625b, 2625c of the traversal processes that found node 2515 are generated and displayed by the software engine in the network visualization displaying area 2615.

When the SDNL (sanctioned by law, or 50% or more ownership criterion) option 2625a is selected, sanctioned node 2705 is displayed in the network visualization displaying area 2615 with the corresponding connection to associated node 2515a. Sanctioned node 2705 is connected to associated node 2515 via an owner edge showing that sanctioned node 2705 is an owner of associated node 2515. Sanctioned node 2705 owns 50% or more share in associated node 2515 because sanctioned node 2705 is found by the sanctioned by law or 50% or more ownership criterion. A description of the relationship between node 2705 and node 2515a can be automatically generated and displayed in the traversal result area 2625. The description can include details from the corresponding traversal process used. For example, if a non-sanctioned node is identified as 50% or more owned by a sanctioned node, the description identifies the non-sanctioned node as a 50% or more node and explains the pathway between the non-sanctioned node and the sanctioned node, including details from the traversal process such as the ownership percentage calculated. 2627 depicts an illustrative description. Node description area 2620 also changes to provide information about sanctioned node 2705 and other information.

When the sanctioned leadership option 2625b is selected, sanctioned node 2705 is displayed in the network visualization displaying area 2615 with the corresponding connection to associated node 2515a. Sanctioned node 2705 is connected to associated node 2515a via a leadership edge (e.g., director) showing that sanctioned node 2705 is a director of associated node 2515. In a situation where associated node 2515a is already displayed in the traversal result area 2615 in response to selecting the SDNL option, selecting the sanctioned leadership 2625b may change only the edge connection or the property of that edge from owner to director. Description 2627 and node description area 2620 also change accordingly to provide the relevant information.

When the vessel option 2625c is selected, node 2905 representing a ship is displayed in the network visualization displaying area 2615 with the corresponding connection to associated node 2515a. Node 2905 is connected to associated node 2515a via an owner edge showing that associated node 2515 owns node or ship 2905.

The traversal result area 2625 may also provide an option 2625d to print the information and graph shown any of the FIGS. 26-29.

A user can also access and view information of the associated node by using the unique code 2520 shown in FIG. 25. A unique code may identify an associated node (e.g., Filli Investment Development in FIGS. 26-29) or certain information about an associated node (e.g. SDNL information of Filli Investment Development in FIG. 27). The unique code 2520 is generated by the software engine. The user can input the unique code 2520 into an identifier or general search field on the website implemented by the system provider. The website then presents the user interface and information shown in FIGS. 26-29 for the associated node or information corresponding to the identifier 2520. Tables 2405 and 2505 in FIGS. 24-25 may provide both the links 2530 and identifiers 2420, 2520 as options to access information of an associated node. In some embodiments, tables 2405 and 2505 may only need to provide one of the two options (e.g., see FIGS. 30-32, only the unique code option is provided).

As discussed earlier, the results of each traversal process (e.g., FIGS. 22-23) can be saved as a subgraph in the system.

The subgraphs allow queries to rapidly recall the results of those traversal processes. By selecting one of the options in traversal result area 2625, the system may recall the corresponding subgraph or the applicable nodes from the corresponding subgraph and display the subgraph or nodes in the area 2615.

Each URL and the web-based interface presented in response to selecting that URL are tailored to each specific associated node. The web-based interface is specially configured to access and view information of that particular associated node and is configured according to the results generated by the traversal processes. For example, when the URL of associated node 2515*b* is selected, the traversal result area 2625 may show SDNL, commercial, and other options because those are the traversal processes or criteria that found node 2515*b*.

Figure 31:
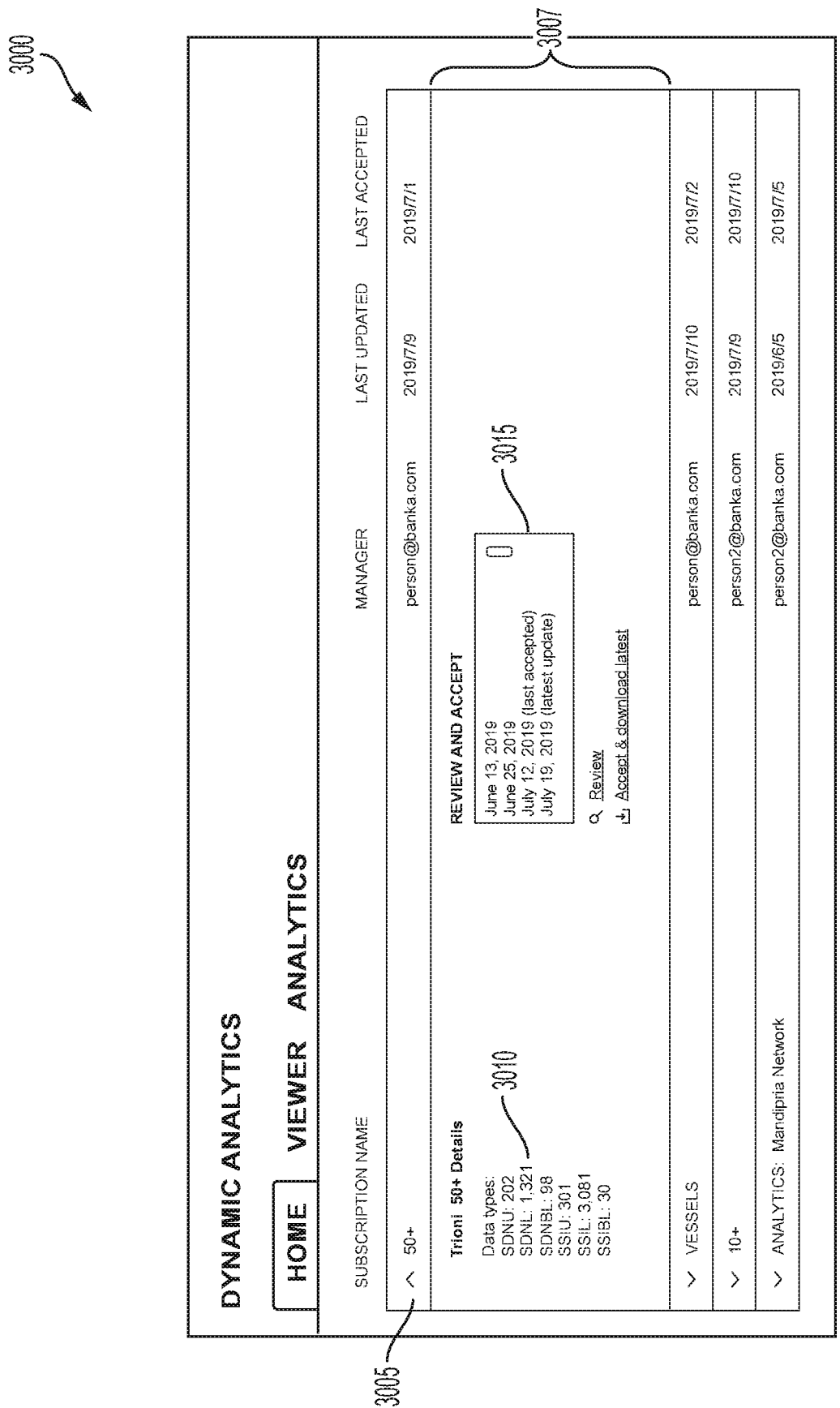
FIG. 31 depicts an illustrative user interface allowing the user to select a subscription and configuring to display a summary of the selected subscription in accordance with some embodiments of the present invention.
Figure 32:
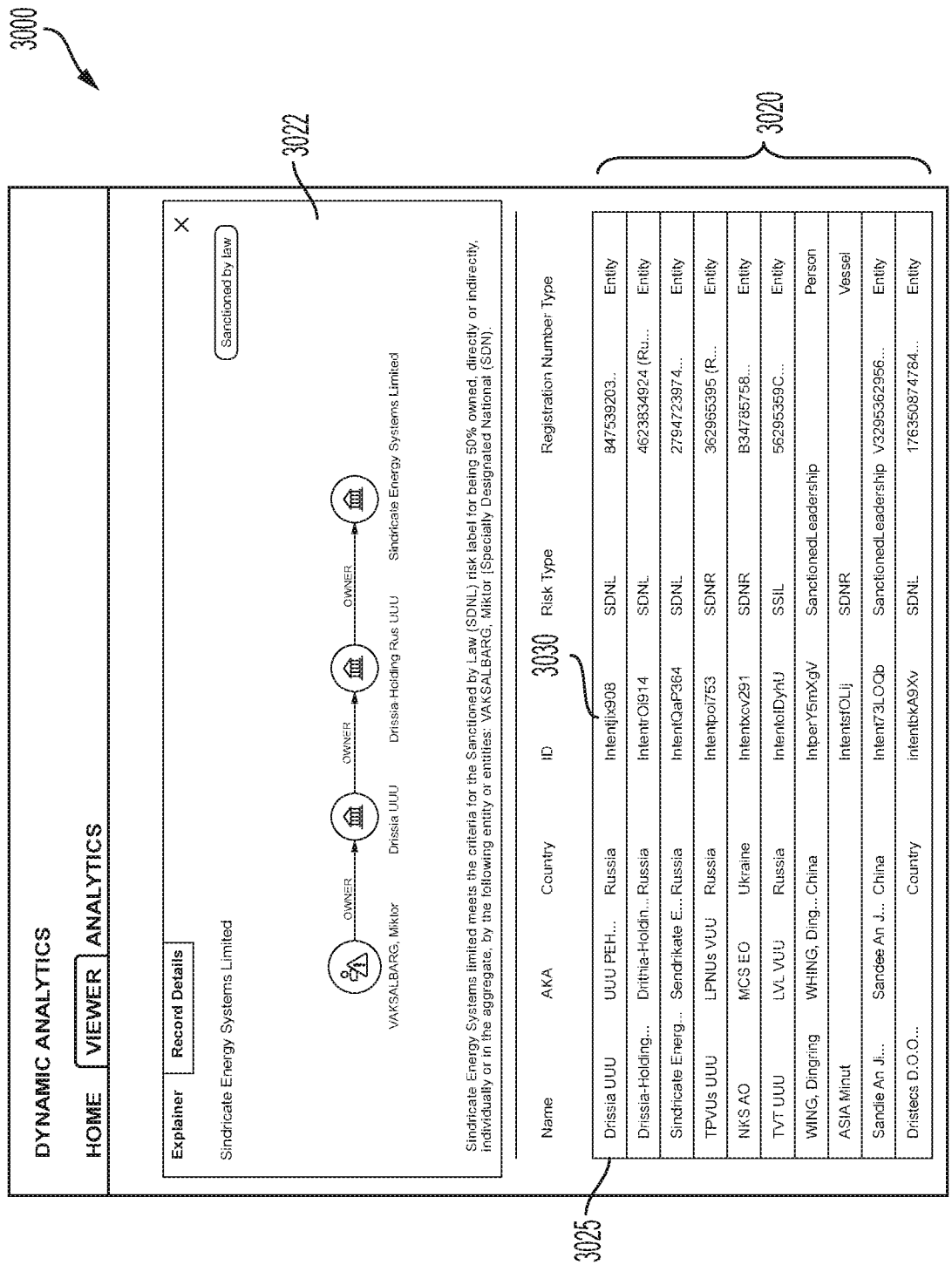
FIG. 32 depicts an illustrative user interface displaying records of the selected date and a network visualization displaying area in accordance with some embodiments of the present invention.

Tables 2405, 2505 can be ingested into a customer's computer system allowing that system to screen, filter, or perform other risk analysis. Tables 2405, 2505 can also be presented to the customer, e.g., as a table presented in Excel, for viewing without being ingested into any of the customer's computer systems. FIGS. 30-32 depict another way to present or access information of associated nodes. A user can set up parameters for the associated nodes information he or she wants to obtain (e.g., subscriptions) from a website implemented by the system provider (linked to the system 100), the internal production environment, or the external production environment. The user can select parameters that correspond to nodes and traversal processes or edges types (e.g., ownership, leadership, vessel, etc.) that are of interest to the user or other parties in the set up. The system can retrieve information meeting the parameters by querying the subgraph for a set of nodes or traversal processes, or by performing traversal processes on the graph database in real time. The system is configured to apply the selected nodes and traversal processes to the graph database periodically or when the data in the graph database changes (e.g., when the system receives new nodes, research information, or other updates). The results or the associated nodes information can be accessed from a website implemented by the system provider. FIG. 30 depicts an illustrative website with a user interface 3000 (web-based interface) showing the associated nodes information that a user wants to obtain, or the subscriptions set up by the user. FIGS. 31-32 depict illustrative associated nodes information presented by the user interface 3000.

Referring to FIG. 31, the user interface 3000 allows the user to select a subscription and is configured to display a summary of the selected subscription. For example, after selecting the ownership subscription 3005, the user interface 3000 presents a summary 3007 that shows a total number of records 3010 (SDNL: 1,321) of the selected subscription 3005 and the dates on which the subscription and its records are updated 3015. The total number of records 3010 may be based on the latest update. Each record refers to an associated node obtained by applying the selected nodes and traversal processes to the overall graph. In response to selecting a date, the user interface 3000 displays records 3020 of the selected date and a network visualization displaying area 3022 as shown in FIG. 32. The records 3020 may be presented in a form similar to tables 2405 and 2505. The user interface 3000 allows the user to select a record 3025 in the table 3020 and is configured to display the path traversed to identify the record and associated nodes information of the selected record 3025 (in the form of nodes, edges, and properties to visually present that information) in the network visualization displaying area 3022.

The number of records and the information in the records may be different in the records associated with each date in the field 3015. As such, the table 3020 may also display different numbers of records and information depending on the selected date. The user can select whether he or she wishes to update the associated nodes information he or she currently has locally (e.g, the user is using the external production environment installed on his or her computer) or in another location (e.g., the user is using the web-based interface and he can save that information on the server or in the Cloud). The user can always choose the latest update to get the latest associated nodes information. The user can also choose certain updates to get only certain new associated nodes information (e.g., accepting the Jul. 12, 2019 update but not the Jul. 19, 2019 update). The user interface 3000 may also display other information such as a node description area 2620 shown in FIGS. 26-29 and have other features described with respect to FIGS. 26-29.

In producing the table 3020 (and tables 2405, 2505), the software engine also generates a unique code 3030 for each records in the table 3020 (and tables 2405, 2505) that allows the system to retrieve a particular record or a subgraph of that record. The user can input the identifier in an identifier or general search field on the website implemented by the system provider to quickly access and visualize that information in the form of nodes, edges, and properties. For example, the identifier field may be provided in the screen shown in FIG. 30. After the user enters an identifier in that field, the user interface 3000 may present the network visualization displaying area 3022 with the associate nodes information corresponding to the identifier (in the form of nodes, edges, and properties). Other values may be input into an identifier or general search field to locate a record across subscriptions, including names, aliases, and addresses.

Figure 33:
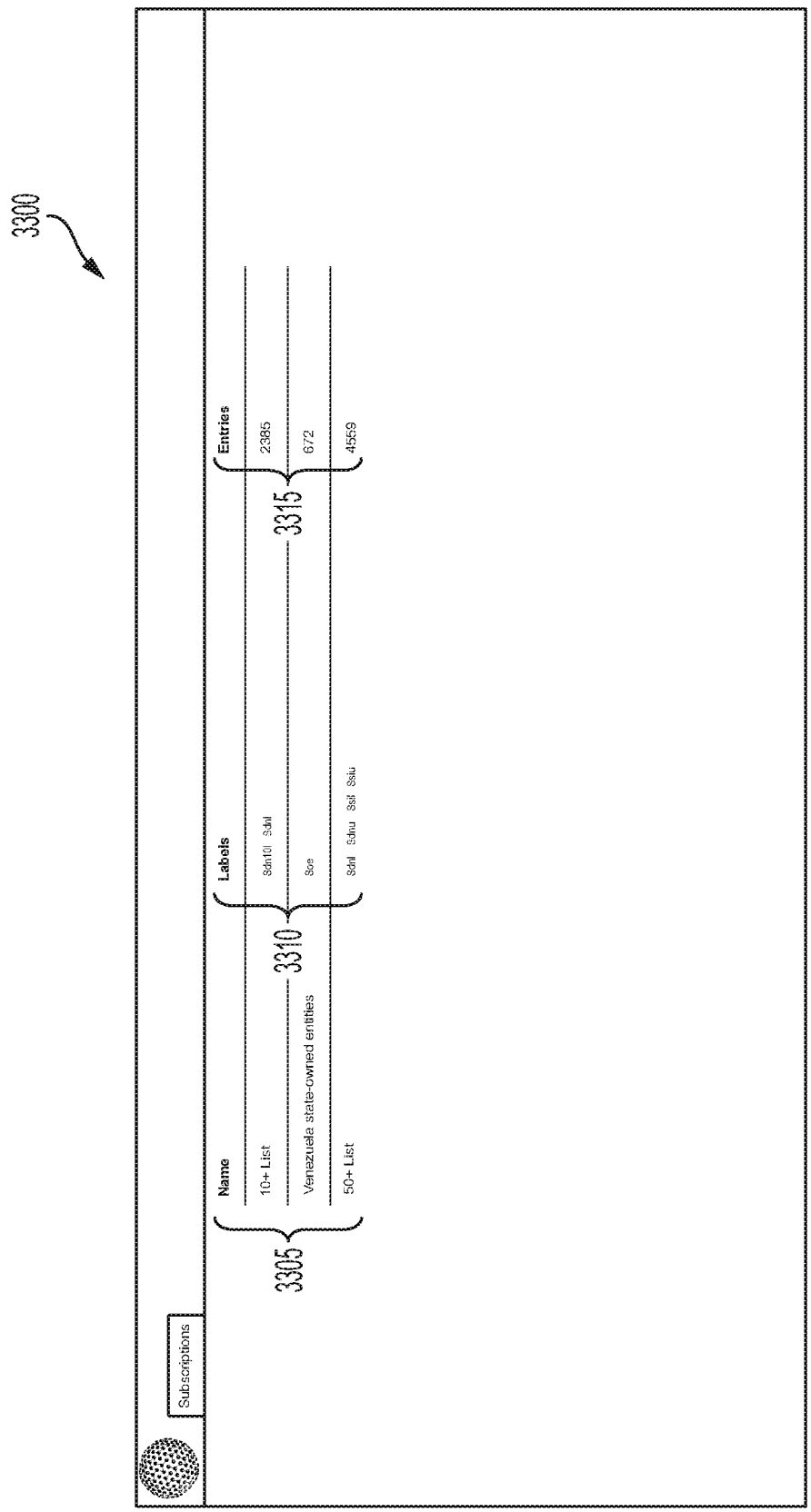
FIG. 33 depicts an illustrative summary page to access information of associated nodes in accordance with some embodiments of the present invention.
Figure 35:
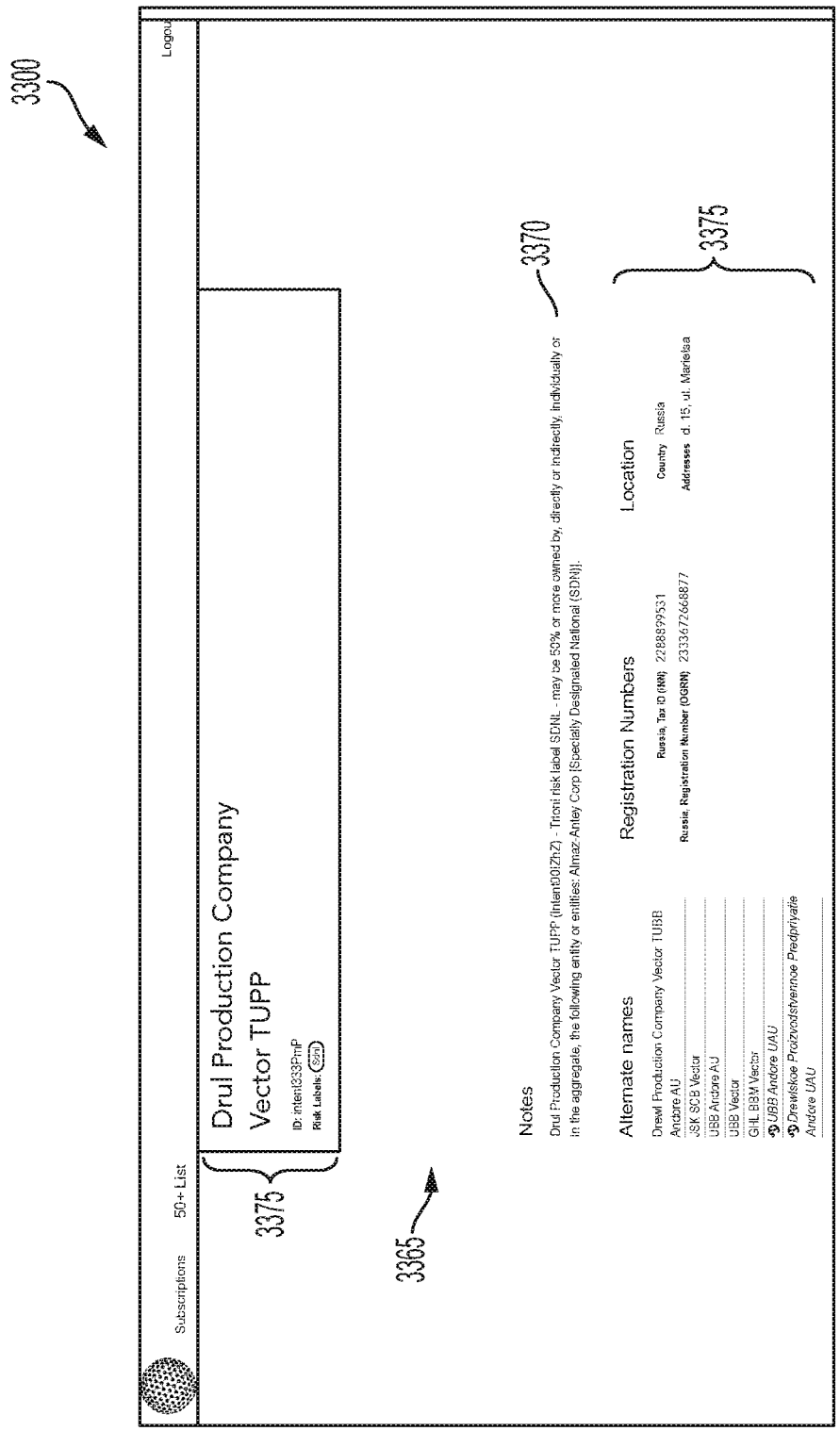
FIG. 35 depicts an illustrative record selected from the selected subscription of FIG. 34 in accordance with some embodiments of the present invention.

FIG. 33-35 depict another way to present or access information of associated nodes FIG. 33 depicts an illustrative website with a user interface 3300 (web-based interface) showing the associated nodes information that a user wants to obtain, or the subscriptions 3305 set up by the user, risk labels 3310 that communicate the criteria used to include records in a subscription, and the number of records 3315 in each subscription. The user interface 3300 may be presented to the user after the user logs into the system using his or her credentials. The screen shown in FIG. 33 may be referred to as a summary page.

Referring to FIGS. 33-34, the user interface 3300 allows the user to select a subscription and is configured to display a list of the select subscription. For example, after selecting the "50+ List" subscription (50% or more ownership subscription), the user interface 3300 presents a list 3320 that shows each record 3325 in the subscription, the unique code 3330 associated with each associated node, and the name 3335, alternative names 3340, city 3345, country 3350, risk label 3355, and registration numbers 3360 of each associated node. The registration number 3360 may be a number given to the associated node by a government or other authority to identify the node (e.g., company) when the node is incorporated or registered. The user interface 3300 allows the list 3320 to be filtered and sorted by one or more of the fields displayed, including the name 3335, alternative names 3340, city 3345, country 3350, risk label 3355, and registration numbers 3360.

After selecting a record 3325 in the list 3320, the user interface 3300 displays a network visualization displaying area 3365, a traversal result description area 3370, and a node description area 3375. The node of the selected record 3325 and the nodes found by the 50% or more ownership traversal process are displayed in the network visualization displaying area 2615 (in the form of nodes, edges, and properties to visually present that information).

The traversal result description area 3370 includes a description of the relationship between the selected node 2705 and the nodes found by the traverse process. The description is automatically generated and displayed in the area 3370. The description can include details from the corresponding traversal process used. The node description area 3375 can provide other information for the selected node based on those shown in the list 3320 (e.g., one or more of the unique code, name, alternative names, city, country, risk labels, and registration numbers)

The list 3320 may be downloaded to a computer allowing the user to locally review the list. Access to the list 3320 may be provided through a virtual data sharing room displayed by the user interface. Access to the virtual data sharing room may be restricted by user roles, credentials, group permissions, or other means. The list 3320 may be saved in Excel format or other format. Each record or unique code in the Excel file is selectable by the user, and a selection of a record or code instructs the computer to load a web browser on the computer and present the user interface shown in FIG. 35 via the browser.

It is possible to have a unique code where it is combination of different information that is used to identify the corresponding content (e.g., login+identifier, transmitted message information+identifier, etc.)

Website is understood to refer to Internet websites or websites accessed on the Internet using Internet addresses. Web is understood to refer to World Wide Web and Internet sites and technology for accessing sites on the World Wide Web. Web-based interface is understood to refer to a user interface implemented on or presented in a website that allows users to interact with the website.

The system is implemented using Internet protocols that make it compatible with web browsers generally available to the public (ubiquitous) so that user can quickly access and engage with the system.

Sanctioned nodes and their associated nodes can be identified through the system. Users can review identified associated nodes through another interface (e.g., another web-based interface that may be different from the one above) before they become available in the external production environment or are included in the bulk format for ingestion, and determine whether an associated node is desirable to be published or included. The review process ensures the quality of associated nodes (e.g., associated nodes may be deemed to present financial crimes or sanctions-related risk). Each entry (e.g., each associated node or a group of associated nodes) in the bulk format can be accompanied by a description that explains why the entry was provided (e.g., explaining the associated node or group, the relationship or typology between the associated node or group and the sanctioned node, and other information). Each entry may also have a unique code that can be used to locate the entity or individual in the web-based interface and display relevant information (e.g., information about the associated node or group and other information).

As new information is introduced into the system, such as new sanctions lists and new research data by analysts, the aforementioned methods can be rerun to identify associated nodes of new sanctioned nodes, update associated nodes for existing sanctioned nodes, and remove existing sanctioned nodes and their associated nodes. The step of updating associated nodes for existing sanctioned nodes may include adding new associated nodes, deleting existing associated nodes, or updating information of associated nodes (e.g., entity name has changed), their relationships to the sanctioned node (e.g., 50% share of ownership in the associated node is owned by the sanctioned node, instead of 30%), and other information. The differences (e.g., the additions, deletions, and updates) between the old data (before rerunning with the new information) and the new data (after rerunning with the new information) can be made available via the visual interactive interface in the external production environment or the software interface in the internal production environment. This information can also be provided in the form of a delta report. The changes and the new data can also be ingested by a customer system for screening, filtering, risk scoring, or other similar systems in customizable bulk format.

All of the above methods can traverse all the available nodes, edges, and properties (or entire or overall graph) in the system or graph database to identify associated nodes, and, as a result, reveal pertinent information (including indirect relationship information visible from one or more edge types). The system or graph database includes research data and other information entered by analysts or received from other sources. The process of finding associated nodes is based on the selected edge type or risk type. The process of finding associated nodes can further consider other edge types, nodes, and properties.

It is understood that although FIGS. 21-29 are described with respect to a sanctioned node (i.e., the traversal process starts with a sanctioned node and the results are generated for that sanctioned node), those figures and their corresponding descriptions are also applicable other types of nodes or nodes of interest (e.g., a node that does not appear on a sanctions list but is associated with a sanctioned node, a node that presents financial crime and sanctions-related risks but does not appear on a sanctions list, or a non-sanctioned node that the provider or customer wishes to investigate).

All of the above methods may be performed by the software engine. The above methods are different and separate from the traversal methods used to find corridors that start from non-sanctioned nodes. The traversal process can be implemented sequentially, in parallel, or combinations thereof.

The system is also customizable or modifiable to provide results based on new risk relationships, to produce new sanctioned actor communities, to present new risk types from research, business needs, or customer parameters or requirements. New logic and algorithms can be introduced and implemented in the system to perform those and other functions.

The results from the above methods and corridor identification process can be generated on demand or live. The results can be generated only when users query a node, instead of pre-generating the results and storing the results in the database waiting for users to access them. The above methods and corridor identification process can also be performed with no analyst involvement or with minimum analyst involvement. For example, the research data may be automatically gathered and populated by the system or other computer systems, the sanctions lists may be automatically collected and processed by the system or other computer systems, and the comparison between the research data and the sanctions lists may be automatically performed by the system or other computer systems.

Embodiments described herein are primarily described in the context of providing a tool for evaluating prospective financial crime and sanctions-related risks for businesses considering commercial dealings, but it should be understood that applications in other areas including application of particular features in other areas are contemplated.

It is understood from the above description that the functionality and features of the systems, devices, or methods of embodiments of the present invention include generating and sending signals to accomplish the actions.

It should be understood that variations, clarifications, or modifications are contemplated. Applications of the technology to other fields are also contemplated.

Exemplary systems, devices, and methods are described for illustrative purposes. Further, since numerous modifications and changes will readily be apparent to those having ordinary skill in the art, it is not desired to limit the invention to the exact constructions as demonstrated in this disclosure. Accordingly, all suitable modifications and equivalents may be resorted to falling within the scope of the invention.

Thus, for example, any sequence(s) and/or temporal order of steps of various processes or methods (or sequence of device connections or operation) that are described herein are illustrative and should not be interpreted as being restrictive. Accordingly, it should be understood that although steps of various processes or methods or connections or sequence of operations may be shown and described as being in a sequence or temporal order, but they are not necessarily limited to being carried out in any particular sequence or order. For example, the steps in such processes or methods generally may be carried out in various different sequences and orders, while still falling within the scope of the present invention. Moreover, in some discussions, it would be evident to those of ordinary skill in the art that a subsequent action, process, or feature is in response to an earlier action, process, or feature.

It is also implicit and understood that the applications or systems illustratively described herein provide computer-implemented functionality that automatically performs a process or process steps unless the description explicitly describes user intervention or manual operation.

It should be understood that claims that include fewer limitations, broader claims, such as claims without requiring a certain feature or process step in the appended claim or in the specification, clarifications to the claim elements, different combinations, and alternative implementations based on the specification, or different uses, are also contemplated by the embodiments of the present invention It should be understood that combinations of described features or steps are contemplated even if they are not described directly together or not in the same context.

The terms or words that are used herein are directed to those of ordinary skill in the art in this field of technology and the meaning of those terms or words will be understood from terminology used in that field or can be reasonably interpreted based on the plain English meaning of the words in conjunction with knowledge in this field of technology. This includes an understanding of implicit features that for example may involve multiple possibilities, but to a person of ordinary skill in the art a reasonable or primary understanding or meaning is understood.

Software can be implemented as distinct modules or software applications or can be integrated together into an overall application such as one that includes the user interface and that handles other feature for providing the functionality to the user on their device.

It is intended that the specification and examples be considered as exemplary only, with a true scope being indicated by the claims and their equivalents.

The invention claimed is:

1. A computer implemented system, comprising:
a database, stored in nonvolatile memory and configured to store graph data structures comprising a plurality of different types of nodes, edges, and related properties that are used by the system to build a graph, wherein the database stores information represented as nodes, edges, and related properties; and
a system configured to:
receive data input including selections of nodes of interest and selections of criteria that specify a type of edge to be traversed by a software engine;
implement a software engine configured to automatically traverse pathways starting from each node of interest through the types of edges specified by the criteria and identify one or more nodes in the database as associated nodes, wherein the software engine starts traversing nodes from each node of interest and stops traversing when a node has no edges that match the criteria;
save information representing the nodes of interest, the type of edges connecting the nodes of interest and the associated nodes, wherein the saved information is configured to be ingested into another computer system and be displayed as in a table format, wherein the table format comprises alphanumeric names of actors represented by nodes of interest or associated nodes, identifiers for each of the associated nodes, and related textual information, wherein the identifiers are configured to provide access to information of the corresponding associated nodes;
provide a copy of the saved information to other computer systems; and
present a network visualization displaying area upon entering the individual identifiers in a web-based interface or selecting the individual identifiers, wherein the network visualization displaying area is configured to display the associated node of the entered or selected identifier, the selected node of interest, and the selected edges connecting the selected node of interest and the associated node of the entered or selected identifier in the network visualization displaying area such that the relationship between the associated node and the selected node of interest is visualized as part of a network in the network visualization displaying area,
wherein the network visualization displaying area is configured to present a plurality of options with each corresponding to each of the criteria, and automatically and interactively add one or more visual relationships to the network visualization displaying area by presenting an option for a particular criterion only when that particular criterion identifies one or more nodes in the database as associated node, and upon selecting one of the presented options, display the selected node of interest and the selected edges connecting the selected node of interest and the associated node of the selected web link or alphanumeric code in the network visualization displaying area such that the relationship between the associated node and the selected node of interest is visualized in the network visualization displaying area.

2. The computer implemented system of claim 1, wherein the software engine is configured to traverse only through the type of edges specified by the selected criterion.

3. The computer implemented system of claim 1, wherein the software engine is configured to traverse through the type of edges specified by the selected criterion and other types of edges that can identify associated nodes.

4. The computer implemented system of claim 3, wherein the system is further configured to specify an ownership percentage and the software engine is configured to identify associated nodes by determining whether a particular node of interest has ownership in one or more nodes in the database and whether the particular node of interest's share of ownership in one or more nodes in the database meet the specified percentage.

5. The computer implemented system of claim 4, wherein the system is further configured to determine whether the share of ownership meets the specified percentage in iterations.

6. The computer implemented system of claim 5, wherein, in one iteration, the system determines that a particular node of interest has ownership in one of the nodes in the database, that the particular node of interest's share of ownership in that node is below the specified percentage, and that the node below the specified percentage has additional edges.

7. The computer implemented system of claim 6, wherein the system postpones the determination of whether the node below the specified percentage is an associated node until after a subsequent iteration.

8. The computer implemented system of claim 7, wherein in the one iteration, the system determines that another node of interest has ownership in another one of the nodes in the database and that the other node of interest's share of ownership in the other node is equal to or above the specified percentage and identifies the other node as an associated node.

9. The computer implemented system of claim 8, wherein, in the one iteration, the system determines that the node below the specified percentage is connected to the identified associated node via an edge.

10. The computer implemented system of claim 9, wherein, in a subsequent iteration, the system aggregates the below-the-specified-percentage ownership by the particular node of interest and ownership by the identified associated node to identify the node that was previously found below the specified percentage of ownership as an associated node if the aggregated ownership is equal or greater than the specified percentage.

11. The computer implemented system of claim 10, wherein the particular node of interest, the type of edges connecting the particular sanctioned node and the associated nodes are saved as a subgraph in the database and the subgraph or nodes in the subgraph can be recalled by the web-based interface upon selecting one of the options.

12. The computer implemented system of claim 1, wherein the one or more nodes in the database identified by the software engine as associated nodes are not sanctioned actors.

13. The computer implemented system of claim 1, wherein the node of interest is a sanctioned node, a node that does not appear on a sanctions list but is associated with a sanctioned node, a node that presents financial crime and sanctions-related risks but does not appear on a sanctions list, or a non-sanctioned node.

14. The computer implemented system of claim 1, wherein the identifiers are web links or alphanumeric codes.

15. The computer implemented system of claim 14, wherein the system is configured to present a network visualization displaying area upon selecting the web links or alphanumeric codes.

16. The computer implemented system of claim 1, wherein the identifiers are alphanumeric codes and are stored in the system, and the alphanumeric codes are further searchable from a field implemented by the system and are selectable from the field to access the corresponding associated nodes.

17. A computer implemented method comprising:
establishing a database, stored in nonvolatile memory and configured to store graph data structures comprising a plurality of different types of nodes, edges, and related properties that are used by a system to build a graph, wherein the database stores information represented as nodes, edges, and related properties; and
configuring a system to:
receive data input including selections of nodes of interest and selections of criteria that specify a type of edge to be traversed by a software engine;
implement a software engine configured to automatically traverse pathways starting from each node of interest through the types of edges specified by the criteria and identify one or more nodes in the database as associated nodes, wherein the software engine starts traversing nodes from each node of interest and stops traversing when a node has no edges that match the criteria;
save information representing the nodes of interest, the type of edges connecting the nodes of interest and the associated nodes, wherein the saved information is configured to be ingested into another computer system and be displayed as in a table format, wherein the table format comprises alphanumeric names of actors represented by nodes of interest or associated nodes, identifiers for each of the associated nodes, and related textual information, wherein the identifiers are configured to provide access to information of the corresponding associated nodes;
provide a copy of the saved information to other computer systems; and
present a network visualization displaying area upon entering the individual identifiers in a web-based interface or selecting the individual identifiers, wherein the network visualization displaying area is configured to display the associated node of the entered or selected identifier, the selected node of interest, and the selected edges connecting the selected node of interest and the associated node of the entered or selected identifier in the network visualization displaying area such that the relationship between the associated node and the selected node of interest is visualized as part of a network in the network visualization displaying area,
wherein the network visualization displaying area is configured to present a plurality of options with each corresponding to each of the criteria, and further configuring the system to automatically and interactively add one or more visual relationships to the network visualization displaying area by presenting an option for a particular criterion only when that particular criterion identifies one or more nodes in the database as associated node, and upon selecting one of the presented options, display the selected node of interest and the selected edges connecting the selected node of interest and the associated node of the selected web link or alphanumeric code in the network visualization displaying area such that the relationship between the associated node and the selected node of interest is visualized in the network visualization displaying area.

18. A computer readable data medium storing computer-executable instructions that, when executed by a processor, cause the processor to:

establish a database, stored in nonvolatile memory and configured to store graph data structures comprising a plurality of different types of nodes, edges, and related properties that are used by a system to build a graph, wherein the database stores information represented as nodes, edges, and related properties; and configure a system to:

receive data input including selections of nodes of interest and selections of criteria that specify a type of edge to be traversed by a software engine;

implement a software engine configured to automatically traverse pathways starting from each node of interest through the types of edges specified by the criteria and identify one or more nodes in the database as associated nodes, wherein the software engine starts traversing nodes from each node of interest and stops traversing when a node has no edges that match the criteria;

save information representing the nodes of interest, the type of edges connecting the nodes of interest and the associated nodes, wherein the saved information is configured to be ingested into another computer system and be displayed as in a table format, wherein the table format comprises alphanumeric names of actors represented by nodes of interest or associated nodes, identifiers for each of the associated nodes, and related textual information, wherein the identifiers are configured to provide access to information of the corresponding associated nodes;

provide a copy of the saved information to other computer systems; and present a network visualization displaying area upon entering the individual identifiers in a web-based interface or selecting the individual identifiers, wherein the network visualization displaying area is configured to display the associated node of the entered or selected identifier, the selected node of interest, and the selected edges connecting the selected node of interest and the associated node of the entered or selected identifier in the network visualization displaying area such that the relationship between the associated node and the selected node of interest is visualized as part of a network in the network visualization displaying area, wherein the network visualization displaying area is configured to present a plurality of options with each corresponding to each of the criteria, and the system is further configured to automatically and interactively add one or more visual relationships to the network visualization displaying area by presenting an option for a particular criterion only when that particular criterion identifies one or more nodes in the database as associated node, and upon selecting one of the presented options, and display the selected node of interest and the selected edges connecting the selected node of interest and the associated node of the selected web link or alphanumeric code in the network visualization displaying area such that the relationship between the associated node and the selected node of interest is visualized in the network visualization displaying area.

19. The computer implemented method of claim 17, wherein the identifiers are web links or alphanumeric codes.

20. The computer implemented method of claim 17, wherein the a network visualization displaying area is displaying upon selecting the web links or alphanumeric codes.

21. The computer readable data medium of claim 18, wherein the identifiers are web links or alphanumeric codes.

22. The computer readable data medium of claim 18, wherein the a network visualization displaying area is displaying upon selecting the web links or alphanumeric codes.

23. The computer readable data medium of claim 18, wherein the software engine is configured to traverse through the type of edges specified by the selected criterion and other types of edges that can identify associated nodes.

24. The computer readable data medium of claim 23, further comprising configuring the system to specify an ownership percentage and the software engine is configured to identify associated nodes by determining whether a particular node of interest has ownership in one or more nodes in the database and whether the particular node of interest's share of ownership in one or more nodes in the database meet the specified percentage.

25. The computer readable data medium of claim 24, further comprising configuring to determine whether the share of ownership meets the specified percentage in iterations.

26. The computer readable data medium of claim 25, wherein, in one iteration, the system determines that a particular node of interest has ownership in one of the nodes in the database, that the particular node of interest's share of ownership in that node is below the specified percentage, and that the node below the specified percentage has additional edges.

27. The computer readable data medium of claim 26, further comprising configuring the system to postpone the determination of whether the node below the specified percentage is an associated node until after a subsequent iteration.

28. The computer implemented method of claim 17, wherein the one or more nodes in the database identified by the software engine as associated nodes are not sanctioned actors.

29. The computer implemented method of claim 17, wherein the node of interest is a sanctioned node, a node that does not appear on a sanctions list but is associated with a sanctioned node, a node that presents financial crime and sanctions-related risks but does not appear on a sanctions list, or a non-sanctioned node.

* * * * *